United States Patent
Rollins et al.

(10) Patent No.: US 10,031,535 B2
(45) Date of Patent: Jul. 24, 2018

(54) DIRECT DRIVE FAN SYSTEM WITH VARIABLE PROCESS CONTROL

(71) Applicant: PRIME DATUM, INC., Canandaigua, NY (US)

(72) Inventors: Patrick Rollins, Canandaigua, NY (US); George Lucas, Hammondsport, NY (US); Joseph Costello, Inman, SC (US)

(73) Assignee: PRIME DATUM, INC., Canandaigua, NY (US)

( * ) Notice: Subject to any disclaimer, the term of this patent is extended or adjusted under 35 U.S.C. 154(b) by 1059 days.

(21) Appl. No.: 14/352,050

(22) PCT Filed: Oct. 21, 2012

(86) PCT No.: PCT/US2012/061244
§ 371 (c)(1),
(2) Date: Apr. 15, 2014

(87) PCT Pub. No.: WO2013/059764
PCT Pub. Date: Apr. 25, 2013

(65) Prior Publication Data
US 2014/0244051 A1 Aug. 28, 2014

Related U.S. Application Data

(60) Provisional application No. 61/549,872, filed on Oct. 21, 2011.

(51) Int. Cl.
*B01F 3/04* (2006.01)
*G05D 27/02* (2006.01)
(Continued)

(52) U.S. Cl.
CPC ......... *G05D 27/02* (2013.01); *B01F 3/04078* (2013.01); *F04D 19/002* (2013.01);
(Continued)

(58) Field of Classification Search
CPC ........... B01F 3/04; B01F 3/04078; F28D 5/00
(Continued)

(56) References Cited

U.S. PATENT DOCUMENTS

| | | | |
|---|---|---|---|
| 6,262,550 B1 | 7/2001 | Kliman et al. | |
| 8,473,080 B2 * | 6/2013 | Seem | F25B 49/027 700/28 |

* cited by examiner

*Primary Examiner* — Robert A Hopkins
(74) *Attorney, Agent, or Firm* — Raymond A. Nuzzo

(57) ABSTRACT

The present invention is directed to a direct-drive fan system and a variable process control system for efficiently managing the operation of fans in a cooling system such as a wet-cooling tower or air-cooled heat exchanger (ACHE), HVAC systems, mechanical towers or chiller systems. The present invention is based on the integration of key features and characteristics such as tower thermal performance, fan speed and airflow, motor torque, fan pitch, fan speed, fan aerodynamic properties, and pump flow. The variable process control system processes feedback signals from multiple locations in order control a high torque, variable speed, permanent magnet motor to drive the fan. Such feedback signals represent certain operating conditions including motor temperature, basin temperature, vibrations, and pump flow rates. Other data processed by the variable process control system in order to control the motor include turbine back pressure set-point, condenser temperature set-point and plant part-load setting. The variable process control system processes this data and the aforesaid feedback signals to optimize the operation of the cooling system in order to prevent disruption of the industrial process and prevent equipment (turbine) failure or trip. The variable process control system alerts the operators for the need to conduct maintenance actions to remedy deficient operating conditions such as condenser fouling. The variable process control system increases cooling for cracking crude and also adjusts (Continued)

the motor RPM, and hence the fan RPM, accordingly during plant part-load conditions in order to save energy.

31 Claims, 32 Drawing Sheets

(51) Int. Cl.
*F04D 27/00* (2006.01)
*F04D 19/00* (2006.01)
*F04D 25/06* (2006.01)
*F28C 1/00* (2006.01)

(52) U.S. Cl.
CPC ....... *F04D 25/0606* (2013.01); *F04D 27/004* (2013.01); *F05D 2220/766* (2013.01); *F05D 2220/768* (2013.01); *F05D 2260/20* (2013.01); *F05D 2260/70* (2013.01); *F05D 2260/821* (2013.01); *F05D 2260/96* (2013.01); *F05D 2270/306* (2013.01); *F05D 2270/3011* (2013.01); *F05D 2270/44* (2013.01); *F05D 2270/71* (2013.01); *F28C 1/00* (2013.01); *Y02B 30/748* (2013.01); *Y02T 50/675* (2013.01)

(58) Field of Classification Search
USPC .......................................... 261/127, DIG. 11
See application file for complete search history.

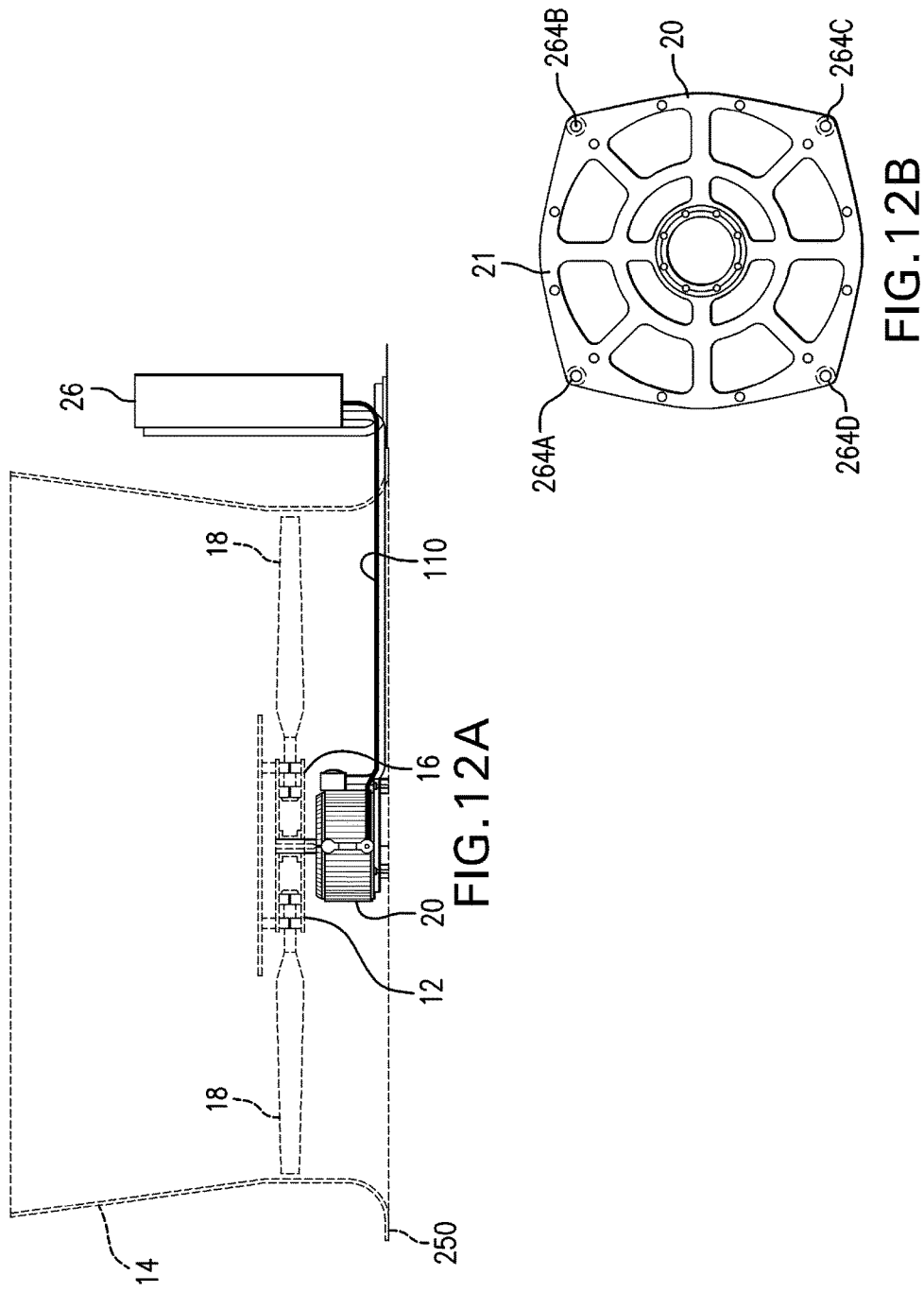

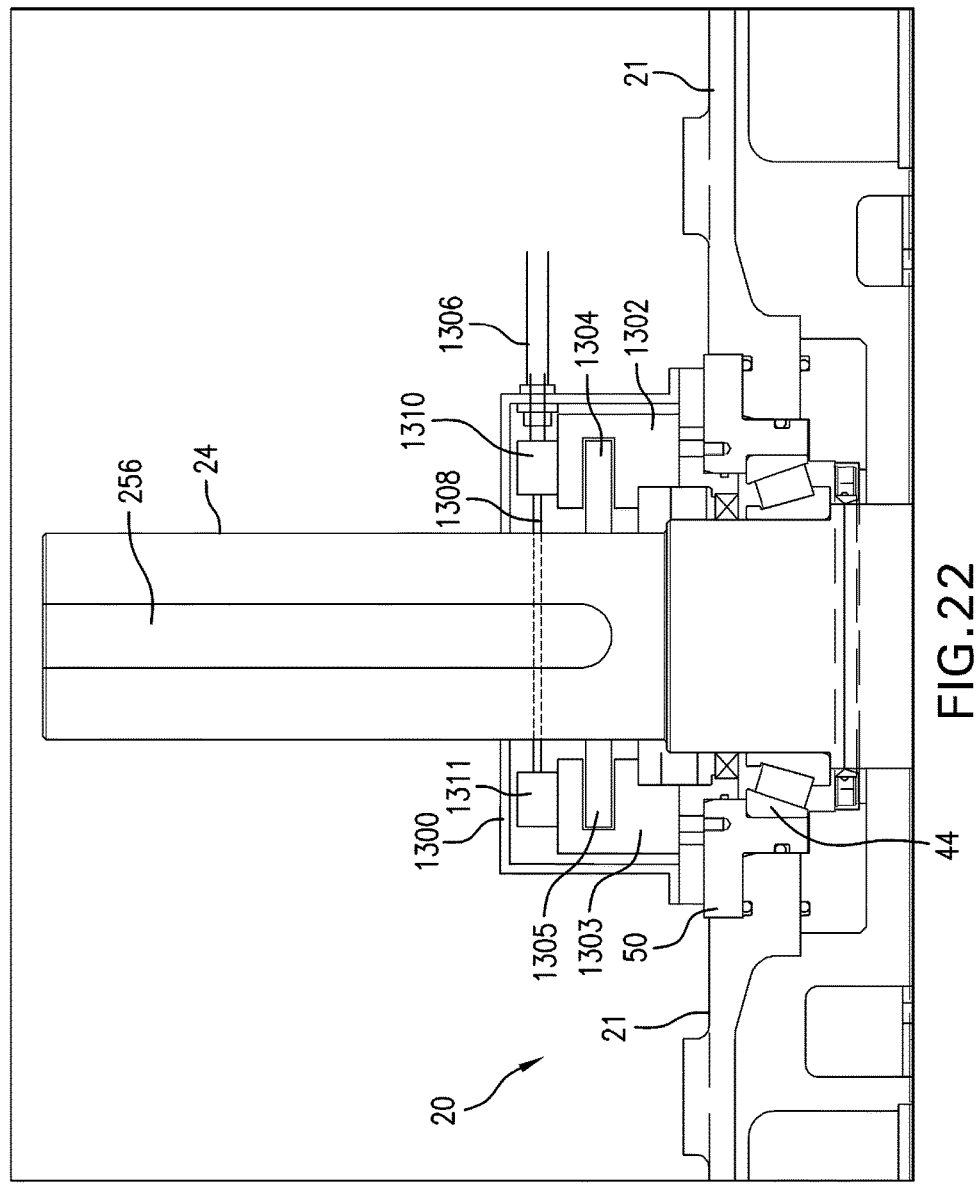

US 10,031,535 B2

DIRECT DRIVE FAN SYSTEM WITH VARIABLE PROCESS CONTROL

CROSS-REFERENCE TO RELATED APPLICATIONS

This application claims the benefit of U.S. provisional application No. 61/549,872, filed Oct. 21, 2011. The entire disclosure of U.S. application No. 61/549,872 is hereby incorporated by reference.

TECHNICAL FIELD

The present invention generally relates to a method and system for efficiently managing the operation and performance of cooling towers, air-cooled heat exchangers (ACHE), HVAC, and mechanical towers and chillers.

BACKGROUND ART

Industrial cooling systems, such as wet-cooling towers and air-cooled heat exchangers (ACHE), are used to remove the heat absorbed in circulating cooling water used in power plants, petroleum refineries, petrochemical and chemical plants, natural gas processing plants and other industrial facilities. Wet-cooling towers and ACHEs are widely used in the petroleum refining industry. Refining of petroleum depends upon the cooling function provided by the wet-cooling towers and air-cooled heat exchangers. Refineries process hydrocarbons at high temperatures and pressures using processes such as Liquid Catalytic Cracking and Isomerization. Cooling water is used to control operating temperatures and pressures. The loss of cooling water circulation within a refinery can lead to unstable and dangerous operating conditions requiring an immediate shut down of processing units. Wet-cooling towers and ACHEs have become "mission critical assets" for petroleum refinery production. Thus, cooling reliability has become mission critical to refinery safety and profit and is affected by many factors such as environmental limitations on cooling water usage, environmental permits and inelastic supply chain pressures and variable refining margins. As demand for high-end products such as automotive and aviation fuel has risen and refining capacity has shrunk, the refineries have incorporated many new processes that extract hydrogen from the lower value by-products and recombined them into the higher value products. These processes are dependent on cooling to optimize the yield and quality of the product. Over the past decade, many refineries have been adding processes that reform low grade petroleum products into higher grade and more profitable products such as aviation and automotive gasoline. These processes are highly dependent upon the wet-cooling towers and ACHEs to control the process temperatures and pressures that affect the product quality, process yield and safety of the process. In addition, these processes have tapped a great deal of the cooling capacity reserve in the towers leaving some refineries "cooling limited" on hot days and even bottlenecked. ACHE cooling differs from wet cooling towers in that ACHEs depend on air for air cooling as opposed to the latent heat of vaporization or "evaporative cooling". Most U.S. refineries operate well above 90% capacity and thus, uninterrupted refinery operation is critical to refinery profit and paying for the process upgrades implemented over the last decade. The effect of the interruption in the operation of cooling units with respect to the impact of petroleum product prices is described in the report entitled "Refinery Outages: Description and Potential Impact On Petroleum Product Prices", March 2007, U.S. Department of Energy.

Typically, a wet cooling tower system comprises a basin which holds cooling water that is routed through the process coolers and condensers in an industrial facility. The cool water absorbs heat from the hot process streams that need to be cooled or condensed, and the absorbed heat warms the circulating water. The warm circulating water is delivered to the top of the cooling tower and trickles downward over fill material inside the tower. The fill material is configured to provide a maximum contact surface, and maximum contact time, between the water and air. As the water trickles downward over the fill material, it contacts ambient air rising up through the tower either by natural draft or by forced draft using large fans in the tower. Many wet cooling towers comprise a plurality of cells in which the cooling of water takes place in each cell in accordance with the foregoing technique. Cooling towers are described extensively in the treatise entitled "Cooling Tower Fundamentals", second edition, 2006, edited by John C. Hensley, published by SPX Cooling Technologies, Inc.

Many wet cooling towers in use today utilize large fans, as described in the foregoing discussion, to provide the ambient air. The fans are enclosed within a fan stack which is located on the fan deck of the cooling tower. Fan stacks are typically configured to have a parabolic shape to seal the fan and add fan velocity recovery. In other systems, the fan stack may have a cylindrical shape. Drive systems are used to drive and rotate the fans. The efficiency and production rate of a cooling tower is heavily dependent upon the efficiency of the fan drive system. The duty cycle required of the fan drive system in a cooling tower environment is extreme due to intense humidity, poor water chemistry, potentially explosive gases and icing conditions, wind shear forces, corrosive water treatment chemicals, and demanding mechanical drive requirements. In a multi-cell cooling tower, such as the type commonly used in the petroleum industry, there is a fan and fan drive system associated with each cell. Thus, if there is a shutdown of the mechanical fan drive system associated with a particular cell, then that cell suffers a "cell outage". A cell outage will result in a decrease in the production of refined petroleum. For example, a "cell outage" lasting for only one day can result in the loss of thousands of refined barrels of petroleum. If numerous cells experience outages lasting more than one day, the production efficiency of the refinery can be significantly degraded. The loss in productivity over a period of time can be measured as a percent loss in total tower-cooling potential. As more cell outages occur within a given time frame, the percent loss in total tower-cooling potential will increase. This, in turn, will decrease product output and profitability of the refinery and cause an increase in the cost of the refined product to the end user. It is not uncommon for decreases in the output of petroleum refineries, even if slight, to cause an increase in the cost of gasoline to consumers. There is a direct relationship between cooling BTUs and Production in barrels per day (BBL/Day).

One prior art drive system commonly used in wet-cooling towers is a complex, mechanical fan drive system. This type of prior art fan drive system utilizes a motor that drives a drive train. The drive train is coupled to a gearbox, gear-reducer or speed-reducer which is coupled to and drives the fan blades. Referring to FIG. 1, there is shown a portion of a wet-cooling tower 1. Wet-cooling tower 1 utilizes the aforesaid prior art fan drive system. Wet cooling tower 1 has fan stack 2 and fan 3. Fan 3 has fan seal disk 4, fan hub 5A and fan blades 5B. Fan blades 5B are connected to fan hub 5A. The prior art fan drive system includes a gearbox 6 that is coupled to drive shaft 7 which drives gearbox 6. The prior art fan drive system includes induction motor 8 which rotates drive shaft 7. Shaft couplings, not shown but well known in the art, are at both ends of drive shaft 7. These shaft couplings couple the draft shaft 7 to the gearbox 6 and to induction motor 8. Wet-cooling tower 1 includes fan deck 9 upon which sits the fan stack 2. Gearbox 6 and induction motor 9 are supported by a ladder frame or torque tube (not shown) but which are well known in the art. Vibration switches are typically located on the ladder frame or torque tube. One such vibration switch is vibration switch 8A shown in FIG. 1. These vibration switches function to automatically shut down a fan that has become imbalanced for some reason. This prior art fan drive system is subject to frequent outages, a less-than-desirable MTBF (Mean Time Between Failure), and requires diligent maintenance, such as regular oil changes, in order to operate effectively. Coupling and shaft alignment are critical and require experienced craft labor. One common type of mechanical drive system used in the prior art gearbox-type fan drive utilizes five rotating shafts, eight bearings, three shaft seals (two at high speed), and four gears (two meshes). This drive train absorbs about 3% of the total power. Although this particular prior art fan drive system may have an attractive initial low cost, cooling tower end-users found it necessary to purchase heavy duty and oversized components such as composite gearbox shafts and couplings in order to prevent breakage of the fan drive components especially when attempting across-the-line starts. Many cooling tower end-users also added other options such as low-oil shutdown, anti-reverse clutches and oil bath heaters. Thus, the life cycle cost of the prior art mechanical fan drive system compared to its initial purchase price is not equitable. Once the end user has purchased the more expensive heavy duty and oversized components, the reliability of the prior art fan drive system is still quite poor even after they perform all the expensive and time consuming maintenance. Thus, this prior art gearbox-type drive system has a low, initial cost, but a high cycle cost with poor reliability. In a multi-cell cooling tower, such as the type commonly used in the petroleum industry, there is a fan and prior art mechanical fan drive system associated with each cell. Thus, if there is a shutdown of the mechanical fan drive system associated with a particular cell, then that cell suffers a "cell outage" which was described in the foregoing description. The loss in productivity over a period of time due to the poor reliability of the prior art mechanical fan drive systems can be measured as a percent loss in refinery production (bbls/day). In one currently operating cooling tower system, data and analysis has shown that the loss of one cell is equated to the loss of 2,000 barrels per day.

Other types of prior art fan drive systems, such as V-belt drive systems, also exhibit many problems with respect to maintenance, MTBF and performance and do not overcome or eliminate the problems associated with the prior art gearbox-type fan drive systems. One attempt to eliminate the problems associated with the prior art gearbox-type fan drive system was the prior art hydraulically driven fan systems. Such a system is described in U.S. Pat. No. 4,955,585 entitled "Hydraulically Driven fan System for Water Cooling Tower".

Air Cooled Heat Exchangers (ACHE) are well known in the art and are used for cooling in a variety of industries including power plants, petroleum refineries, petrochemical and chemical plants, natural gas processing plants, and other industrial facilities that implement energy intensive processes. ACHE exchangers are used typically where there is lack of water, or when water-usage permits cannot be obtained. ACHEs lack the cooling effectiveness of "Wet Towers" when compared by size (a.k.a. footprint). Typically, an ACHE uses a finned-tube bundle. Cooling air is provided by one or more large fans. Usually, the air blows upwards through a horizontal tube bundle. The fans can be either forced or induced draft, depending on whether the air is pushed or pulled through the tube bundle. Similar to wet cooling towers, fan-tip speed typically does not exceed 12,000 feet per minute for aeromechanical reasons and may be reduced to obtain lower noise levels. The space between the fan(s) and the tube bundle is enclosed by a fan stack that directs the air (flow field) over the tube bundle assembly thereby providing cooling. The whole assembly is usually mounted on legs or a pipe rack. The fans are usually driven by a fan drive assembly that uses an electric motor. The fan drive assembly is supported by a steel, mechanical drive support system. Vibration switches are typically located on the structure that supports the fan assembly. These vibration switches function to automatically shut down a fan that has become imbalanced for some reason. Airflow is very important in ACHE cooling to ensure that the air has the proper "flow field" and velocity to maximize cooling. Turbulence caused by current fan gear support structure can impair cooling efficiency. Therefore, mass airflow is the key parameter to removing heat from the tube and bundle system. ACHE cooling differs from wet cooling towers in that ACHEs depend on air for air cooling as opposed to the latent heat of vaporization or "evaporative cooling".

Prior art ACHE fan drive systems use any one of a variety of fan drive components. Examples of such components include electric motors, steam turbines, gas or gasoline engines, or hydraulic motors. The most common drive device is the electric motor. Steam and gas drive systems have been used when electric power is not available. Hydraulic motors have also been used with limited success. Specifically, although hydraulic motors provide variable speed control, they have relatively low efficiencies. Motor and fan speed are sometimes controlled with variable frequency drives with mixed success. The most commonly used speed reducer is the high-torque, positive type belt drive, which uses sprockets that mesh with the timing belt cogs. They are used with motors up to 50 or 60 horsepower, and with fans up to about 18 feet in diameter. Banded V-belts are still often used in small to medium sized fans, and gear drives are used with very large motors and fan diameters. Fan speed is set by using a proper combination of sprocket or sheave sizes with timing belts or V-belts, and by selecting a proper reduction ratio with gears. In many instances, right-angle gear boxes are used as part of the fan drive system in order to translate and magnify torque from an offset electrical motor. However, belt drives, pulleys and right-angle gear boxes have poor reliability. The aforesaid complex, prior art mechanical drive systems require stringent maintenance practices to achieve acceptable levels of reliability. In particular, one significant problem with ACHE fan systems is the poor reliability of the belt due to belt tension. A common practice is to upgrade to "timing belts" and add a tension system. One technical paper, entitled "*Application of Reliability Tools to Improve V-Belt Life on Fin Fan Cooler Units*", by Rahadian Bayu of PT, Chevron Pacific Indonesia, Riau, Indonesia, presented at the 2007 International Applied Reliability Symposium, addresses the reliability and efficiency of V-belts used in many prior art fan drive systems. The reliability deficiencies of the belt and pulley systems and the gear reducer systems used in the ACHE fan drive systems often result in outages that are detrimental to mission critical industries such as petroleum refining, petro-chemical, power generation and other process intensive industries dependent on cooling. Furthermore, the motor systems used in the ACHE fan drive systems are complex with multiple bearings, auxiliary oil and lubrications systems, complex valve systems for control and operation, and reciprocating parts that must be replaced at regular intervals. Many petroleum refineries, power plants, petro-chemical facilities, chemical plants and other industrial facilities utilizing prior art ACHE fan drive systems have reported that poor reliability of belt drive systems and right-angle drive systems has negatively affected production output. These industries have also found that service and maintenance of the belt drive and gearbox system are major expenditures in the life cycle cost, and that the prior art motors have experienced failure due to the incorrect use of high pressure water spray. The duty cycle required of an ACHE fan drive system is extreme due to intense humidity, dirt and icing conditions, wind shear forces, water washing (because the motors are not sealed, sometime they get sprayed by operators to improve cooling on hot days), and demanding mechanical drive requirements.

In an attempt to increase the cooling performance of ACHE cooling systems, some end-users spray water directly on the ACHE system to provide additional cooling on process limiting, hot days. Furthermore, since fan blades can become "fouled" or dirty in regular service and lose performance, many end-users water-wash their ACHE system to maintain their cooling performance. However, directly exposing the ACHE system to high pressure water spray can lead to premature maintenance and/or failure of system components, especially since prior art drive systems are typically open thereby allowing penetration by water and other liquids. Thus, the efficiency and production rate of a process is heavily dependent upon the reliability of the ACHE cooling system and its ability to remove heat from the system.

Prior art fan systems have further drawbacks. Most of the currently installed fleet of cooling tower fans operates continuously at 100% speed. For a small percentage of applications, variable frequency drives ("VFD") of Adjustable Speed Drives have been applied to an induction motor to simulate variable speed. However, the application of VFDs to induction motors has not been overly successful and not implemented on a wide scale due to poor success rates. In some cases this may also involve a two-speed induction motor. These applications have not been widely installed by end-users. In some cases, end-users have installed VFDs solely to provide "soft starts" to the system thereby avoiding "across the line starts" that can lead to failure or breakage of the gearbox system when maximum torque is applied to the system at start-up. This issue is further exacerbated by "fan windmilling" which occurs when the fan turns in reverse due to the updraft force of the tower on the pitch of the fan. Windmilling of the fan is not allowed due to the lubrication limitation of gearboxes in reverse and requires the addition of an anti-reverse mechanism.

Prior art variable speed induction motors are reactive to basin temperature and respond by raising the fan to 100% fan tip speed until basin temperature demand is met and then reducing the speed to a predetermined set speed which is typically 85% fan tip speed. Such systems utilize lagging feedback loops that result in fan speed oscillation, instability and speed hunting that consume large amounts of energy during abrupt speed changes and inertial changes which results in premature wear and failure of gear train parts that are designed for single speed, omni-direction operation.

Induction motors in variable speed duty require extra insulation, additional windings and larger cooling fans for part-load cooling which increases the cost and size. Application of induction motors on variable speed fans requires that the motor be able to generate the required torque to turn the fan to speed at part-load operation which can also require the motor to be larger than for a steady state application and thus increase the cost and size. In these variable speed fan systems, the fan speed is controlled by the basin temperature set point. This means that fan speed will increase according to a set algorithm when the basin temperature exceeds a temperature set point in order to cool the basin water. Once the basin temperature set point has been satisfied the fan speed will be reduced according to the programmed algorithms. Furthermore, motors and gearboxes are applied without knowledge of the cooling tower thermal performance and operate only as a function of the basin temperature set point which results in large speed swings of the fan wherein the fan speed is cycled from minimum fan speed to maximum fan speed over a short period of time. The speed swings that occur at maximum fan acceleration consume significant amounts of energy.

Typical prior art gearboxes are designed for one-way rotation as evidenced by the lube system and gear mesh design. These gearboxes were never intended to work in reverse. In order to achieve reverse rotation, prior art gearboxes were modified to include additional lube pumps in order to lubricate in reverse due to the design of the oil slinger lubrication system which is designed to work in only one direction. These lube pumps are typically electric but can also be of other designs. The gear mesh of the gearbox is also a limiting factor for reverse rotation as the loading on the gear mesh is not able to bear the design load in reverse as it can in forward rotation. Typically, the modified gearboxes could operate in reverse at slow speed for no more than two minutes. End users in colder climates that require reverse rotation for de-icing the cooling tower on cold days have reported numerous failures of the gearbox drive train system. In addition, most operators have to manually reverse the system on each cell which may include an electrician. Since the gearbox and lubrication system are designed for one-way rotation typically at 100% fan speed, fan braking, gear train inertia and variable speed duty will accelerate wear and tear on the gearbox, drive shaft and coupling components as the inertial loads are directly reacted into the drive train, gearbox and motor.

Variable Speed Fan systems have not been widely adopted. However, in the interest of energy savings, more VFDs have been and are being applied to induction motors and fan gearbox systems with the hope of saving energy. However, these modifications require more robust components to operate the fan based upon the basin temperature set point. The DOE (Department of Energy) reports that the average energy savings of such applications is 27%. This savings is directly proportional to the fan laws and the reduced loading on the system as opposed to motor efficiency, which for an induction motor, drops off significantly in part-load operation.

Currently operating cooling towers typically do not use expensive condition-monitoring equipment that has questionable reliability and which has not been widely accepted by the end users. Vibration safety in prior art fan systems is typically achieved by the placement of vibration switches on the ladder frame near the motor. An example of such a vibration switch is vibration switch 8A shown in FIG. 1.

These vibration switches are isolated devices and are simply on-off switches that do not provide any kind of external signals or monitoring. These vibration switches have poor reliability and are poorly applied and maintained. Thus, these vibration switches provide no signals or information with respect to fan system integrity. Therefore, it is not possible to determine the source or cause of the vibrations. Such vibration switches are also vulnerable to malfunction or poor performance and require frequent testing to assure they are working. The poor reliability of these switches and their lack of fidelity to sense an impeding blade failure continues to be a safety issue. In an alternate form, vibration switches have been installed on or in the gearbox itself but continue to suffer from a lack of vibration signal fidelity and filtering to perform condition monitoring and system shutdown to the satisfaction of the end-user and their wide spread application. Prior art fan balancing typically consist of static balancing done at installation.

In prior art multi-cell cooling systems that utilize a plurality fans with gearbox drives, each fan is operated independently at 100%, or variable speed controlled independently by the same algorithm. Cooling towers are typically designed at one design point: maximum hot day temperature, maximum wet-bulb temperature and thus operate the fans at 100% steady state to satisfy the maximum hot day temperature, maximum wet-bulb temperature design condition, regardless of environmental conditions.

Current practice (CTI and ASME) attempts to measure the cooling tower performance to a precision that is considered impractical for an operating system that is constantly changing with the surrounding temperature and wet-bulb temperature. Most refinery operators operate without any measure of performance and therefore wait too long between service and maintenance intervals to correct and restore the performance of the cooling tower. It is not uncommon for some end-users to operate the tower to failure. Some end-users test their cooling towers for performance on a periodic basis, typically when a cooling tower is exhibiting some type of cooling performance problem. Such tests can be expensive and time consuming and typically normalize the test data to the tower design curve. Furthermore, these tests do not provide any trending data (multiple test points), load data or long-term data to establish performance, maintenance and service criteria. For example, excessive and wasted energy consumption occurs when operating fans that cannot perform effectively because the fill is clogged thus allowing only partial airflow through the tower. Poor cooling performance results in degraded product quality and/or throughput because reduced cooling is negatively affecting the process. Poor cooling tower performance can result in unscheduled downtime and interruptions in production. In many prior art systems, it is not uncommon for end-users to incorrectly operate the cooling tower system by significantly increasing electrical power to the fan motors to compensate for a clogged tower or to increase the water flow into the tower to increase cooling when the actual corrective action is to replace the fill in the tower. Poor cooling tower performance can lead to incorrect operation and has many negative side effects such as reduced cooling capability, poor reliability, excessive energy consumption, poor plant performance, and decrease in production and safety risks.

Therefore, in order to prevent supply interruption of the inelastic supply chain of refined petroleum products, the reliability and subsequent performance of wet-cooling towers and ACHE cooling systems must be improved and managed as a key asset to refinery safety, production and profit.

What is needed is a method and system that allows for the efficient operation and management of fans in wet-cooling towers and dry-cooling applications.

DISCLOSURE OF THE INVENTION

The present invention is directed to a system and method for efficiently managing the operation of fans in a cooling tower system including wet-cooling towers, or air-cooled heat exchanger (ACHE). The present invention is also applicable to managing the operation of fans in HVAC systems, mechanical towers and chillers. The present invention is based on the integration of the key features and characteristics such as (1) tower thermal performance, (2) fan speed and airflow, (3) motor torque, (4) fan pitch, (5) fan speed, (6) fan aerodynamic properties, and (7) pump flow.

The present invention is directed to a direct drive fan system and variable process control system for efficiently operating a fan in a wet-cooling tower or air-cooled heat exchanger (ACHE), HVAC system, mechanical tower, or chillers. The present invention is based on the integration of the key characteristics such as tower thermal performance, fan speed and airflow, motor torque, fan pitch, fan speed, fan aerodynamic properties, and pump flow rate. As used herein, the term "pump flow rate" refers to the flow rate of cooled process liquids that are pumped from the cooling tower for input into an intermediate device, such as condenser, and then to the process, then back to the intermediate device and then back to the cooling tower. The present invention uses a variable process control system wherein feedback signals from multiple locations are processed in order to control high-torque, variable speed motors which drive the fans and pumps. Such feedback signals represent certain operating conditions including motor temperature, basin temperature, vibrations and pump flow-rate, Thus, the variable process control system continually adjust motor RPM, and hence fan and pump RPM, as the operators or users change or vary turbine back-pressure set point, condenser temperature set point process signal (e.g. crude cracker), and plant part-load setting. The variable process control processes these feedback signals to optimize the plant for cooling and to prevent equipment (turbine) failure or trip. The variable process control alerts the operators for the need to conduct maintenance actions to remedy deficient operating conditions such as condenser fouling. The variable process control of the present invention increases cooling for cracking crude and also adjusts the motor RPM, and hence fan and pump RPM, accordingly during plant part-load conditions in order to save energy.

The variable process control system of the present invention comprises a computer system. The computer system comprises a data acquisition device, referred to as DAQ device 200 in the ensuing description. The computer system further comprises an industrial computer, referred to as industrial computer 300 in the ensuing description.

The variable process control system of the present invention includes a plurality of variable speed pumps, wherein each variable speed pumps comprises a permanent magnet motor. The variable process control system further comprises a Variable Frequency Drive (VFD) device which actually comprises a plurality of individual Variable Frequency Drives. Each Variable Frequency drive is dedicated to one permanent magnet motor. Therefore, one Variable Frequency Drive corresponds to the permanent magnet motor of the present invention which drives the fan, and each of the remaining Variable Frequency Drives is dedicated to controlling the permanent magnet motor of a corresponding variable speed pump. Thus, each permanent magnet motor is controlled independently.

The system of the present invention provides adaptive and autonomous variable speed operation of the fan and pump with control, supervision and feedback with operator override. A computer system processes data including cooling tower basin temperature, current process cooling demand, condenser temperature set-point, tower aerodynamic characteristics, time of day, wet-bulb temperature, vibration, process demand, environmental stress (e.g. windspeed and direction) and historical trending of weather conditions to control the variable speed fan in order to control the air flow through the cooling tower and meet thermal demand. The Variable Process Control System anticipates process demand and increases or decreases the fan speed in pattern similar to a sine wave over a twenty four (24) hour period. The Variable Process Control System accomplishes this by using a Runge-Kutter algorithm (or similar algorithm) that analyzes historical process demand and environmental stress as well as current process demand and current environmental stress to minimize the energy used to vary the fan speed. This variable process control of the present invention is adaptive and learns the process cooling demand by historical trending as a function of date and time. The operators of the plant input basin temperature set-point data into the Plant DCS (Distributed Control System). The basin temperature set-point data can be changed instantaneously to meet additional cooling requirements such as cracking heavier crude, maintaining vacuum backpressure in a steam turbine or prevent heat exchanger fouling or derate the plant to part-load. In response to the change in the basin temperature set-point, the variable process control system of the present invention automatically varies the rotational speed of the permanent magnet motor, and hence the rotational speed of the fan, so that the process liquids are cooled such that the temperature of the liquids in the collection basin is substantially the same as the new basin temperature set-point. This feature is referred to herein as "variable process control".

In an alternate embodiment, a condenser temperature set-point is inputted into the plant Distributed Control System (DCS) by the operators. The DCS is in electronic signal communication with the Data Acquisition (DAQ) Device and/or Industrial Computer of the Variable Process Control System of the present invention. The Data Acquisition device then calculates a collection basin temperature set-point that is required in order to meet the condenser temperature set-point. The Variable Process Control system then operates the fan and variable speed pumps to maintain a collection basin temperature that meets the condenser temperature set-point inputted by the operators.

The variable process control system of the present invention utilizes variable speed motors to drive fans and pumps to provide the required cooling to the industrial process even as the environmental stress changes. Process parameters, including but not limited to, temperatures, pressures and flow rates are measured throughout the system in order to monitor, supervise and control cooling of liquids (e.g. water) used by the industrial process. The variable process control system continually monitors cooling performance as a function of process demand and environmental stress to determine available cooling capacity that can be used for additional process production (e.g. cracking of crude, hot-day turbine output to prevent brown-outs) or identify cooling tower expansions. The variable process control system automatically adjusts cooling capacity when the industrial process is at part-load conditions (e.g. outage, off-peak, cold day, etc.)

The present invention is applicable to multi-cell cooling towers. In a multi-cell system, the speed of each fan in each cell is varied in accordance with numerous factors such as Computational Liquid Dynamic Analysis, thermal modeling, tower configuration, environmental conditions and process demand.

The core relationships upon which the system and method of the present invention are based are as follows:
  A) Mass airflow (ACFM) is directly proportional to fan RPM;
  B) Fan Static Pressure is directly proportional to the square of the fan RPM; and
  C) Fan Horsepower is directly proportional to the cube of the fan RPM.

The system of the present invention determines mass airflow by way of the operation of a permanent magnet motor. The variable process control system of the present invention includes a plurality of pressure devices that are located in the cooling tower plenum. The data signals provided by these pressure devices, along with the fan speed data from the VFD, fan pitch and the fan map, are processed by an industrial computer and used to determine the mass airflow in the fan cell.

The variable process control system of the present invention monitors cooling tower performance in real time and compares the performance data to design data in order to formulate a performance trend over time. It has been found that trending is the best predictor of performance and therefore can be used to modify and optimize the fan variable speed schedule, and plan and implement cooling tower service, maintenance and improvements as a function of process loading, such as hot day or cold day limitations, or selection of the appropriate fill to compensate for poor water quality. Long term trending is an improvement in true performance prediction as opposed to periodic testing which is done in prior art systems.

The present invention is a unique, novel, and reliable approach to determining cooling tower performance. The present invention uses fan horsepower and permanent magnet motor current draw (i.e. amperes) in conjunction with a measured plenum pressure. The measured plenum pressure equates to fan inlet pressure. The present invention uses key parameters measured by the system including measured plenum pressure in combination with the fan speed, known from the VFD (Variable Frequency Drive), and the design fan map to determine mass airflow and real time cooling performance. This system of the present invention is then used to recognize poor performance conditions and alert end-users to perform an inspection and identify the required corrective action. The plenum pressure is measured by a pressure device that is located in the fan deck.

The design criteria of the variable process control system of the present invention are based upon the thermal design of the tower, the process demand, environmental conditions and energy optimization. On the other hand, the prior art variable speed fan gearbox systems are applied without knowledge of the tower thermal capacity and are only controlled by the basin temperature set-point.

A very important feature of the permanent magnet motor of the present invention is that it may be used in new installations (e.g. new tower constructions or new fan assembly) or it can be used as a "drop-in" replacement. If the permanent magnet motor is used as a "drop-in" replacement, it will easily interface with all existing fan hubs and provide the required torque and speed to rotate all existing and possible fan configurations within the existing "installed" weight and fan height requirements.

The characteristics of the high, constant torque of the low variable speed permanent magnet motor of the present invention provide the flexibility of optimizing fan pitch for a given process demand.

The variable process control system of the present invention is programmed to operate based on the aforesaid criteria as opposed to prior art systems which are typically reactive to the basin temperature. Airflow generated by the variable process control system of the present invention is a function of fan blade pitch, fan efficiency and fan speed and is optimized for thermal demand (100% cooling) and energy consumption. Thermal demand is a function of the process. The variable process control system of the present invention anticipates cooling demand based upon expected seasonal conditions, historical and environmental conditions, and is designed for variable speed, autonomous operation with control and supervision.

Since the permanent magnet motor of the present invention delivers constant high torque throughout its variable speed range, the fan pitch is optimized for expected hot-day conditions (max cooling) and maximum efficiency based on the expected and historical weather patterns and process demand of the plant location. With the constant high-torque produced by the permanent magnet motor of the present invention, increased airflow is achieved with greater fan pitch at slower speeds thereby reducing acoustic signature or fan noise in sensitive areas.

The variable process control system of the present invention also provides capability for additional airflow or cooling for extremely hot days and is adaptive to changes in process demand. The variable process control system of the present invention can also provide additional cooling to compensate for loss of a cooling cell in a multi-cell tower. This mode of operation of the variable process control system is referred herein to the "Compensation Mode". In the Compensation Mode, the fan speed of the remaining cells is increased to produce the additional flow through the tower to compensate for the loss of cooling resulting from the lost cells. The variable process control system of the present invention is programmed not to increase the fan speed greater than the fan tip speed when compensating for the loss of cooling resulting from the loss cell. The compensation mode feature is designed and programmed into the variable process control system of the present invention based upon the expected loss of a cell and its location in the tower. The variable process control system of the present invention varies the speed of the fans in the remaining cells in accordance with the configuration, geometry and flow characteristic of the cooling tower and the effect each cell has on the overall cooling of the cooling tower. This provides the required cooling and manages the resultant energy consumption of the cooling tower. The variable process control system of the present invention manages the variable speed among cells thereby providing required cooling while optimizing energy consumption based upon the unique configuration and geometry of each cooling tower.

Operational characteristics of the variable process control system of the present invention include:

1) autonomous variable speed operation based on process demand, thermal demand, cooling tower thermal design and environmental conditions;
2) adaptive cooling that provides (a) regulated thermal performance based upon an independent parameter or signal such as lower basin temperature to improve cracking of heavier crude during a refining process, (b) regulated temperature control to accommodate steam turbine back-pressure in a power plant for performance and safety and (c) regulated cooling to prevent condenser fouling;
3) fan idle in individual cells of a multi-cell tower based on thermal demand and unique cooling tower design (i.e. fan idle) if thermal demand needs have been met;
4) real-time feedback;
5) operator override for stopping or starting the fan, and controlling basin temperature set-point for part-load operation;
6) uses fan speed, motor current, motor horsepower and plenum pressure in combination with environmental conditions such as wind speed and direction, temperature and wet-bulb temperature to measure and monitor fan airflow and record all operating data, process demand trend and environmental conditions to provide historical analysis for performance, maintenance actions, process improvements and expansions;
7) vibration control which provides 100% monitoring, control and supervision of the system vibration signature with improved signature fidelity that allows system troubleshooting, proactive maintenance and safer operation (post processing);
8) vibration control that provides 100% monitoring, control and supervision for measuring and identifying system resonances in real time within the variable speed range and then locking them out of the operating range;
9) vibration control that provides 100% monitoring, control and supervision for providing post processing of vibration signatures using an industrial computer and algorithms such as Fast Fourier Transforms (FFT) to analyze system health and provide system alerts to end users such as fan imbalance as well control signals to the DAQ (data acquisition) device in the case of operating issues such as impending failure;
10) provides for safe Lock-Out, Tag-Out (LOTO) of the fan drive system by controlling the deceleration of the fan and holding the fan at stop while all forms of energy are removed from the cell including cooling water to the cell so as to prevent an updraft that could cause the fan to windmill in reverse;
11) provides for a proactive maintenance program based on actual operating data, cooling performance, trending analysis and post processing of data using a Fast Fourier Transform to identify issues such as fan imbalance, impending fan hub failure, impending fan blade failure and provide service, maintenance and repair and replacement before a failure leads to a catastrophic event and loss of life, the cooling asset and production.
12) provides a predictive maintenance program based on actual operating data, cooling performance, trending analysis and environmental condition trending in order to provide planning for cooling tower maintenance on major cooling tower subsystems such as fill replacement and identify cooling improvements for budget creation and planning for upcoming outages;
13) monitoring capabilities that alert operators if the system is functioning properly or requires maintenance or an inspection;
14) operator may manually override the variable control system to turn fan on or off;
15) provides an operator with the ability to adjust and fine tune cooling based on process demand with maximum hot-day override;
16) monitors auxiliary systems, such as pumps, to prevent excessive amounts of water from being pumped into the tower distribution system which could cause collapse of the cooling tower;

17) continuously measures current process demand and environmental stress;

18) varies the fan speed in gradual steps as the variable process control system learns from past process cooling demand as a function season, time, date and environmental conditions to predict future process demand, wherein the variation of fan speed in gradual steps minimizes energy draw and system wear;

19) since the permanent magnet motor of the system of the present invention is not limited in reverse operation, regenerative drive options may be used to provide power to the grid when fans are windmilling in reverse;

20) automatic deicing; and 21) reverse operation wherein the permanent magnet motor has the same operational characteristics as in forward operation.

The permanent magnet motor and variable process control system of the present invention are applicable to wet-cooling tower systems, air-cooled heat exchangers (ACHE), HVAC, mechanical towers and chillers, regardless of mounting configuration.

In one aspect, the present invention is directed to a wet-cooling tower system comprising a direct drive fan system and an integrated variable process control system. The wet-cooling tower system comprises a wet-cooling tower that comprises a tower structure that has fill material located within the tower structure, a fan deck located above the fill material, and a collection basin located beneath the fill material for collecting cooled liquid. A fan stack is positioned upon the fan deck and a fan is located within the fan stack. The fan comprises a hub to which are connected a plurality of fan blades. The direct drive fan system comprises a high-torque, low variable speed permanent magnet motor which has a rotatable shaft connected to the hub. In one embodiment, the permanent magnet motor has a rotational speed between 0 RPM and about 250 RPM. In another embodiment, the permanent magnet motor is configured to have rotational speeds that exceed 500 RPM. The permanent magnet motor is sealed and comprises a rotor, a stator and a casing. The rotor and stator are located within the casing. The variable process control system comprises a variable frequency drive device is in electrical signal communication with the permanent magnet motor to control the rotational speed of the permanent magnet motor. The variable frequency drive device comprises a variable frequency controller that has an input for receiving AC power and an output for providing electrical signals that control the operational speed of the high-torque, permanent magnet motor, and a signal interface in electronic data signal communication with the variable frequency controller to provide control signals to the variable frequency controller so as to control the motor RPM and to provide output motor status signals that represent the motor speed, motor current draw, motor voltage, motor torque and the total motor power consumption. The variable process control system further comprises a data acquisition device in electrical signal communication with the signal interface of the variable frequency drive device for providing control signals to the variable frequency drive device and for receiving the motor status signals. The wet-cooling tower system further comprises a pair of vibration sensors that are in electrical signal communication with the data collection device. Each vibration sensor is located within the motor casing where it is protected from the environment and positioned on a corresponding motor bearing structure. As a result of the structure and design of the permanent magnet motor and the direct connection of the motor shaft to the fan hub, the resultant bearing system is stout (stiff and damped) and therefore results in a very smooth system with low vibration.

In comparison to the prior art, the vibration signature of the permanent magnet motor has a low amplitude with clear signature fidelity which allows for proactive service and maintenance and an improvement in safety and production. Trending of past cooling tower operation and post processing, vibration signal analysis (FFT) determines whether other vibration signatures are indicating such issues as a fan blade imbalance, fan blade pitch adjustment, lubrication issues, bearing issues and impending fan hub, fan blade and motor bearing failure, which are major safety issues. The location of the vibration sensors on the motor bearings also allows for programming of lower amplitude shut-off parameters.

As described in the foregoing description, the variable process control system of the present invention comprises a plurality of vibration sensors that may include accelerometers, velocity and displacement transducers or similar devices to monitor, supervise and control the vibration characteristics of the direct drive fan system and the direct-drive pump system that pumps water to and from the cooling tower.

The present invention has significantly less "frequency noise" because the present invention eliminates ladder frames, torque tubes, shafts, couplings, gearboxes and gearmesh that are commonly used in prior art systems. In accordance with the invention, vibration sensors are located at the bearings of the permanent magnet motor. Each vibration sensor outputs signals representing vibrations on the motor bearings. Thus, vibrations are read directly at the bearings that are directly coupled to the fan as opposed to the prior art technique of measuring the vibrations at the ladder frame. As a result of this important feature of the invention, the present invention can identify, analyze and correct for changes in the performance of the fan, thereby providing a longer running system that is relatively safer.

The variable process control system of the present invention further comprises a plurality of temperature sensors in electrical signal communication with the data collection device. Temperature sensors measure the temperature of the exterior of the motor casing or housing. Temperature sensors located within the casing of the motor to measure the temperature within the casing. Temperature sensors are located in the basin to measure temperature of liquid (e.g. water) within the basin. Temperature sensors also measure the environmental temperature (e.g. ambient temperature). Another temperature sensor measures the temperature of the air in the fan stack before the fan. The variable process control system of the present invention further includes at least one pressure sensor located in the fan deck that measures the pressure in the fan plenum, which equates to the pressure at the fan inlet. The variable process control system further comprises a computer in data signal communication with the data collection device. The computer comprises a memory and a processor to process the signals outputted by the vibration sensors, temperature sensors, pump flow and the motor status signals. The computer outputs control signals to the data collection device for routing to the variable frequency drive device in order to control the speed of the motor in response to the processing of the sensor signals.

The variable process control system of the present invention comprises a plurality of vibration sensors which may include accelerometers, velocity and displacement transducers or similar devices to monitor, supervise and control vibration characterisitics of the direct-drive fan and variable speed pump system. The aforesaid vibration sensors detect various regions of the motor and fan frequency band that are to be monitored and analyzed. The variable process control system also includes a leak detector probe for detecting leakage of gasses from heat exchanges and other equipment.

Some key features of the system of the present invention are:

1) reverse, de-ice, flying-start and soft-stop modes of operation with infinite control of fan speed in both reverse and forward directions;
2) variable process control, refining and power generation;
3) capability of part-load operation;
4) maintaining vacuum backpressure for a steam turbine and crude cracking;
5) prevents damage and fouling of heat exchangers, condensers and auxiliary equipment;
6) simplified installation using only four bolts and area classified quick disconnect communication cable and factory terminated power cable allow for "plug and play" installation;
7) line-replaceable units such as hazardous gas monitors, sensors, meter(s) or probes are integrated into the motor casing (or housing) to detect and monitor fugitive gas emissions in the fan air-steam accordance with the U.S. EPA (Environmental Protection Agency) regulations;
8) variable speed operation with low, variable speed capability;
9) cells in multi-cell tower can be operated independently to meet cooling and optimize energy;
10) 100% monitoring, autonomous control and supervision of the system;
11) automated and autonomous operation;
12) relatively low vibrations and high vibration fidelity due to system architecture and structure;
13) changes in vibration signals are detected and analyzed using trending data and post processing;
14) vibration sensors are integrated into the permanent magnet motor and thus protected from the surrounding harsh, humid environment;
15) uses a variable frequency drive (VFD) device that provides signals representing motor torque and speed;
16) uses DAQ (data acquisition) device that collects signals outputted by the VFD and other data signals;
17) uses a processor that processes signals collected by the DAQ device, generates control signals, routes control signals back to VFD and implements algorithms (e.g. FFT) to process vibration signals;
18) uses mechanical fan-lock that is applied directly to the shaft of the permanent magnet motor to prevent rotation of the fan when power is removed for maintenance and hurricane service;
19) uses a Lock-Out-Tag-Out (LOTO) procedure wherein the fan is decelerated to 0.0 RPM under power and control of the permanent magnet motor and VFD and the motor holds the fan at 0.0 RPM while a mechanical lock device is applied to the motor shaft to prevent rotation of the fan, and then all forms of energy are removed per OSHA Requirements for Service, Maintenance and Hurricane Duty (e.g. hurricane, tornado, shut-down, etc.);
20) produces regenerative power when the fan is windmilling;
21) the motor and VFD provide infinite control of the fan acceleration and can hold the fan at 0.0 RPM, and also provide fan deceleration and fan rotational direction;
22) allows fan to windmill in reverse due to cooling water updraft;
23) the permanent magnet motor can operate in all systems, e.g. wet-cooling towers, ACHEs, HVAC systems, chillers, blowers, etc.;
24) the permanent magnet motors directly drive the fan and pumps; and
25) the permanent magnet motor can be connected to a fan hub of a fan, or directly connected to a one-piece fan.

BRIEF DESCRIPTION OF THE DRAWINGS

Although the scope of the present invention is much broader than any particular embodiment, a detailed description of the preferred embodiments follows together with illustrative figures, wherein like reference numerals refer to like components, and wherein:

FIG. 12A is a side view, partially in cross-section, of the direct drive fan system of the present invention installed in a cooling tower;

FIG. 12B is a bottom view of the permanent magnet motor depicted in FIG. 12A, the view showing the mounting holes in the permanent magnet motor;

FIG. 22 is a side elevational view of the upper portion of the permanent magnet motor of FIGS. 4 and 5A, the permanent magnet motor having mounted thereto a caliper-type lock mechanism for engaging the upper portion of the shaft of the motor;

BEST MODE FOR CARRYING OUT THE INVENTION

As used herein, the terms "process", "plant process" or "industrial process" shall mean an industrial process such as a petroleum refinery, power plant, turbine, crude cracker, fertilizer plant, glass manufacturing plant, chemical plant, etc.

As used herein, the terms "process liquid" means the liquids, such as water or other coolant, that are used for cooling purposes in the process.

As used herein, the terms "process demand" or "process cooling demand" mean the amount of cooling liquids used by the process.

As used herein, the term "part-plant load" means process demand that is less than maximum process demand.

As used herein, the terms "basin temperature" or "collection basin temperature" mean the temperature of the water or other liquid that is in the collection basin of a wet-cooling tower;

As used herein, the term "Environmental Stress" shall mean, collectively, ambient temperature, relative humidity, dry-bulb temperature, wet-bulb temperature, wind speed, wind direction, solar gain and barometric pressure.

As used herein, the term "Cooling Tower Thermal Capacity" is the heat-rejection capability of the cooling tower. It is the amount of cold water that can be returned to the process for given temperature and flow rate at maximum hot-day and wet-bulb conditions. Cooling Tower Thermal Capacity will be reduced as the cooling tower components degrade, such as the fill material becoming clogged due to poor water quality. For a given ΔT (difference between temperatures of hot and cold water) and the flow rate, the cooling tower fans will have to operate at higher speed and for longer amounts of time given the environmental stress in a degraded tower (that is being monitored and trended).

As used herein, the term "process thermal demand" or "thermal demand" means the heat that has to be removed from the process liquid (e.g. water) by the cooling tower. In its simplest terms, thermal demand of the process is expressed as the water temperature from the process (hot water) and water temperature returned to the process (cold water) for a give flow rate;

As used herein, the terms "fan map" and "fan performance curve" represent the data provided for fan blades with a given solidity. Specifically, the data represents the airflow of air moved by a specific fan diameter, model and solidity for a given fan speed and pitch at a given temperature and wet-bulb (air density).

As used herein, the terms "trending" or "trend" means the collection of cooling tower parameters, events and calculated values with respect to time that define operating characteristics such as cooling performance as a function of environmental stress and Process Thermal Demand.

Figure 2:
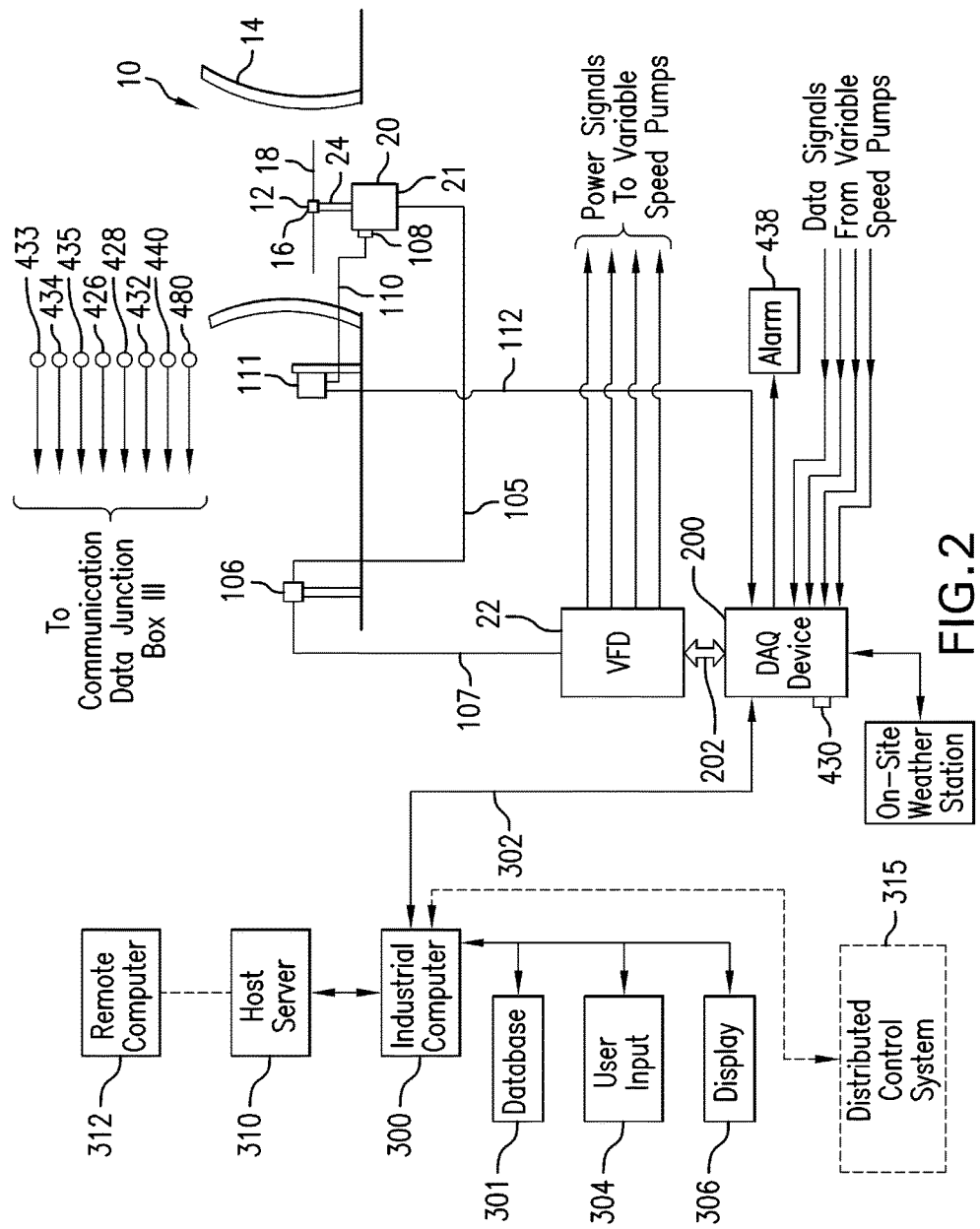
FIG. 2 is a block diagram of a variable process control system in accordance with one embodiment of the present invention, wherein the variable process control system controls the operation of a cooling tower.
Figure 4:
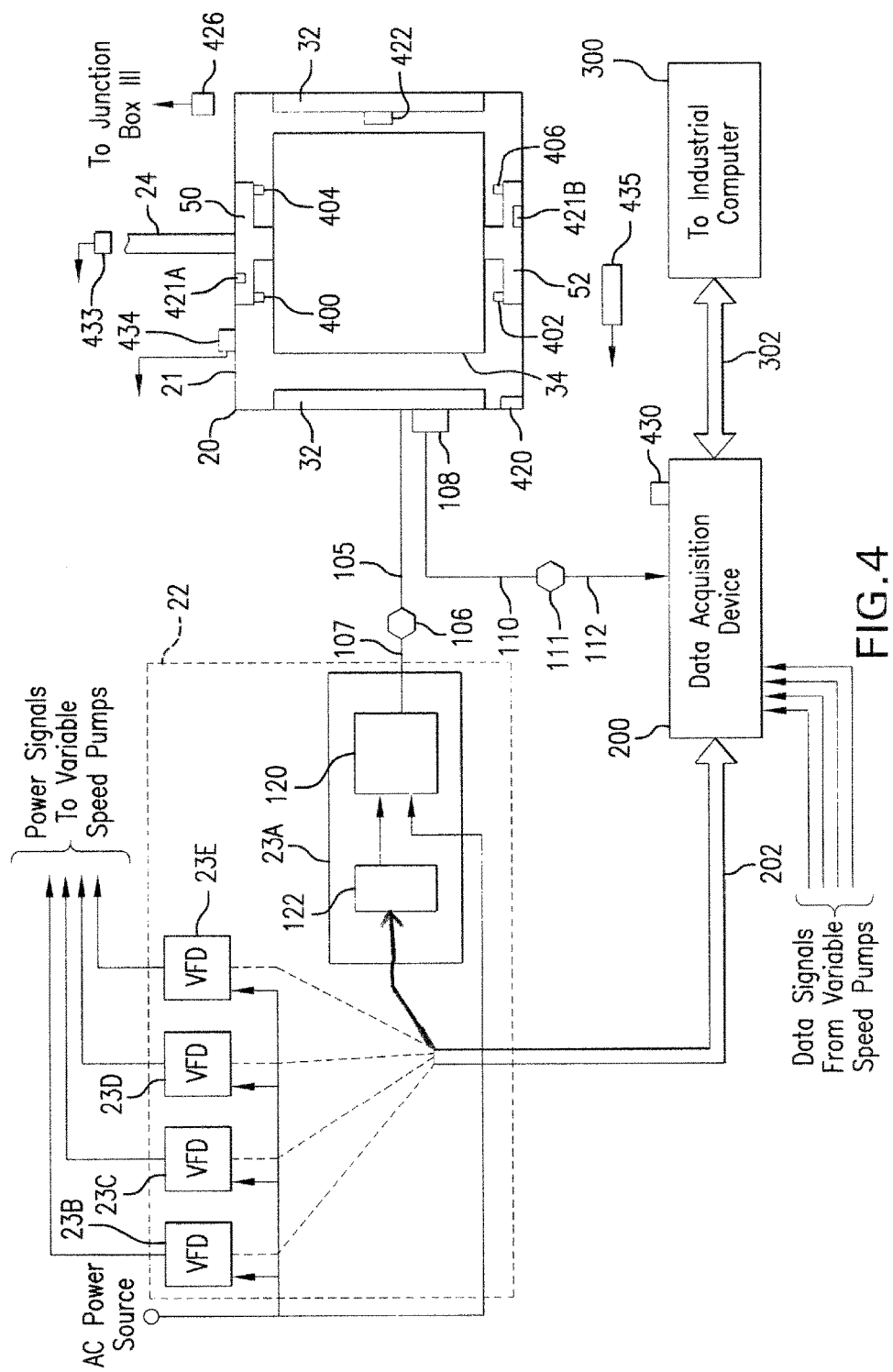
FIG. 4 is a block diagram illustrating the interconnection of the permanent magnet motor, data acquisition device and variable frequency drive device, all of which being shown in FIG. 2.

Referring to FIGS. 2 and 4, there is shown the variable process control system of the present invention for managing the operation of fans and pumps in cooling apparatus 10. Cooling apparatus 10 can be configured as a wet-cooling tower, induced draft air-cooled heat exchanger (ACHE), chiller or a HVAC system which are commonly used to cool liquids used in an industrial process, e.g. petroleum refinery, chemical plant, etc. One example of a wet-cooling tower is described in international application no. PCT/US2008/077338, published under international publication no. WO 2009/048736. The disclosure of international publication no. WO 2009/048736 is hereby incorporated by reference. The same wet-cooling tower is described in U.S. Pat. No. 8,111,028, the disclosure of which patent is hereby incorporated by reference. One example of an air-cooled heat exchanger (ACHE) is described in international application no. PCT/US2009/037242, published under international publication no. WO 2009/120522. The disclosure of international publication no. WO 2009/120522 is hereby incorporated by reference. The same type of air-cooled heat exchanger (ACHE) is disclosed in U.S. Pat. No. 8,188,698, the disclosure of which patent is hereby incorporated by reference. For purposes of describing the system of the present invention, cooling apparatus 10 is described as being a wet-cooling tower. An ACHE system is described later in the ensuing description. Cooling apparatus 10 comprises fan 12 and fan stack 14. As is known in the field, cooling towers may utilize fill material which is described in the aforementioned international publication no. WO 2009/048736. Fan 12 comprises hub 16 and a plurality of fan blades 18 that are connected to and extend from hub 16. The system of the present invention comprises permanent magnet motor 20. Motor 20 comprises motor housing or casing 21A (see FIG. 4). Casing comprises top cover 21A and bottom cover 21B. Motor further comprises rotatable shaft 24. Motor shaft 24 is directly connected to fan hub 16. The connection of motor shaft 24 to fan hub 16 is described in detail in the ensuing description.

Referring to FIG. 2, power cable 105 has one end that is terminated at motor 20. Specifically, power cable 105 is factory sealed to Class One, Division Two, Groups B, C and D specifications and extends through the motor housing 21 and is terminated within the interior of motor housing 21 during the assembly of motor 20. Therefore, when installing motor 20 in a cooling apparatus, it is not necessary for technicians or other personnel to electrically connect power cable 105 to motor 20. The other end of power cable 105 is electrically connected to motor disconnect junction box 106. Power cable 105 is configured as an area classified, VFD rated and shielded power cable. Motor disconnect junction box 106 includes a manual emergency shut-off switch. Motor disconnect junction box 106 is primarily for electrical isolation. Power cable 105 comprises three wires that are electrically connected to the shut-off switch in motor-disconnect junction box 106. Power cable 107 is connected between the shut-off switch in motor-disconnect junction box 106 and VFD device 22. Power cable 107 is configured as an area classified, VFD rated and shielded power cable. The electrical power signals generated by VFD device 22 are carried by power cable 107 which delivers these electrical power signals to junction box 106. Motor power cable 105 is connected to power cable 107 at junction box 106. Thus, motor power cable 105 then provides the electrical power signals to motor 20.

Referring to FIGS. 2 and 4, quick-disconnect adapter 108 is connected to motor housing 21. In one embodiment, quick-disconnect adapter 108 is a Turck Multifast Right Angle Stainless Connector with Lokfast Guard, manufactured by Turck Inc. of Minneapolis, Minn. The sensors internal to motor housing 21 are wired to quick-disconnect adapter 108. Cable 110 is connected to quick-disconnect adapter 108 and to communication data junction box 111. Communication data junction box 111 is located on the fan deck. The electronic components in communication data junction box 111 are powered by a voltage source (not shown). Cable 110 is configured as an area-classified multiple connector shielded flexible control cable. Cable 112 is electrically connected between communication data junction box 111 and data acquisition device 200 (referred to herein as "DAQ device 200"). In one embodiment, cable 112 is configured as an Ethernet cable. As described in the foregoing description, VFD device 22 is in data communication with Data Acquisition Device (DAQ) device 200. VFD device 22 and DAQ device 200 are mounted within Motor Center Enclosure 26 (see FIGS. 2 and 4). A Motor Control Enclosure typically is used for a single motor or fan cell. The MCE 26 is typically located on the fan deck in close proximity to the motor. The MCE 26 houses VFD device 22, DAQ device 200, industrial computer 300 and the power electronics. In one embodiment, MCE 26 is a NEMA 4× Rated Cabinet. VFD device 22 and DAQ device 200 are discussed in detail in the ensuing description.

Figure 5A:
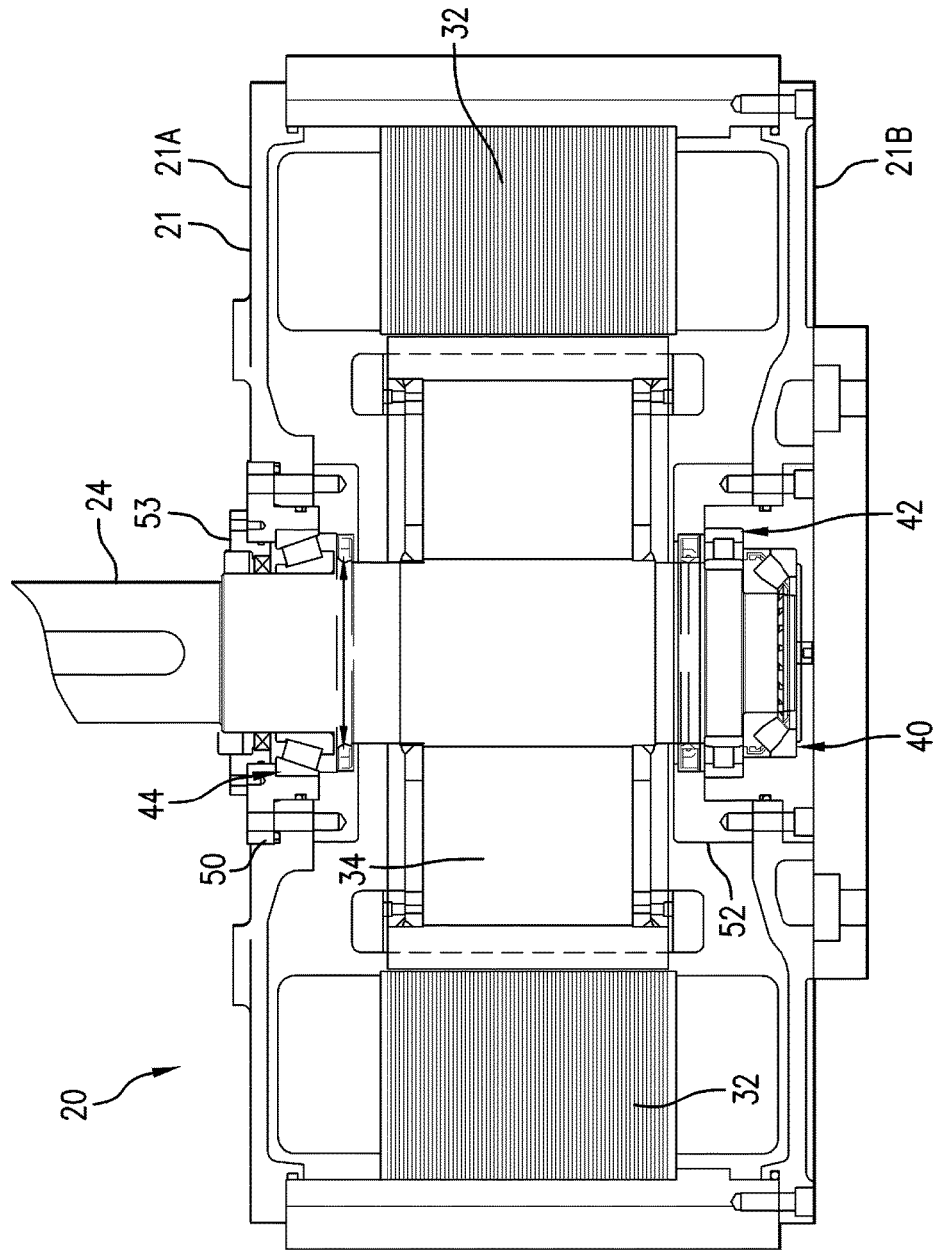
FIG. 5A is a diagram showing the internal configuration of a permanent magnet motor shown in FIG. 4, the diagram specifically showing the location of the bearings of the permanent magnet motor.
Figure 6:
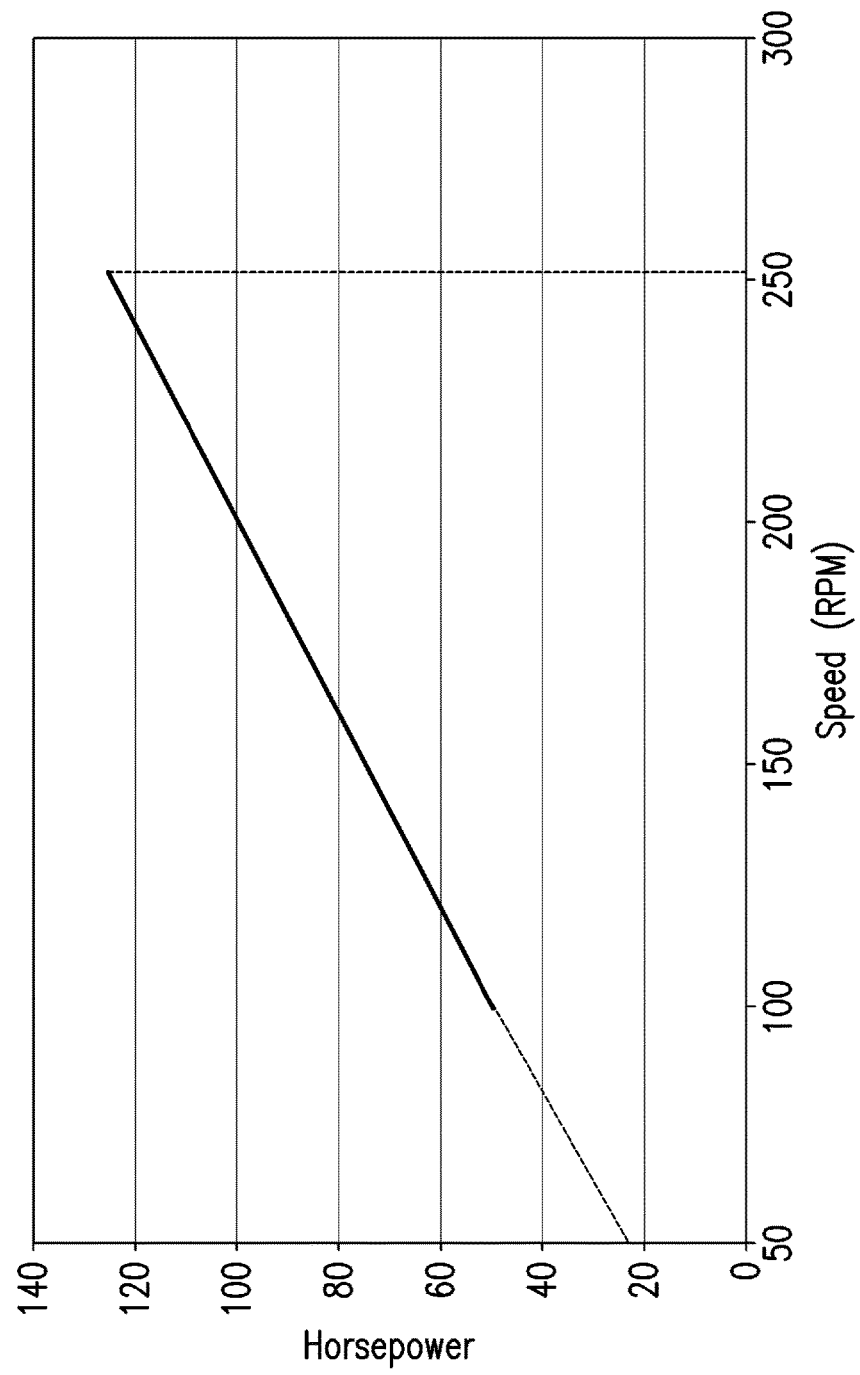
FIG. 6 is a plot of motor speed versus horsepower for a high torque, low speed permanent magnet motor used in direct drive fan system of the present invention.
Figure 7:
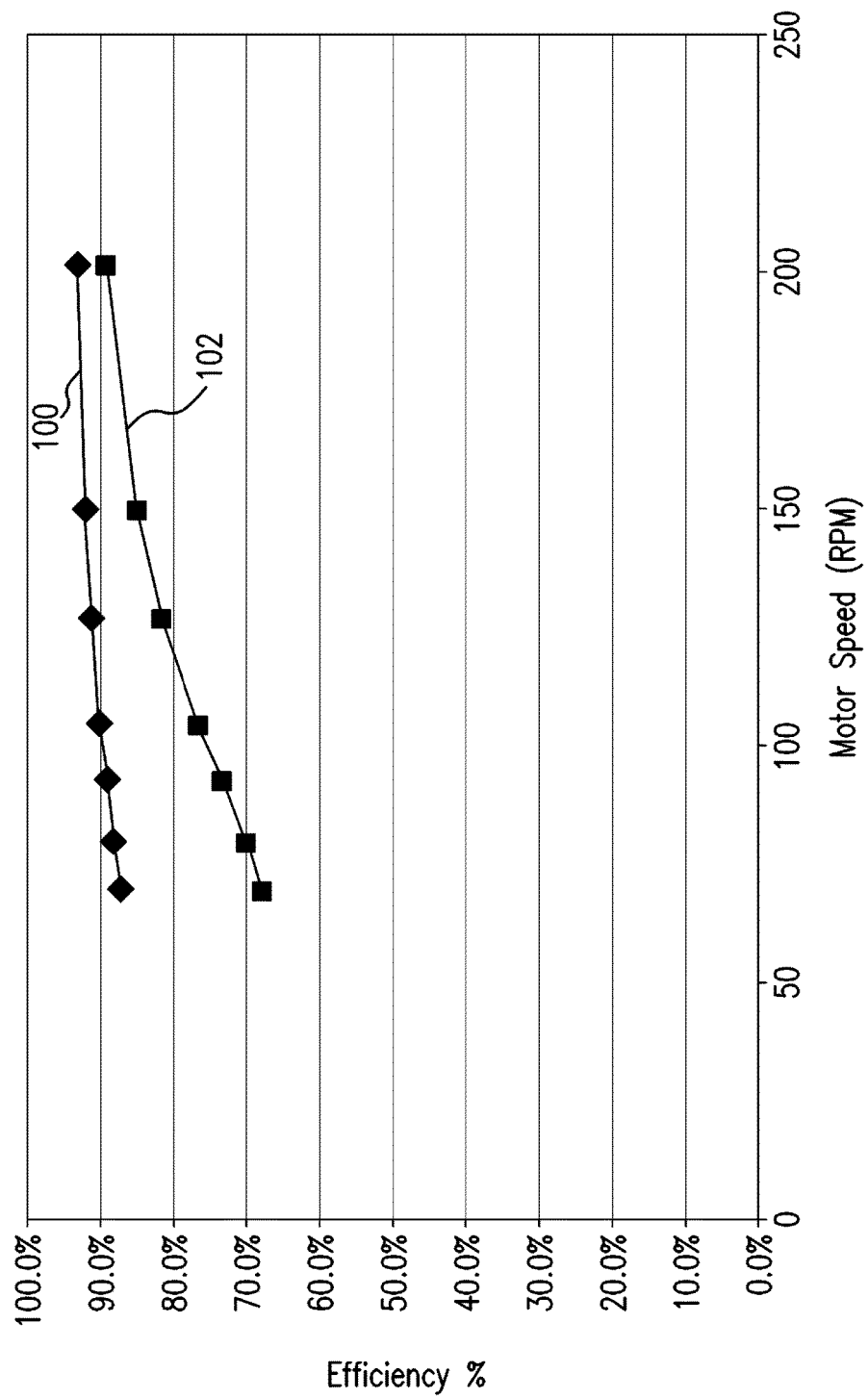
FIG. 7 is a graph illustrating a comparison in performance between the fan drive system of the present invention and a prior art gearbox-type fan drive system that uses a variable speed induction motor.

Referring to FIGS. 4 and 5A, the fan drive system of the present invention comprises high torque, low variable speed, permanent magnet motor 20. The fan drive system of the present invention is a direct drive system. Specifically, motor 20 is directly connected to the fan hub 16. Thus, permanent magnet motor 20 directly drives fan 12 without the loss characteristics and mechanical problems typical of prior art gearbox drive systems. Permanent magnet motor 20 has a high flux density. Permanent magnet motor 20 is controlled only by electrical signals provided by VFD device 22. Thus, there are no drive shaft, couplings, gear boxes or related components which are found in the prior art gearbox-type fan drive systems. Permanent magnet motor 20 includes stator 32 and rotor 34. Permanent magnet motor 20 further comprises spherical roller thrust bearing 40 which is located at the lower end of motor shaft 24. Spherical roller thrust bearing 40 absorbs the thrust load caused by the weight of fan 12 and fan thrust forces due to airflow. Permanent magnet motor 20 further comprises cylindrical roller bearing 42 which is located immediately above spherical roller thrust bearing 40. Cylindrical roller bearing 42 opposes radial loads at the thrust end of shaft 24. Radial loads are caused by fan assembly unbalance and yaw moments due to unsteady wind loads. Motor 20 further comprises tapered roller output bearing 44. Tapered roller output bearing 44 is configured to have a high radial load capability coupled with thrust capability to oppose the relatively low reverse thrust loads that occur during de-icing (reverse rotation) or high wind gust. Although three bearings are described, motor 20 is actually a two-bearing system. The "two bearings" are cylindrical roller bearing 42 and tapered roller output bearing 44 because these two bearings are radial bearings that locate and support the shaft relative to motor casing housing 21 and the mounting structure. Spherical roller thrust bearing 40 is a thrust bearing, which is specifically designed so that it does not provide any radial locating forces, but only axial location. Such a unique motor design is less complex than current art motors but yet provides relatively high reliability as well as reverse operation and improved cost-effective motor operation. The design of motor 20 has a reduced Life-Cycle Cost (LCC) as compared to the prior art gearbox fan drive systems described in the foregoing description. Bearing housing 50 houses bearing 44. Bearing housing 52 houses bearings 40 and 42. Bearing housings 50 and 52 are isolated from the interior of motor housing 21 by nitrile rubber, double lip-style radial seals. The combination of the low surface speed of the motor shaft and synthetic lubricant results in accurate predicted seal reliability and life. Motor 20 includes seal housing 53 which houses an Inpro™ seal bearing isolator. The motor shaft seal comprises an Inpro™ seal bearing isolator in tandem with a double radial lip seal. The Inpro™ seal bearing isolator is mounted immediately outboard of the double radial lip seal. The function of the Inpro™ seal is to seal the area where shaft 24 penetrates top cover 21A of motor casing 21. The double radial lip seal excludes moisture and solid contaminants from the seal lip contact. In one embodiment, permanent magnet motor 20 has the following operational and performance characteristics:

Speed Range: 0-250 RPM
Maximum Power: 133 hp/100 KW
Number of Poles: 16
Motor Service Factor: 1:1
Rated Current: 62 A (rms)
Peak Current: 95 A
Rated Voltage: 600 V
Drive Inputs: 460 V, 3 phase, 60 Hz, 95 A (rms max. continuous)
Area Classification: Class 1, Division 2, Groups B, C, D
Insulation Class H Permanent magnet motor 20 can be configured to have different operational characteristics. However, it is to be understood that in all embodiments, motor 20 is designed to the requirements of Class 1, Div. 2, Groups B, C and D. FIG. 6 shows a plot of speed vs. horsepower for motor 20. However, it is to be understood that the aforesaid operational and performance characteristics just pertain to one embodiment of permanent magnet motor 20 and that motor 20 may be modified to provide other operational and performance characteristics that are suited to a particular application. Referring to FIG. 7, there is shown a graph that shows "Efficiency %" versus "Motor Speed (RPM)" for motor 20 and a prior art fan drive system using a variable speed, induction motor. Curve 100 pertains to motor 20 and curve 102 pertains to the prior art fan drive system. As can be seen in the graph, the efficiency of motor 20 is relatively higher than the prior art fan drive system for motor speeds between about 60 RPM and about 200 RPM.

Motor 20 has relatively low maintenance with a five year lube interval. The design and architecture of motor 20 substantially reduces the man-hours associated with service and maintenance that would normally be required with a prior art, induction motor fan drive system. The bearing L10 life is calculated to be 875,000 hours. In some instances, motor 20 can eliminate up to 1000 man-hours of annual service and maintenance in a cooling tower.

In an alternate embodiment, motor 20 is configured with auto-lube grease options as well as grease fittings depending on the user. A typical prior art gearbox system has many moving parts, typically five rotating shafts, eight bearings, three shaft seals, four gears and two meshes. The open lubrication design of typical prior art gearbox systems is not suited for cooling tower service since the open lubrication system becomes contaminated from the chemicals, humidity and biological contamination in the cooling tower. The design and structure of motor 20 eliminates these problems of prior art gearbox systems. Motor 20 eliminates shaft, coupling and related drive-train vibrations, torsional resonance and other limitations typically found in prior art drive systems and also eliminates the need for sprag-type clutches typically used to prevent opposite rotation of the fans. Motor 20 eliminates widely varying fan-motor power consumption problems associated with prior art gearboxes due to frictional losses caused by mechanical condition, wear and tear, and impact of weather on oil viscosity and other mechanical components. The high, constant torque of motor 20 produces the required fan torque to accelerate the fan through the speed range.

Referring to FIGS. 2, 4 and 5A, shaft 24 of permanent magnet motor 20 rotates when the appropriate electrical signals are applied to permanent magnet motor 20. Rotation of shaft 24 causes rotation of fan 12. VFD device 22 comprises a plurality of independently controlled programmable variable frequency drive (VFD) devices 23A, 23B, 23C, 23D and 23E (see FIG. 26). VFD device 23A controls motor 20. The remaining VFD devices control the permanent magnet motors in the variable speed pumps (see FIG. 26). DAQ device 200 provides control signals to each of the VFD devices 23A, 23B, 23C, 23D and 23E. These features are discussed later in the ensuing description. VFD device 23A provides the appropriate electrical power signals to motor 20 via cables 107 and 105. There is two-way data communication between VFD device 22 and DAQ device 200. DAQ device 200 comprises a controller module which comprises a computer and/or microprocessor having computer processing capabilities, electronic circuitry to receive and issue electronic signals and a built-in keyboard or keypad to allow an operator to input commands. In one embodiment, DAQ device 200 comprises a commercially available CSE Semaphore TBox RTU System that comprises a data acquisition system, computer processors, communication modules, power supplies and remote wireless modules. The CSE Semaphore TBox RTU System is manufactured by CSE Semaphore, Inc. of Lake Mary, Fla. In a preferred embodiment, the CSE Semaphore TBox RTU System is programmed with a commercially available computer software packages known as Dream Report™ and TView™ which analyze collected data. In an alternate embodiment, the CSE Semaphore TBox RTU System is programmed with a commercially available software known as TwinSoft™. In DAQ device 200 is described in detail in the ensuing description. VFD device 22 comprises a variable frequency controller 120 and signal interface 122. VFD device 22 controls the speed and direction (i.e. clockwise or counterclockwise) of permanent magnet motor 20. AC voltage signals are inputted into variable frequency controller 120 via input 124. Variable frequency controller 120 outputs the power signals that are inputted into motor 20 via power cables 107 and 105. Referring to FIG. 4, signal interface 122 is in electrical signal communication with DAQ device 200 via data signal bus 202 and receives signals to start, reverse, accelerate, decelerate, coast, stop and hold motor 20 or to increase or decrease the RPM of motor 20. In a preferred embodiment, signal interface 122 includes a microprocessor. Signal interface 122 outputs motor status signals over data bus 202 for input into DAQ device 200. These motor status signals represent the motor speed (RPM), motor current (ampere) draw, motor voltage, motor power dissipation, motor power factor, and motor torque.

VFD device 23A measures motor current, motor voltage and the motor power factor which are used to calculate energy consumption. VFD device 23A also measures motor speed, motor power and motor torque. VFD device 23A also measures Run Time/Hour Meter in order to provide a time stamp and time-duration value. The time stamp and time-duration are used by industrial computer 300 for failure and life analysis, FFT processing, trending, and predicting service maintenance. Industrial computer 300 is discussed in detail in the ensuing description.

Figure 26:
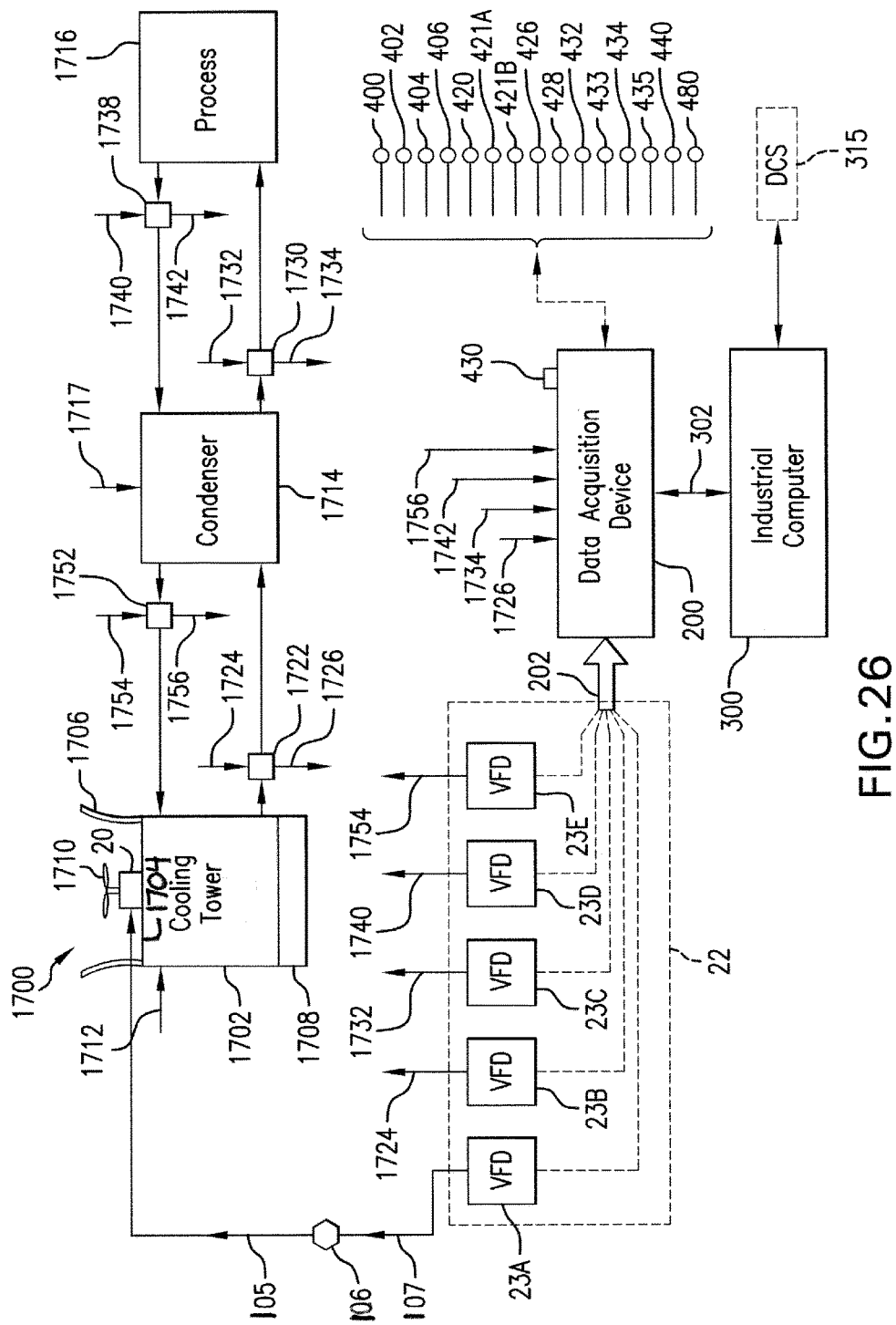
FIG. 26 is a block diagram of the permanent magnet motor and variable process control system of the present invention used with a wet-cooling tower that is part of an industrial process.

Referring to FIGS. 4 and 26, VFD devices 23B, 23C, 23D and 23E outputs electrical power signals 1724, 1732, 1740 and 1754, respectively, for controlling the variable speed pumps 1722, 1730, 1738 and 1752, respectively, that pump liquid (e.g. water) to and from the cooling tower. This aspect of the present invention is discussed in detail in the ensuing description.

In one embodiment, each of the VFD devices is configured as an ABB-ACS800 VFD manufactured by ABB, Inc.

Figure 8:
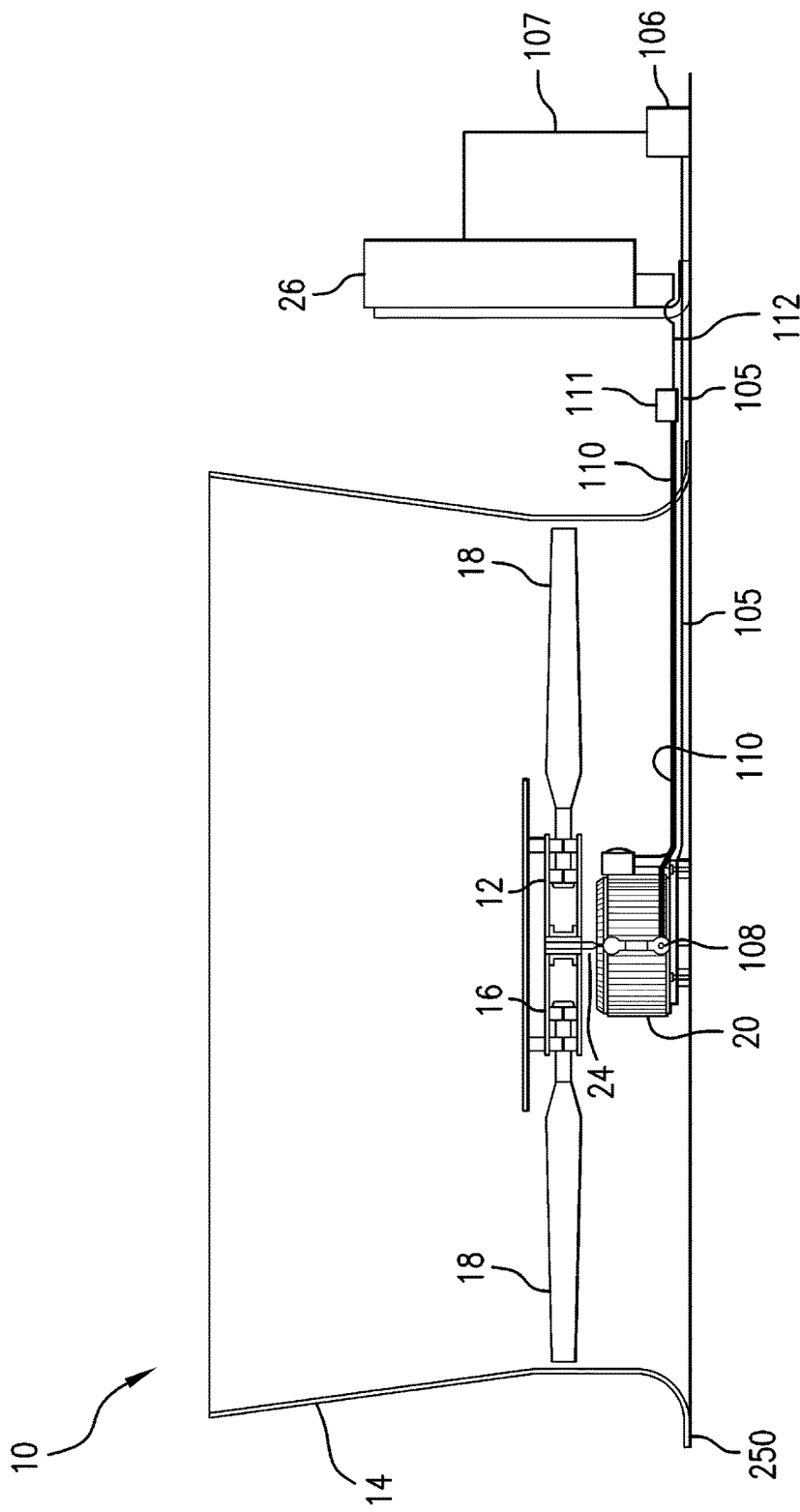
FIG. 8 is a side view, in elevation and partially in cross-section, of a wet-cooling tower employing the direct drive fan system of the present invention.

Referring to FIG. 8, there is shown a partial view of a cooling tower 10 that utilizes the direct drive fan system of the present invention. In this embodiment, cooling tower 10 comprises a wet-cooling tower. The wet-cooling tower comprises fan 12, fan stack 14, fan hub 16, and fan blades 18, all of which were discussed in the foregoing description. Fan stack 14 is supported by fan deck 250. Fan stack 14 can be configured to have a parabolic shape or a cylindrical (straight) shape as is well known in the field. Motor 20 is supported by a metal frame or ladder frame or torque tube that spans across a central opening (not shown) in fan deck 250. Motor shaft 24 is configured as a keyed shaft and is directly connected to fan hub 16 (see FIG. 14). Power cables 105 and 107, motor-disconnect junction box 106 and quick-disconnect connector 108 were previously discussed in the foregoing description. Power cable 107 is connected between motor-disconnect junction box 106 and variable frequency controller 120 of VFD device 22 (see FIGS. 2 and 4) which is located inside MCE 26. Referring to FIGS. 2, 4 and 8, cable 110 is electrically connected between quick-disconnect adapter 108 and communication data junction box 111. These signals are fed to the DAQ device 200 located in MCE 26 via cable 112 as described in the foregoing description. Industrial computer 300 is also located within MCE 26.

Figure 10:
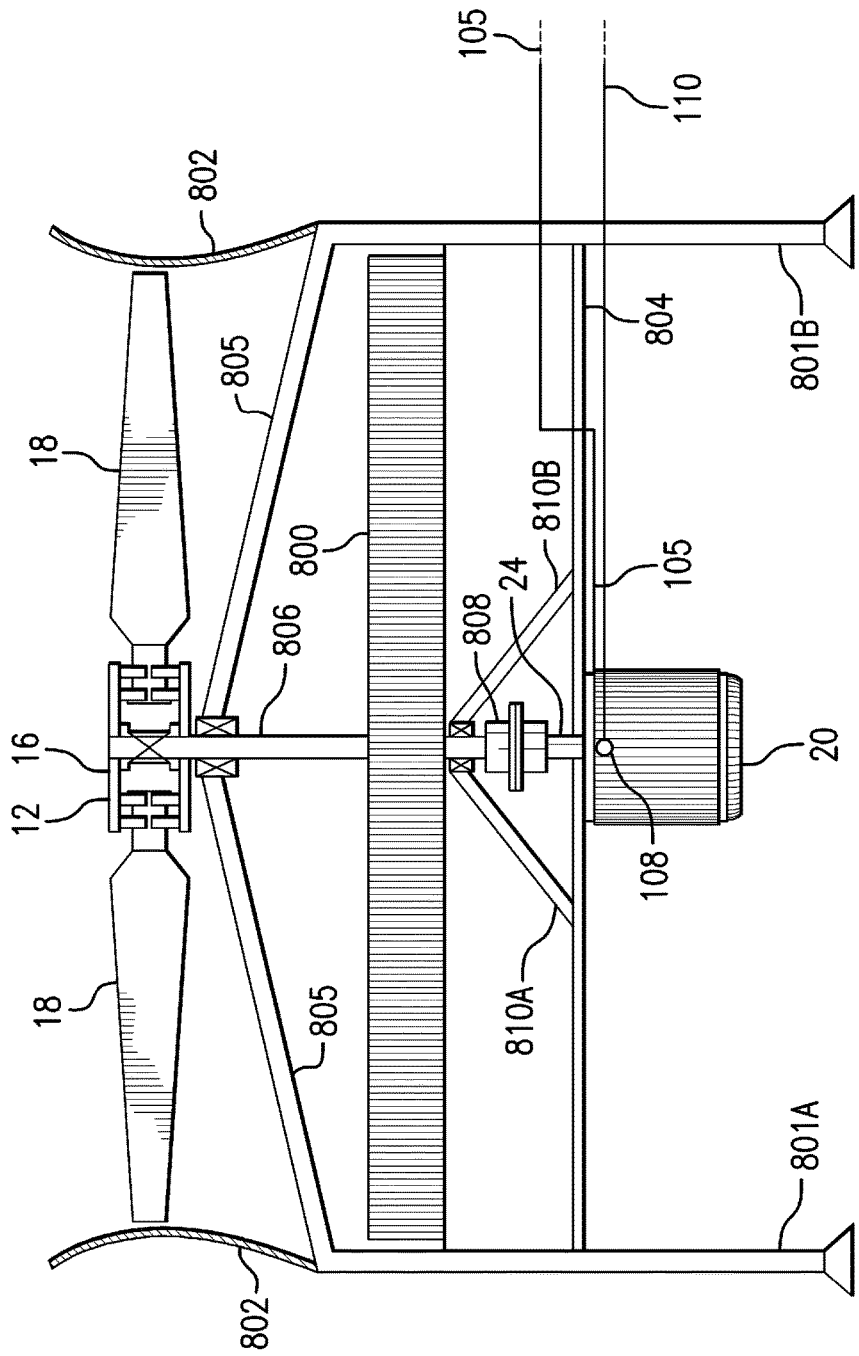
FIG. 10 is a side view, in elevation and partially in cross-section, of an ACHE that utilizes the direct drive fan system of the present invention.

Referring to FIG. 10, there is shown an air-cooled heat exchanger (ACHE) that utilizes the direct drive fan system of the present invention. This particular ACHE is an induced-draft ACHE. The remaining portion of the ACHE is not shown since the structure of an ACHE is known in the art. The ACHE comprises tube bundle 800, vertical support columns 801A and 801B, parabolic fan stack 802, horizontal support structure 804, support members 805 and fan assembly 12. Fan assembly 12 comprises fan hub 16 and fan blades 18 that are attached to fan hub 16. Vertical shaft 806 is connected to fan hub 16 and coupled to motor shaft 24 with coupling 808. Motor 20 is connected to and supported by horizontal member 804. Additional structural supports 810A and 810B add further stability to motor 20. As described in the foregoing description, one end of power cable 105 is terminated at motor 20 and the other end of power cable 105 is electrically connected to the motor disconnect junction box 106. Power cable 107 is connected between motor disconnect junction box 106 and VFD device 22. As described in the foregoing description, cable 110 is electrically connected between quick-disconnect adapter 108 and communication data junction box 111, and cable 112 is electrically connected between communication data junction box 111 and DAQ device 200. VFD device 22 and DAQ device 200 are mounted within a Motor Control Enclosure (MCE) which is not shown in FIG. 10 but which was described in the foregoing description.

Referring to FIG. 2, the system of the present invention further comprises industrial computer 300. Industrial computer 300 is always co-located with DAQ device 200. Industrial computer 300 is in data communication with data bus 302. Data bus 302 is in data communication with DAQ device 200. Industrial computer 300 is responsible for post-processing of performance data of the cooling tower and the system of the present invention. Included in this post-processing function are data logging and data reduction. Industrial computer 300 is programmed with software programs, an FFT algorithm and other algorithms for processing system performance data, environmental data and historical data to generate performance data reports, trend data and generate historical reports based on performance data it receives from DAQ device 200. Industrial computer 300 also stores data inputted by the operators through the plant DCS 315. Such stored data includes fan maps, fan pitch, Cooling Tower Design Curves, and Thermal Gradient analysis data. The wet-bulb temperature data is continually calculated from relative humidity and ambient temperature and is inputted into industrial computer 300. User input 304 (e.g. keyboard) 304 and display 306 (e.g. display screen) are in data signal communication with industrial computer 300. An operator uses user input 304 to input commands into industrial computer 300 to generate specific types of processed data. Industrial computer 300 displays on display 306 real-time data relating to the operation of the cooling tower and the system of the present invention, including motor 20. Industrial computer 300 is also used to program new or revised data into DAQ device 200 in response to changing conditions such as variable process demand, motor status, fan condition, including fan pitch and balance, and sensor output signals. The sensor output signals are described in the ensuing description. In a preferred embodiment, industrial computer 300 is in data signal communication with host server 310. Host service 310 is in data signal communication with one or more remote computers 312 that are located at remote locations in order to provide off-site monitoring and analysis. Industrial computer 300 is also in data signal communication with the plant Distributed Control System (DCS) 315, shown in phantom in FIGS. 2 and 3. Users or operators can input data into DCS 315 including revised temperature set-points, or revised pump flow rates or even change the plant load setting from full plant load to part-plant load. This revised information is communicated to industrial computer 300 which then routes the information to DAQ device 200. DAQ device 200 and industrial computer 300 provide real-time cooling performance monitoring, real-time condition fault monitoring and autonomous control of fan speed.

In a preferred embodiment, industrial computer 300 receives continuous weather data from the national weather surface or NOAA. Industrial computer 300 can receive this data directly via an Internet connection or it can receive the data via host server 310. Industrial computer 300 converts such weather data to a data form that can be processed by DAQ device 200. In a preferred embodiment, as shown in FIG. 2, the variable process control system of the present invention further comprises on-site weather station 316 which is in data signal communication with the Internet and DAQ device 200. On-site weather station 316 comprises components and systems to measure parameters such as wind speed and direction, relative humidity, ambient temperature, barometric pressure and wet-bulb temperature. These measured parameters are used by industrial computer 300 to determine Cooling Tower Thermal Capacity and also to determine the degree of icing on the tower. These measure parameters are also used for analysis of the operation of the cooling tower. On-site weather station 316 also monitor's weather forecasts and issues alerts such as high winds, freezing rain, etc.

In one embodiment, the VFD device 22, DAQ device 200, industrial computer 300 and power electronics are located in MCE 26. The Distributed Control System (DCS) 315 is integrated with industrial computer 300 at MCE 26. Operators would be able to log onto industrial computer 300 for trending information and alerts. DAQ device 200 automatically generates and issues alerts via email messages or SMS text messages to multiple recipients, including the Distributed Control System (DCS), with attached documents and reports with live and historical information as well as alarms and events.

In one embodiment, industrial computer 300 is programmed to allow an operator to shut down or activate the direct drive fan system from a remote location.

Referring to FIGS. 2 and 4, VFD device 22 controls the speed, direction and torque of fan 12. DAQ device 200 is in electrical signal communication with VFD device 22 and provides signals to the VFD device 22 which, in response, outputs electrical power signals to motor 20 in accordance with a desired speed, torque and direction. Specifically, the DAQ device 200 generates control signals for VFD device 22 that define the desired fan speed (RPM), direction and torque of motor 20. DAQ device 200 is also programmed to issue signals to the VFD device 22 to operate the fan 12 in a normal mode of operation referred to herein as "energy optimization mode". This "energy optimization mode" is described in detail in the ensuing description. When acceleration of motor 20 is desired, DAC device 200 outputs signals to VFD device 22 that define a programmed rate of acceleration. Similarly, when deceleration of motor 20 is desired, DAQ device 200 outputs signals to VFD device 22 that define a programmed rate of deceleration. If it is desired to quickly decrease the RPM of motor 20, DAQ device 200 outputs signals to VFD device 22 that define a particular rate of deceleration that continues until the motor comes to a complete stop (e.g. 0.0 RPM).

Figure 3:
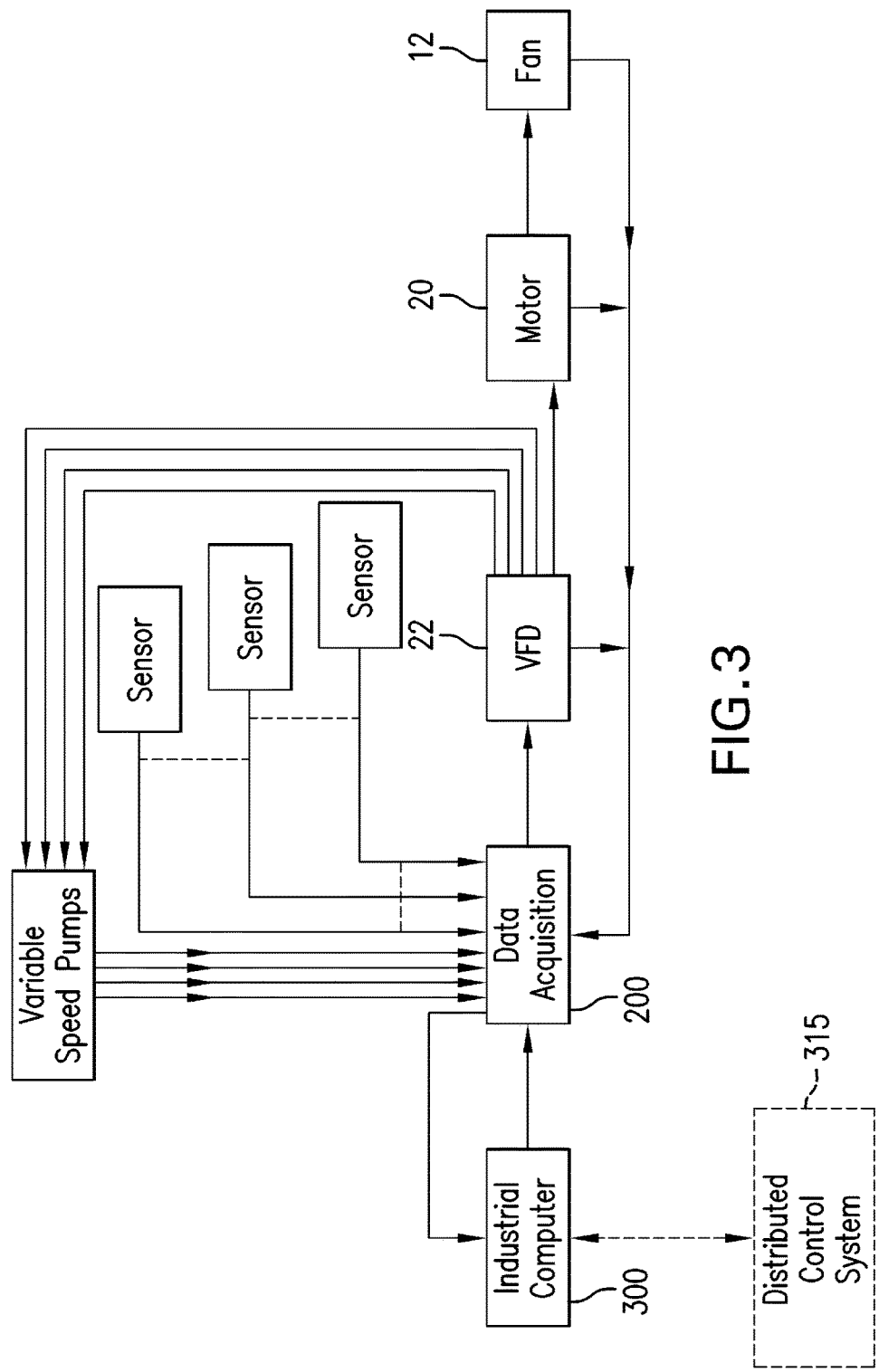
FIG. 3 is a diagram of the feedback loops of the system of FIG. 2.

DAQ device 200 provides several functions in the system of the present invention. DAQ device 200 receives electronic data signals from all sensors and variable speed pumps (discussed in the ensuing description). DAQ device 200 also continuously monitors sensor signals sent to the aforesaid sensors to verify that these sensors are working properly. DAQ device 200 is programmed to issue an alert is there is a lost sensor signal or a bad sensor signal. DAQ device 200 automatically adjusts the RPM of motor 20 in response to the sensor output signals. Accordingly, the system of the present invention employs a feedback loop to continuously adjust the RPM of motor 20, and hence fan 12, in response to changes in the performance of the fan, cooling tower characteristics, process load, thermal load, pump flow-rate and weather and environmental conditions. A diagram of the feedback loop is shown in FIG. 3. DAQ device 200 is programmable and can be programmed with data defining or representing the tower characteristics, trend data, geographical location of the cooling tower, weather and environmental conditions. DAQ device 200 is configured with internet compatibility (TCP/IP compatibility) and automatically generates and issues email messages or SMS text messages to multiple recipients, including the Distributed Control System (DCS), with attached documents and reports with live and historical information as well as alarms and events. In a preferred embodiment, DAQ device 200 comprises multiple physical interfaces including Ethernet, RS-232, RS-485, fiber optics, Modbus, GSM/GPRS, PSTN modem, private line modem and radio. Preferably, DAQ device 200 has SCADA compatibility. In one embodiment, DAQ device 200 is configured as a commercially available data acquisition system. In an alternate embodiment, DAQ device 200 is configured to transmit data to industrial computer 300 via telemetry signals.

Referring again to FIG. 3, the feedback loops effect continuous monitoring of the operation of motor 20, fan 12 and the variable speed pumps and also effect automatic adjustment of the RPM of motor 20 and of the permanent magnet motors in the variable speed pumps (see FIG. 26). The feedback loops shown in FIG. 3 allows motor 20 to be operated in any one of a plurality of modes of operation which are discussed in the ensuing description.

Flying Start Mode

Figure 16A:
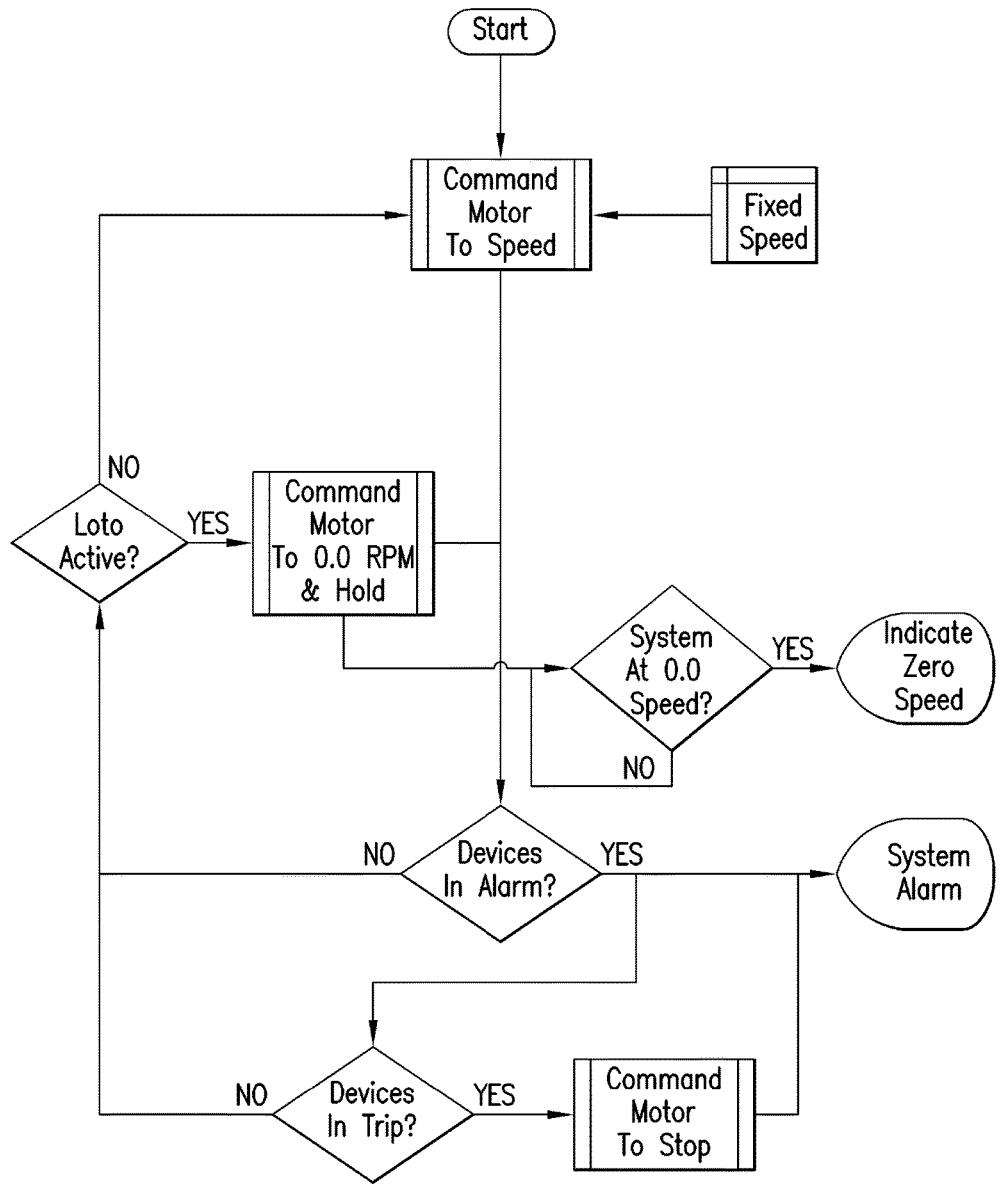
FIG. 16A is a flowchart of a lock-out-tag-out (LOTO) procedure used to stop the fan in order to conduct maintenance procedures.
Figure 16B:
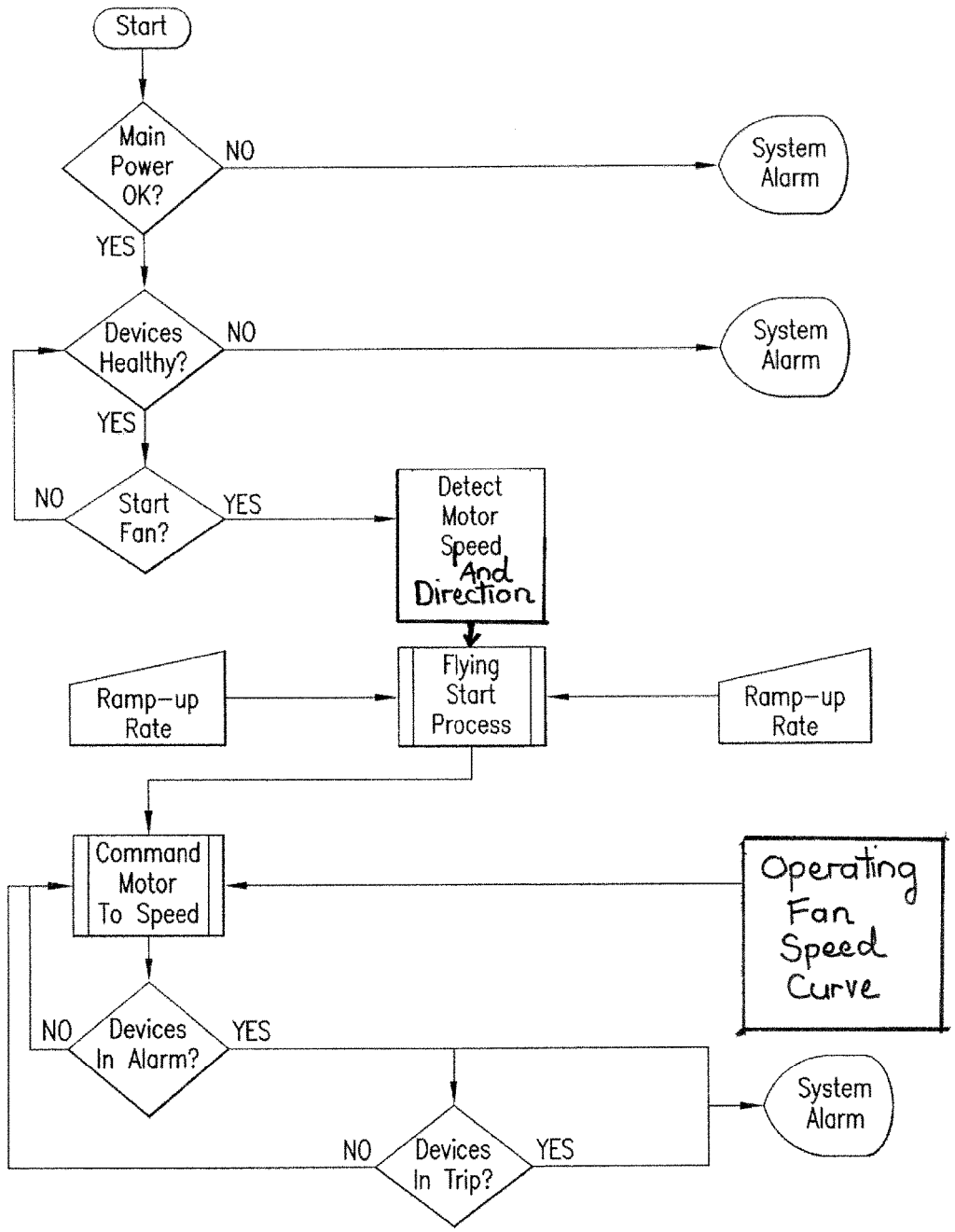
FIG. 16B is a flow chart a Flying-Start mode of operation that can be implemented by the permanent magnet motor and variable process control system of the present invention.
Figure 16C:
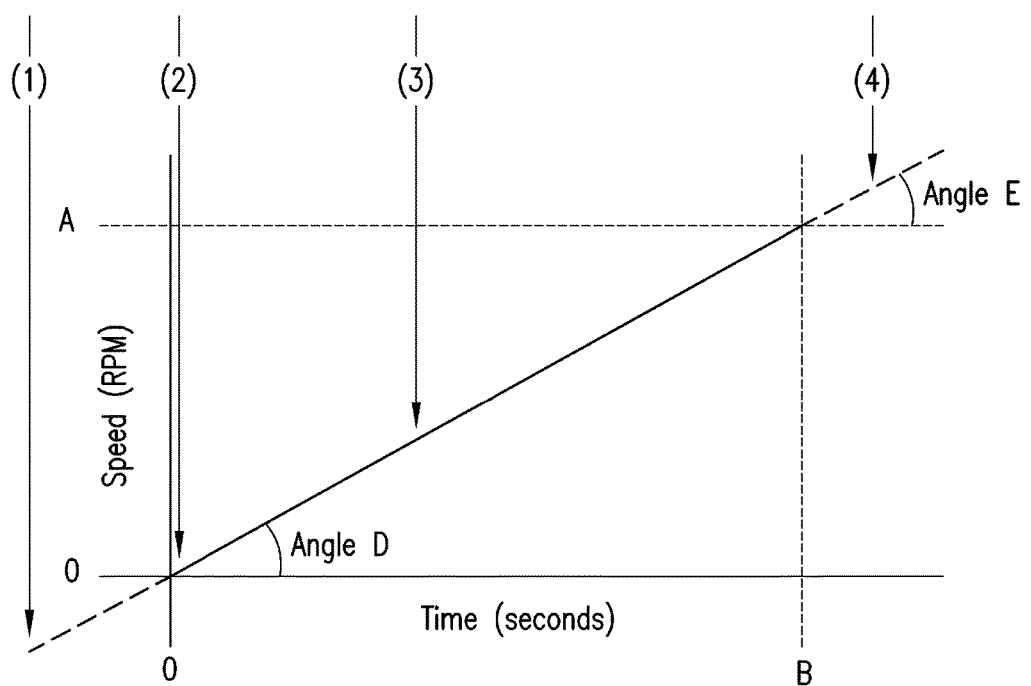
FIG. 16C is a graph of speed versus time for the Flying-Start mode of operation'

The variable process control system of the present invention is configured to operate in a "Flying Start Mode" of operation with infinite control of fan 12. A flow chart of this mode of operation is shown in FIG. 16B. In this mode of operation, VFD device 22 senses the direction of the fan 12 (i.e. clockwise or counter-clockwise) and then: (a) applies the appropriate signal to motor 20 in order to slow fan 12 to a stop (if rotating in reverse), or (b) ramps motor 20 to speed, or (c) catches fan 12 operating in the correct direction and ramps to speed. The graph in FIG. 16C illustrates the "Flying Start Mode". The nomenclature in FIG. 16C is defined as follows:

"A" is a desired, fixed or constant speed for motor 20 (i.e. constant RPM);

"B" is the Time in seconds for VFD device 22 to bring motor 20 from 0.0 RPM to desired RPM (i.e. Ramp-Up Time).

"C" is the Time in seconds for VFD device 22 to bring motor 20 from desired RPM to 0.0 RPM (i.e. Ramp-Down Time).

"Angle D" is the acceleration time in RPM/second and is defined as "cos(A/B)";

"Angle E" is the deceleration time in RPM/second and is defined as "cos(A/C)";

Angle D and Angle E may be identical, but they do not have to be.

The "Flying Start" mode may be implemented if any of the following conditions exist:

Condition #2: Motor 20 is detected at 0.0 RPM. The VFD device 22 accelerates motor 20 to desired RPM in "B" seconds.

Condition #1: Motor 20 is detected running in reverse direction. The VFD device 22 calculates time to bring motor 20 to 0.0 RPM at rate of D. Motor 20 is then accelerated to "A" RPM. Total time for motor to reach "A" RPM is greater than "B" seconds.

Condition #3: Motor 20 is detected running in forward direction. VFD device 22 calculates position of motor 20 on ramp and uses rate "D" to accelerate motor to "A" RPM. Total time for motor 20 to reach "A" RPM is less than "B" seconds.

Condition #4—Motor is detected running greater than "A" RPM. VFD device 22 calculates time to decelerate motor to "A" RPM using rate E.

This Flying Start mode of operation is possible because the bearing design of permanent magnet motor 20 allows windmilling in reverse.

Soft Start Mode

The variable process control system of the present invention is configured to operate in a "Soft Start Mode" of operation. In this mode of operation, with VFD device 22 is programmed to initiate acceleration in accordance with predetermined ramp rate. Such a controlled rate of acceleration eliminates breakage of system components with "across the line starts". Such "breakage" is common with prior art gearbox fan drive systems.

Hot Day Mode

Another mode of operation that can be implemented by the variable process control system of the present invention is the "hot day" mode of operation. The "hot day" mode of operation is used when more cooling is required and the speed of all fans is increased to 100% maximum fan tip speed. The "hot day" mode of operation can also be used in the event of an emergency in order to stabilize an industrial process that may require more cooling.

Energy Optimization Mode

Figure 9:
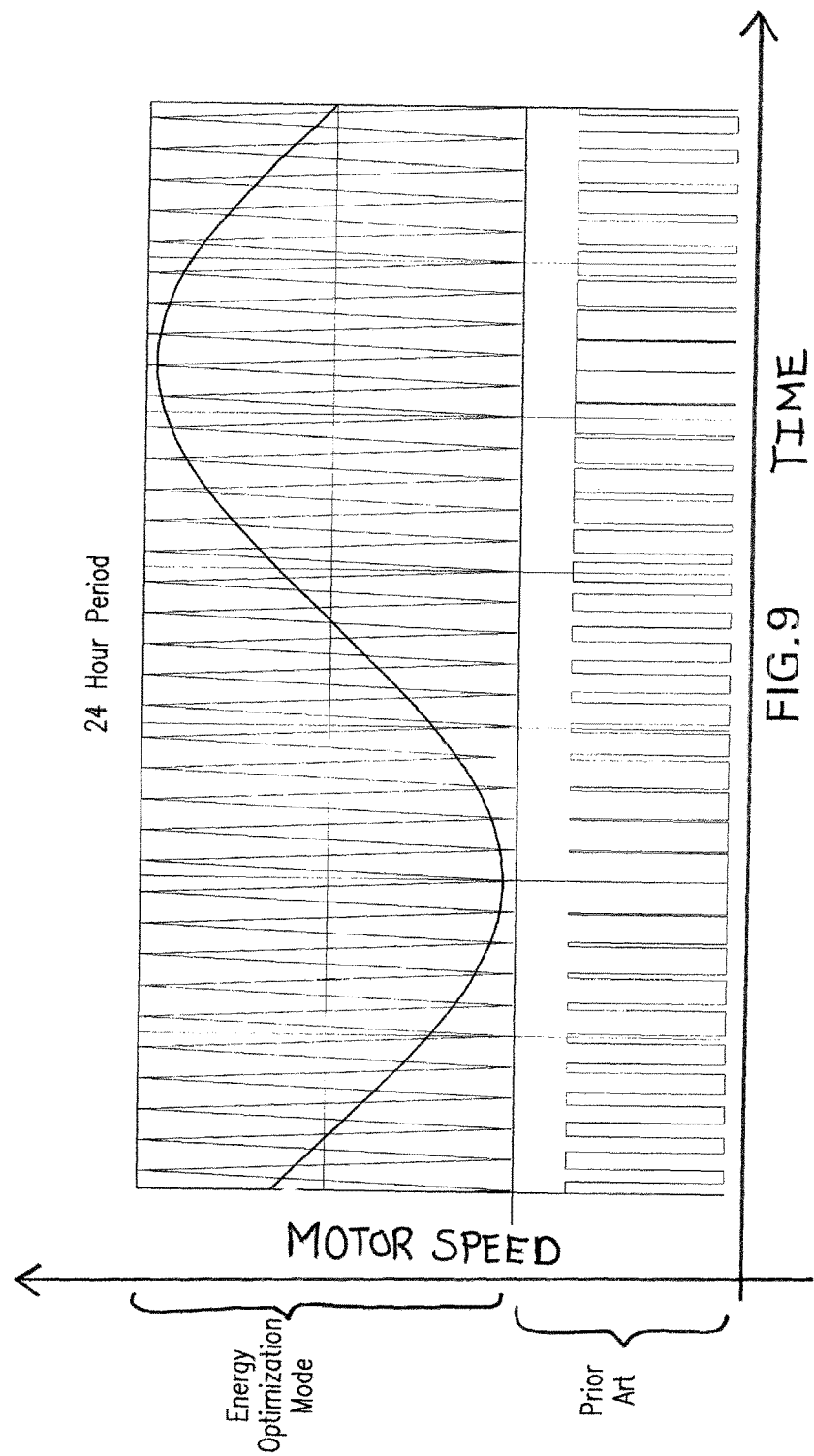
FIG. 9 is a graph showing a fan speed curve that is similar to a sine wave and represents the increase and decrease in the fan speed over a twenty-four hour period in accordance with the present invention, the bottom portion of the graph showing a fan speed curve representing changes in fan speed for a prior art variable speed fan drive system.

The variable process control system of the present invention is configured to operate in an "Energy Optimization Mode". In this mode of operation, the fan 12 and the variable speed pumps 1722, 1730, 1738, and 1752 (see FIG. 26) are operated to maintain a constant basin temperature. The control of fan speed is based upon the cooling tower design, predicted and actual process demand and historical environmental conditions with corrections for current process and environmental conditions. Industrial computer 300 uses historical data to predict the process demand for a current day based on historical process demand patterns and historical environmental conditions, and then calculates a fan speed curve as a function of time. The calculated fan speed curve represents the minimal energy required to operate the fan throughout the variable speed range for that current day in order to meet the constant basin temperature demand required by the industrial process. In real time, the variable process control system processes the actual environmental conditions and industrial process demand and provides predictions and corrections that are used to adjust the previously calculated fan speed curve as a function of time. VFD device 22 outputs electrical power signals in accordance with the corrected fan speed curve. The system utilizes logic based on current weather forecasts, from on-site weather station 316, as well as historical trends pertaining to past operating data, past process demand, and past environmental conditions (e.g. weather data, temperature and wet-bulb temperature) to calculate the operating fan speed curve. In this Energy Optimization Mode, the fan operation follows the changes in the daily wet-bulb temperature. Fan operation is represented by a sine wave over a 24 hour period, as shown in the top portion of the graph in FIG. 9, wherein the fan speed transitions are smooth and deliberate and follow a trend of acceleration and deceleration. In FIG. 9, the "Y" axis is "Motor Speed" and the "X" axis is "Time". The fan speed curve in the top portion of the graph in FIG. 9 (Energy Optimization Mode" is directly related to wet-bulb temperature. The duration of time represented by the "X" axis is a twenty-four period. The variable process control system of the present invention uses a Runge-Kutter algorithm that analyzes historical process demand and environmental stress as well as current process demand and environmental stress to generate a fan speed curve that results in energy savings. This control of the fan speed is therefore predictive in nature so as to optimize energy consumption as opposed to being reactive to past data. Such a process minimizes the energy consumed in varying the fan speed. Such smooth fan speed transitions of the present invention are totally contrary to the abrupt fan speed transitions of the prior art fan drive systems, which are illustrated at the bottom of the graph in FIG. 9. The fan speed transitions of the prior art fan drive system consist of numerous, abrupt fan-speed changes occurring over a twenty-four period in short spurts. Such abrupt fan speed changes are the result of the prior art variable speed logic which is constantly "switching" or accelerating and decelerating the fan to satisfy the basin temperature set point.

Therefore, the Energy Optimization Mode of the present invention uses the cooling tower data, process demand, geographical location data, current environmental data and historical trends to predict fan speed according to loading so as to provide a smooth fan-speed curve throughout the day. Such operation minimizes the fan speed differential and results in optimized energy efficiency.

Soft-Stop Mode

The variable process control system and motor 20 of the present invention are configured to operate in a "Soft-Stop Mode" of operation. In this mode of operation, DAQ device 200 provides signals to VFD device 22 to cause VFD device 22 to decelerate motor 20 under power RPM in accordance with a predetermined negative ramp rate to achieve a controlled stop. This mode of operation also eliminates breakage of and/or damage to system components. This "Soft-Stop Mode" quickly brings the fan to a complete stop thereby reducing damage to the fan. The particular architecture of motor 20 allows the fan to be held at zero RPM to prevent the fan from windmilling in reverse. Such a feature prevents the fan from damaging itself or damaging other components during high winds and hurricanes. Such a "Soft Stop Mode" of operation is not found in prior art fan drive systems using induction motors.

Fan Hold Mode

The variable process control system and motor 20 of the present invention are configured to operate in a "Fan-Hold Mode". This mode of operation is used during a lock-out, tag-out (LOTO) procedure which is discussed in detail in the ensuing description. "If a LOTO procedure is to be implemented, then motor 20 is first brought to 0.00 RPM using the "Soft-Stop Mode", then the "Fan-Hold Mode" is implemented in order to prevent the fan from windmilling. Fan-hold is a function of the design of permanent magnet motor 20. DAQ device 200 provides signals to VFD device 22 to cause VFD device 22 to decelerate motor 20 under power at a predetermined negative ramp rate to achieve a controlled stop of fan 12 in accordance with the "Soft-Stop Mode". VFD device 22 controls motor 20 under power so that fan 12 is held stationary. Next, the motor shaft 24 is locked with a locking mechanism (as will be described in the ensuing description). Then, all forms of energy (e.g. electrical power) are removed according to the Lock-Out-Tag-Out (LOTO) procedure and then fan 12 can be secured. In prior art drive systems using induction motors, attempting to brake and hold a fan would actually cause damage to the induction motor. However, such problems are eliminated with the "Soft-Stop and "Fan-Hold Modes".

The variable process control system and motor 20 of the present invention can also implement a "Reverse Operation Mode". In this mode of operation, permanent magnet motor 20 is operated in reverse. This mode of operation is possible since there are no restrictions or limitations on motor 20 unlike prior art gearbox fan drive systems which have many limitations (e.g. lubrication limitations). The unique bearing system of motor 20 allows unlimited reverse rotation of motor 20. Specifically, the unique design of motor 20 allows design torque and speed in both directions.

Reverse Flying Start Mode

The variable process control system and motor 20 of the present invention can also implement a "Reverse Flying-Start Mode" of operation. In this mode of operation, the Flying Start mode of operation is implemented to obtain reverse rotation. The motor 20 is first decelerated under power until 0.00 RPM is attained than then reverse rotation is immediately initiated. This mode of operation is possible since there are no restrictions or limitations on motor 20 in reverse. This mode of operation is useful for de-icing.

Lock-Out Tag Out

In accordance with the invention, a particular Lock-Out Tag-Out (LOTO) procedure is used to stop fan 12 in order to conduct maintenance on fan 12. A flow-chart of this procedure is shown in FIG. 16. Initially, the motor 20 is running at the requested speed. In one embodiment, in order to initiate the LOTO procedure, an operator uses the built-in keypad of DAQ device 200 to implement "Soft-Stop Mode" so as to cause motor 20, and thus fan 12, to decelerate to 0.0 RPM. Once the RPM of motor 20 is at 0.0 RPM, the "Fan-Hold Mode" is implemented to allow VFD device 22 and motor 20 hold the fan 12 at 0.0 RPM under power. A fan lock mechanism is then applied to motor shaft 24. All forms of energy (e.g. electrical energy) are then removed so as to lock out VFD 22 and motor 20. Operator or user interaction can then take place. The fan lock mechanism can be either manually, electrically, mechanically or pneumatically operated, and either mounted to or built-in to motor 20. This fan lock will mechanically hold and lock the motor shaft 24 thereby preventing the fan 12 from rotating when power is removed. Such a fan lock can be used for LOTO as well as hurricane service. Fan lock configurations are discussed in the ensuing description. Once the maintenance procedures are completed on the fan or cooling tower, all safety guards are replaced, the fan lock is released and the mechanical devices are returned to normal operation. The operator then unlocks and powers up VFD device 22. Once power is restored, the operator uses the keypad of DAQ device 200 to restart and resume fan operation. This LOTO capability is a direct result of motor 20 being directly coupled to fan hub 16. The LOTO procedure provides reliable control of fan 12 and is significantly safer than prior art techniques. This LOTO procedure complies with the National Safety Council and OSHA guidelines for removal of all forms of energy.

Figure 21A:
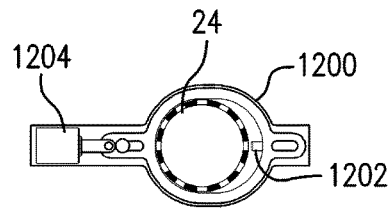
FIG. 21A is a top, diagrammatical view showing a fan-lock mechanism in accordance with one embodiment of the invention, the fan lock mechanism being used on the rotatable shaft of the motor shown in FIGS. 4 and 5A, the view showing the fan lock mechanism engaged with the rotatable motor shaft in order to prevent rotation thereof.
Figure 21B:
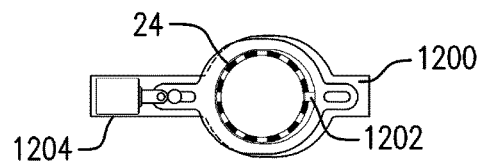
FIG. 21B is a top, diagrammatical view showing the fan lock mechanism of FIG. 21A, the view showing the fan lock mechanism disengaged from the rotatable motor shaft in order to allow rotation thereof.
Figure 21C:
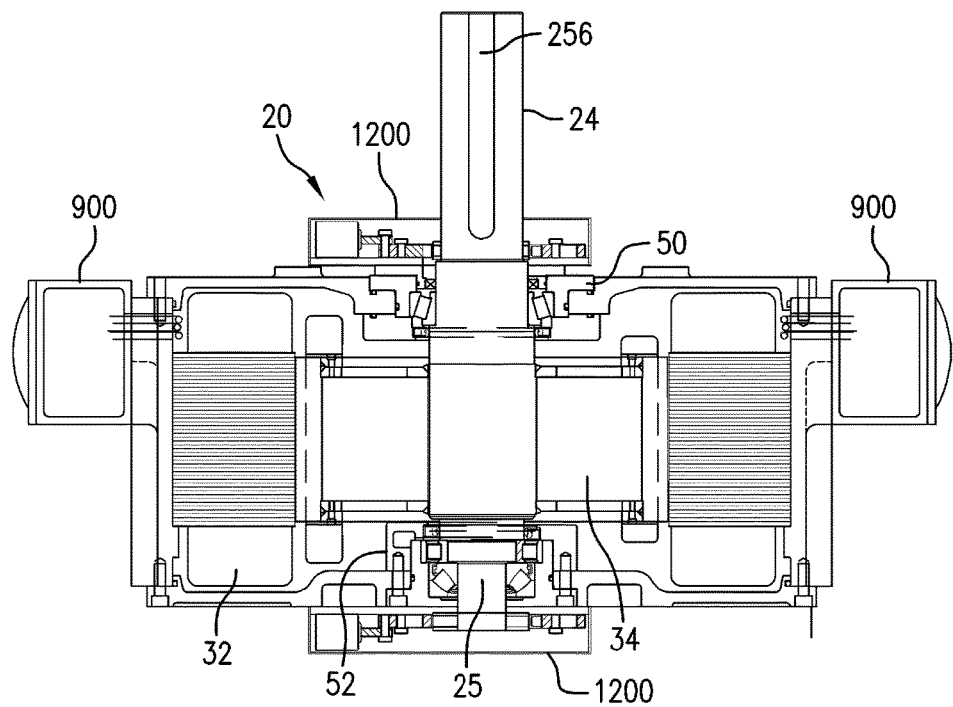
FIG. 21C is a side elevational view of the motor shown in FIGS. 4 and 5A, the view showing the interior of the motor and the fan-lock mechanism of FIGS. 21A and 21B mounted on the motor about the upper portion of the motor shaft, the view also showing an additional fan-lock mechanism of FIGS. 21A and 21B mounted to the motor about the lower portion of the motor shaft.

One example of a fan lock mechanism that may be used on motor 20 is shown in FIGS. 21A, 21B and 21C. The fan lock mechanism is a solenoid-actuated pin-lock system and comprises enclosure or housing 1200, which protects the inner components from environmental conditions, stop-pin 1202 and solenoid or actuator 1204. The solenoid or actuator 1204 receives an electrical actuation signal from DAQ device 200 when it is desired to prevent fan rotation. The fan lock mechanism may be mounted on the drive portion of motor shaft 24 that is adjacent the fan hub, or it may be mounted on the lower, non-drive portion of the motor shaft 24. FIG. 21B shows solenoid 1204 so that stop-pin 1202 engages rotatable shaft 24 of motor 20 so as to prevent rotation of shaft 24 and the fan. In FIG. 21A, solenoid 1204 is deactivated so that stop pin 1202 is disengaged from rotatable shaft 24 so as to allow rotation of shaft 24 and the fan. FIG. 21C shows the fan-lock mechanism on both the upper, drive end of shaft 24, and the lower, non-drive end of shaft 24.

In an alternate embodiment, the fan-lock mechanism shown in FIGS. 21A and 21B can be cable-actuated. In a further embodiment, the fan-lock mechanism shown in FIGS. 21A and 21B is actuated by a flexible shaft. In yet another embodiment, the fan-lock mechanism shown in FIGS. 21A and 21B is motor-actuated.

Figure 23:
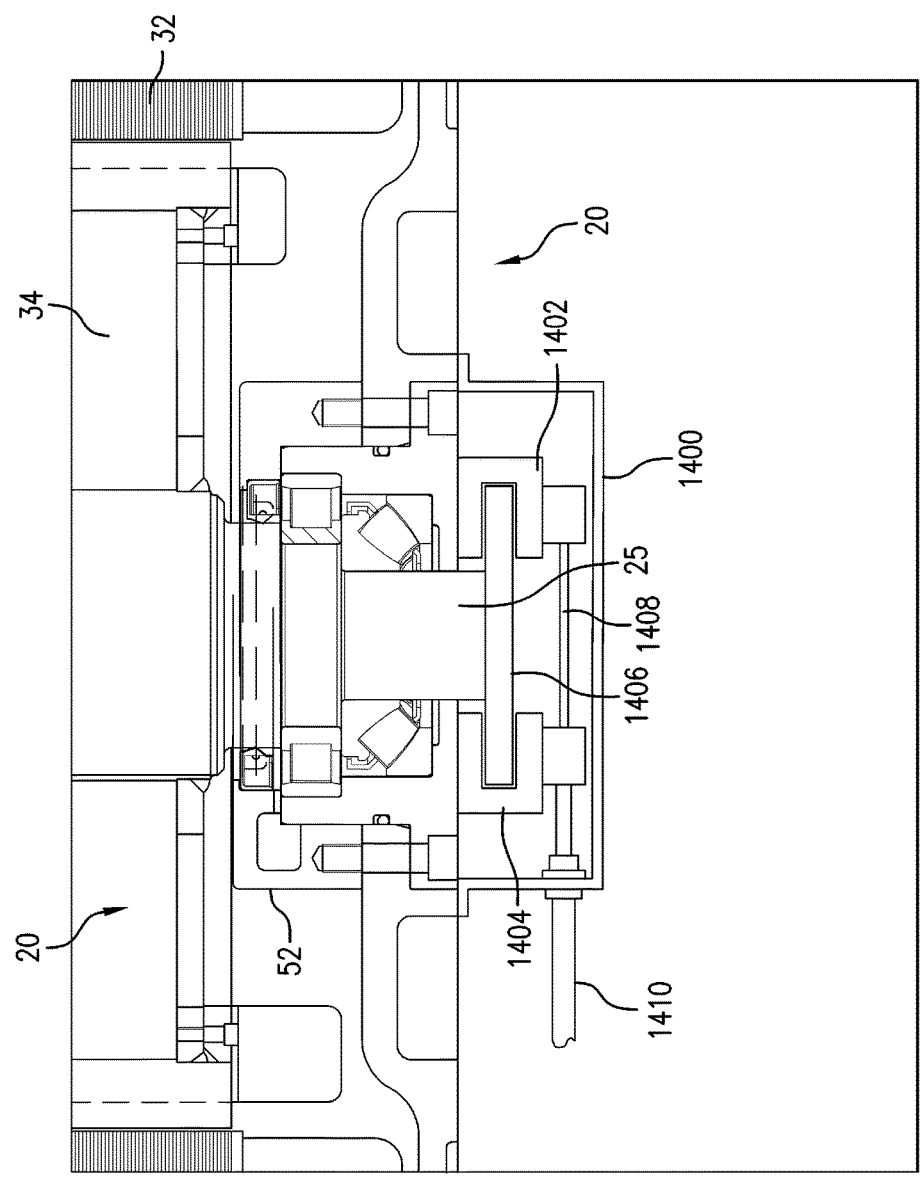
FIG. 23 is a side elevational view of the lower portion of the permanent magnet motor of FIGS. 4 and 5A, the permanent magnet motor having mounted thereto a caliper-type lock mechanism for engaging the lower portion of the shaft of the motor.

Referring to FIG. 22, there is shown a caliper type fan-lock mechanism which can be used with motor 20. This caliper type fan lock mechanism comprises a housing or cover 1300 and a caliper assembly, indicated by reference numbers 1302 and 1303. The caliper type fan lock mechanism also includes discs 1304 and 1305, flexible shaft cover 1306 and a shaft or threaded rod 1308 that is disposed within the flexible shaft cover 1306. The caliper type fan lock mechanism further includes fixed caliper block 1310 and movable caliper block 1311. In an alternate embodiment, a cable is used in place of the shaft or threaded rod 1308. In alternate embodiments, the fan lock mechanism can be activated by a motor (e.g. screw activated) or a pull-type locking solenoid. FIG. 22 shows the fan lock mechanism mounted on top of the motor 20 so it can engage the upper portion of motor shaft 24. FIG. 23 shows the fan lock mechanism mounted at the bottom of motor 20 so the fan lock mechanism can engage the lower, non-drive end 25 of motor shaft 24. This caliper-type fan-lock mechanism has housing or cover 1400 and a caliper assembly, indicated by reference numbers 1402 and 1404. This caliper-type fan-lock mechanism also has disc 1406, flexible shaft cover 1410 and shaft or threaded rod 1408 that is disposed within the flexible shaft cover 1410.

Figure 24:
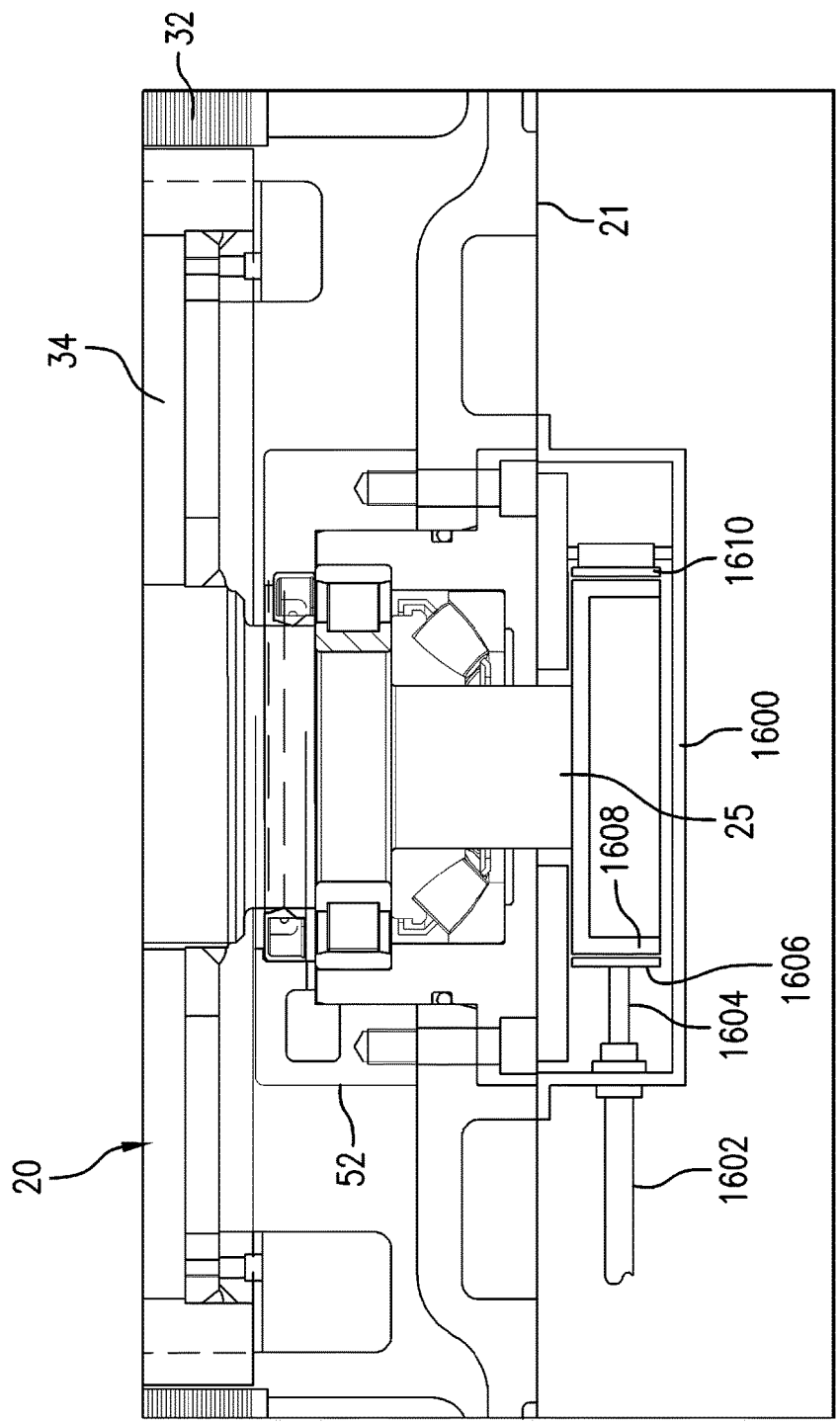
FIG. 24 is a side elevational view of the lower portion of the permanent magnet motor of FIGS. 4 and 5A, the permanent magnet motor having mounted thereto a band-lock mechanism for engaging the lower portion of the shaft of the motor.
Figure 25:
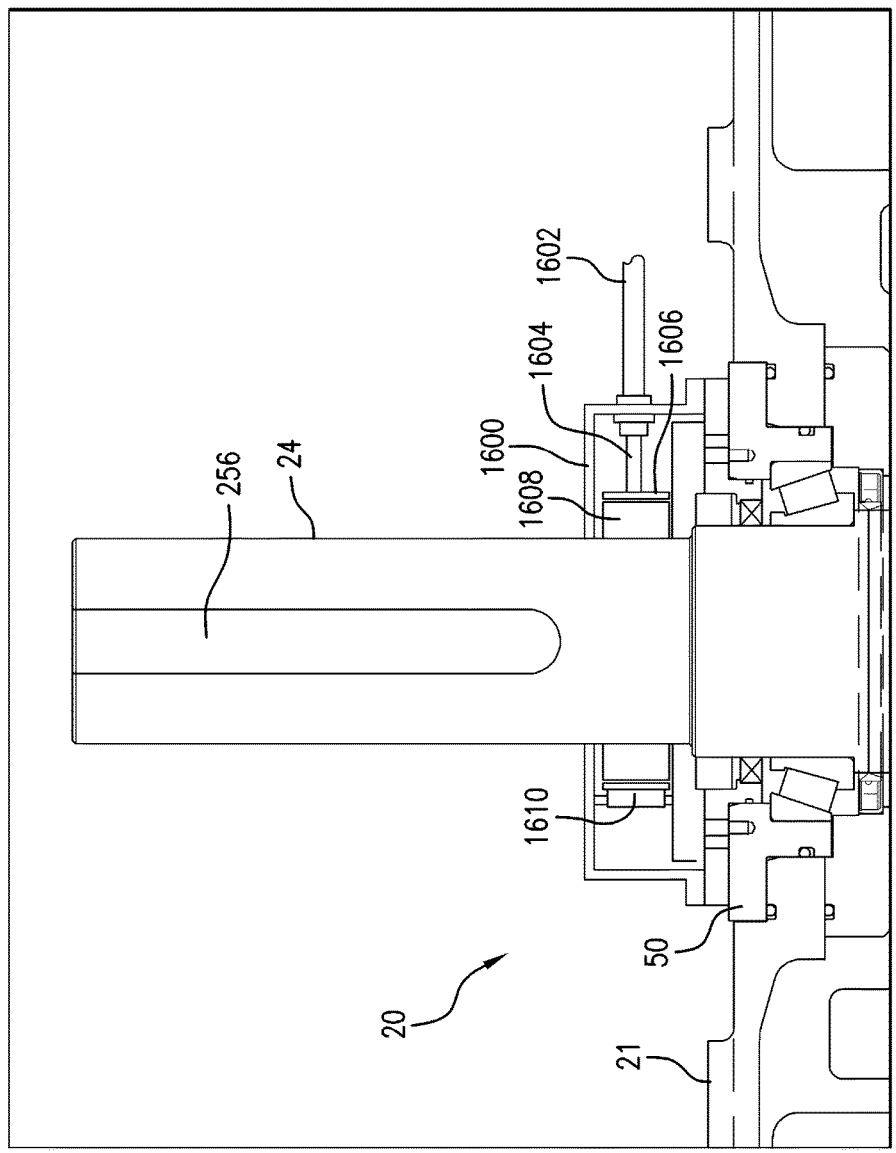
FIG. 25 is a side elevational view of the upper portion of the permanent magnet motor of FIGS. 4 and 5A, the permanent magnet motor having mounted thereto a band-lock mechanism for engaging the upper portion of the shaft of the motor.

Referring to FIG. 25, there is shown a band-type fan-lock mechanism which can be used with motor 20. This band-type fan lock mechanism comprises housing or cover 1600, flexible shaft cover 1602 and a shaft or threaded rod 1604 that is disposed within the flexible shaft cover 1604. The band-type fan lock mechanism further includes fixed lock bands 1606 and 1610 and lock drum 1608. In an alternate embodiment, a cable is used in place of the shaft or threaded rod 1604. In alternate embodiments, the band-type fan lock mechanism can be activated by a motor (e.g. screw activated) or a pull-type locking solenoid. FIG. 25 shows the fan lock mechanism mounted on top of the motor 20 so it can engage the upper portion of motor shaft 24. FIG. 24 shows the fan lock mechanism mounted at the bottom of motor 20 so the fan lock mechanism can engage the lower, non-drive end 25 of motor shaft 24.

In another embodiment, the fan lock is configured as the fan lock described in U.S. Patent Application Publication No. 2006/0292004, the disclosure of which published application is hereby incorporated by reference.

De-Ice Mode

The variable process control system and motor 20 are also configured to implement a "De-Ice Mode" of operation wherein the fan is operated in reverse. Icing of the fans in a cooling tower may occur depending upon thermal demand (i.e. water from the industrial process and the return demand) on the tower and environmental conditions (i.e. temperature, wind and relative humidity). Operating cooling towers in freezing weather is described in the January, 2007 "Technical Report", published by SPX Cooling Technologies. The capability of motor 20 to operate in reverse in order to reverse the fan direction during cold weather will de-ice the tower faster and completely by retaining warm air in the cooling tower as required by the environmental conditions. Motor 20 can operate in reverse without limitations in speed and duration. However, prior art gear boxes are not designed to operate in reverse due to the limitations of the gearbox's bearing and lubrication systems. One prior art technique is to add lubrication pumps (electrical and gerotor) to the prior art gearbox in order to enable lubrication in reverse operation. However, even with the addition of a lubrication pump, the gearboxes are limited to very slow speeds and are limited to a typical duration of no more than two minutes in reverse operation due to the bearing design. For most cooling towers, the fans operate continuously at 100% fan speed. In colder weather, the additional cooling resulting from the fans operating at 100% fan speed actually causes the cooling tower to freeze which can lead to collapse of the tower. One prior art technique utilized by cooling tower operators is the use of two-speed motors to drive the fans. With such a prior art configuration, the two-speed motor is continually jogged in a forward rotation and in a reverse rotation in the hopes of de-icing the tower. In some cases, the gearboxes are operated beyond the two minute interval in order to perform de-icing. However, such a technique results in gearbox failure as well as icing damage to the tower. If the motors are shut off to minimize freezing of the towers, the fan and its mechanical system will ice and freeze. Another prior art technique is to de-ice the towers late at night with fire hoses that draw water from the cooling tower basin. However, this is a dangerous practice and often leads to injuries to personnel. In order to solve the problems of icing in a manner that eliminates the problems of prior art de-icing techniques, the present invention implements an automatic de-icing operation without operator involvement and is based upon the cooling tower thermal design, thermal gradient data, ambient temperature, relative humidity, wet-bulb temperature, wind speed and direction. Due to the bearing design and architecture of motor 20 and design torque, fan 12 is able to rotate in either direction (forward or reverse). This important feature enables the fan 12 to be rotated in reverse for purposes of de-icing. DAQ device 200 and VFD device 22 are configured to operate motor 20 at variable speed which will reduce icing in colder weather. This variable speed characteristic combined with design torque and fan speed operation in forward or reverse minimizes and eliminates icing of the tower. DAQ device 200 is programmed with temperature set points, tower design parameters, plant thermal loading, and environmental conditions and uses this programmed data and the measured temperature values provided by the temperature sensors to determine if de-icing is necessary. If DAQ device 200 determines that de-icing is necessary, then the de-icing mode is automatically initiated without operator involvement. When such environmental conditions exist, DAQ device 200 generates control signals that cause VFD device 22 to ramp down the RPM of motor 20 to 0.0 RPM. The Soft-Stop Mode can be used to ramp the motor RPM down to 0.00 RPM. Next, the motor 20 is operated in reverse so as to rotate the fan 12 in reverse so as to de-ice the cooling tower.

The Reverse Flying Start mode can be used to implement de-icing. Since motor 20 does not have the limitations of prior art gearboxes, supervision in this automatic de-ice mode is not necessary. Upon initiation of de-icing, DAQ device 200 issues a signal to industrial computer 300. In response, display screen 306 displays a notice that informs the operators of the de-icing operation. This de-icing function is possible because motor 20 comprises a unique bearing design and lubrication system that allows unlimited reverse operation (i.e. 100% fan speed in reverse) without duration limitations. The unlimited reverse operation in combination with variable speed provides operators or end users with infinite speed range in both directions to match ever changing environmental stress (wind and temperatures) while meeting process demand. Since DAQ device 200 can be programmed, the de-icing program may be tailored to the specific design of a cooling tower, the plant thermal loading and the surrounding environment. In a preferred embodiment, DAQ device 200 generates email or SMS text messages to notify the operators of initiation of the de-ice mode. In a preferred embodiment, DAQ device 200 generates a de-icing schedule based on the cooling tower design, the real time temperature, wet-bulb temperature, wind speed and direction, and other environmental conditions. In an alternate embodiment, temperature devices maybe installed within the tower to monitor the progress of the de-icing operation or to trigger other events. The variable process control system of the present invention is configured to allow an operator to manually initiate the De-Ice mode of operation. The software of the DAQ device 200 and industrial computer 300 allows the operator to use either the keypad at the DAQ device 200, or user input device 304 which is in data signal communication with industrial computer 300. In alternate embodiment, the operator initiates the De-Icing mode via Distributed Control System 315. In such an embodiment, the control signals are routed to industrial computer 300 and then DAQ device 200.

In a multi-cell system, there is a separate VFD device for each permanent magnet motor but only one DAQ device for all of the cells. This means that every permanent magnet motor, whether driving a fan or part a variable speed pump, will receive control signals from a separate, independent, dedicated VFD device. Such a multi-cell system is described in detail in the ensuing description. The DAQ device is programmed with the same data as described in the foregoing description and further includes data representing the number of cells. The DAQ device controls each cell individually such that certain cells may be dwelled, idled, held at stop or allowed to windmill while others may function in reverse at a particular speed to de-ice the tower depending upon the particular design of the cooling tower, outside temperature, wet bulb, relative humidity, wind speed and direction. Thus, the DAQ device determines which cells will be operated in the de-ice mode. Specifically, DAQ device 200 is programmed so that certain cells will automatically start de-icing the tower by running in reverse based upon the cooling tower design requirements. Thus, the fan in each cell can be operated independently to retain heat in the tower for de-icing while maintaining process demand.

In either the single fan cooling tower, or a multi-cell tower, temperature sensors in the cooling towers provide temperature data to the DAQ device 200 processes these signals to determine if the De-ice mode should be implemented. In a multi-cell tower, certain cells may need de-icing and other cells may not. In that case, the DAQ device sends the de-icing signals to only the VFDs that correspond to fan cells requiring de-icing.

The DAQ device is also programmed to provide operators with the option of just reducing the speed of the fans in order to achieve some level of de-icing without having to stop the fans and then operate in reverse.

In another embodiment of the invention, VFD device 22 is configured as a regenerative (ReGen) drive device. A regenerative VFD is a special type of VFD with power electronics that return power to the power grid. Such a regenerative drive system captures any energy resulting from the fan "windmilling" and returns this energy back to the power grid. "Windmilling" occurs when the fan is not powered but is rotating in reverse due to the updraft through the cooling tower. The updraft is caused by water in the cell. Power generated from windmilling can also be used to limit fan speed and prevent the fan from turning during high winds, tornadoes and hurricanes. The regenerative VFD device is also configured to generate control signals to motor 20 that to hold the fan at 0.00 RPM so as to prevent windmilling in high winds such as those experienced during hurricanes.

Figure 5B:
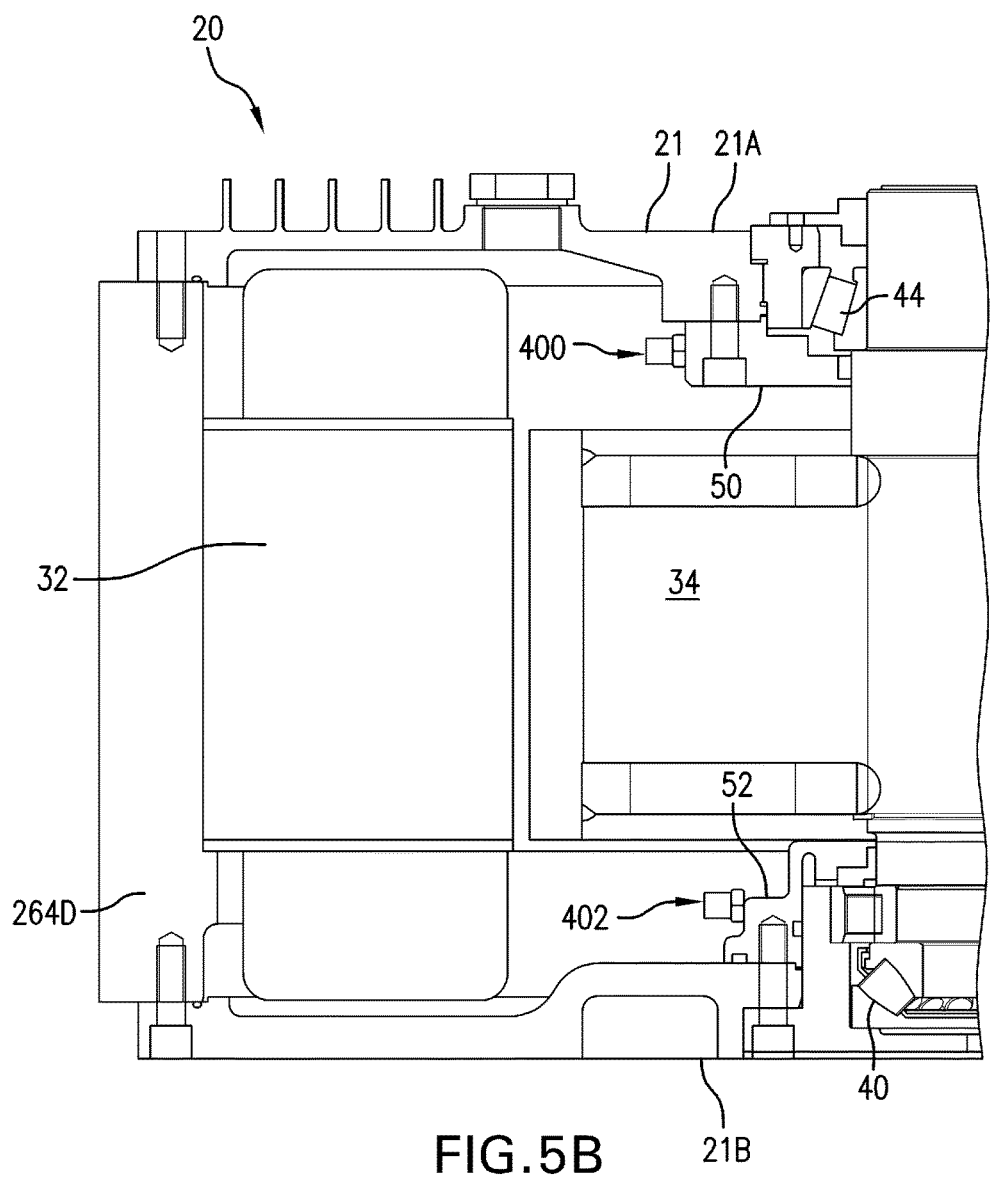
FIG. 5B is a diagram showing a portion of the permanent magnet motor of FIG. 5A, the diagram showing the location of the accelerometers within the motor housing.

Referring to FIG. 2, the variable process control system of the present invention further comprises a plurality of sensors and other measurement devices that are in electrical signal communication with DAQ device 200. Each of these sensors has a specific function. Each of these functions is now described in detail. Referring to FIGS. 4 and 5B, motor 20 includes vibration sensors 400 and 402 which are located within motor casing 21. Sensor 400 is positioned on bearing housing 50 and sensor 402 is positioned on bearing housing 52. In a preferred embodiment, each sensor 400 and 402 is configured as an accelerometer, velocity and displacement. As described in the foregoing description, sensors 400 and 402 are electrically connected to quick-disconnect adapter 108 and cable 110 is electrically connected to quick-disconnect adapter 108 and communication data junction box 111. Cable 112 is electrically connected between communication data junction box 111 and DAQ device 200. Vibration sensors 400 and 402 provide signals that represent vibrations experienced by fan 12. Vibrations caused by a particular source or condition have a unique signature. All signals emanating from sensors 400 and 402 are inputted into DAQ device 200 which processes these sensor signals. Specifically, DAQ device 200 includes a processor that executes predetermined vibration-analysis algorithms that process the signals provided by sensors 400 and 402 to determine the signature and source of the vibrations. Such vibration-analysis algorithms include a FFT (Fast Fourier Transform). Possible reasons for the vibrations may be an unbalanced fan 12, instability of motor 20, deformation or damage to the fan system, resonant frequencies caused by a particular motor RPM, or instability of the fan support structure, e.g. deck. If DAQ device 200 determines that the vibrations sensed by sensors 400 and 402 are caused by a particular RPM of permanent magnet motor 20, DAQ device 200 generates a lock-out signal for input to VFD device 22. The lock-out signal controls VFD device 22 to lock out the particular motor speed (or speeds) that caused the resonant vibrations. Thus, the lock-out signals prevent motor 20 from operating at this particular speed (RPM). DAQ device 200 also issues signals that notify the operator via DCS 315. It is possible that there may be more than one resonant frequency and in such a case, all motor speeds causing such resonant frequencies are locked out. Thus, the motor 20 will not operate at the speeds (RPM) that cause these resonant frequencies. Resonant frequencies may change over time. However, vibration sensors 400 and 402, VFD device 22 and DAQ device 200 constitute an adaptive system that adapts to the changing resonant frequencies. The processing of the vibration signals by DAQ device 200 may also determine that fan balancing may be required or that fan blades need to be re-pitched.

Fan trim balancing is performed at commissioning to identify fan imbalance, which is typically a dynamic imbalance. Static balance is the norm. Most fans are not dynamically balanced. This imbalance causes the fan to oscillate which results in wear and tear on the tower, especially the bolted joints. In prior art fan drive systems, measuring fan imbalance can be performed but requires external instrumentation to be applied to the outside of the prior art gearbox. This technique requires entering the cell. However, unlike the prior art systems, DAQ device 200 continuously receives signals outputted by vibration sensors 400 and 402. Dynamic system vibration can be caused by irregular fan pitch, fan weight and or installation irregularities on the multiple fan blade systems. Fan pitch is usually set by an inclinometer at commissioning and can change over time causing fan imbalance. If the pitch of any of the fan blades 18 deviates from a predetermined pitch or predetermined range of pitches, then a maintenance action will be performed on fan blades 18 in order to re-pitch or balance the blades. In a preferred embodiment, additional vibration sensors 404 and 406 are located on bearing housings 50 and 52, respectively, of motor 20 (see FIG. 4). Each vibration sensor 404 and 406 is configured as an accelerometer or a velocity probe or a displacement probe. Each vibration sensor 404 and 406 has a particular sensitivity and a high fidelity that is appropriate for detecting vibrations resulting from fan imbalance. Signals emanating from sensors 404 and 406 are inputted into DAQ device 200 via cable 110, communication data junction box 111 and cable 112. Sensors 404 and 406 provide data that allows the operators to implement correct fan trim balancing. Fan trim balancing provides a dynamic balance of fan 12 that extends cooling tower life by reducing or eliminating oscillation forces or the dynamic couple that causes wear and tear on structural components caused by rotating systems that have not been dynamically balanced. If the measured vibrations indicate fan imbalance or are considered to be in a range of serious or dangerous vibrations indicating damaged blades or impending failure, then DAQ device 200 automatically issues an emergency stop signal to VFD device 20. If the vibrations are serious, then DAQ device 200 issues control signals to VFD device 22 that causes motor 20 to coast to a stop. The fan would be held using the Fan-Hold mode of operation. Appropriate fan locking mechanisms would be applied to the motor shaft 24 so that the fan could be inspected and serviced. DAQ device 200 then issues alert notification via email or SMS text messages to the DCS 315 to inform the operators that then fan has been stopped due to serious vibrations. DAQ device 200 also issues the notification to industrial computer 300 for display on display 306. If the vibration signals indicate fan imbalance but the imbalance is not of a serious nature, DAQ device 200 issues a notification to the DCS 315 to alert the operators of the fan imbalance. The operators would have the option cease operation of the cooling tower or fan cell so that the fan can be inspected and serviced if necessary. Thus, the adaptive vibration-monitoring and compensation function of the variable process control system of the present invention combines with the bearing design and structure of motor 20 to provide low speed, dynamic fan trim balance thereby eliminating the "vibration couple".

The adaptive vibration feature of the variable process control system provides 100% monitoring, supervision and control of the direct drive fan system with the capability to issue reports and alerts to DCS 315 via e-mail and SMS. Such reports and alerts notify operators of operating imbalances, such as pitch and fan imbalance. Large vibrations associated with fan and hub failures, which typically occur within a certain vibration spectrum, will result in motor 20 being allowed to immediately coast down to 0.0 RPM. The fan-hold mode is then implemented. Industrial computer 300 then implements FFT processing of the vibration signals in order to determine the cause of the vibrations and to facilitate prediction of impeding failures. As part of this processing, the vibration signals are also compared to historic trending data in order to facilitate understanding and explanation of the cause of the vibrations.

In an alternate embodiment, the variable process control system of the present invention uses convenient signal pick-up connectors at several locations outside the fan stack. These signal pick-up connectors are in signal communication with sensors 400 and 402 and can be used by operators to manually plug in balancing equipment (e.g. Emerson CSI 2130) for purposes of fan trim.

In accordance with the invention, when sensors 400, 402, 404 and 406 are functioning properly, the sensors output periodic status signals to DAQ device 200 in order to inform the operators that sensors 400, 402, 404 and 406 are working properly. If a sensor does not emit a status signal, DAQ device 200 outputs a sensor failure notification that is routed to DCS 315 via email or SMS text messages. The sensor failure notifications are also displayed on display screen 306 to notify the operators of the sensor failure. Thus, as a result of the continuous 100% monitoring of the sensors, lost sensor signals or bad sensor signals will cause an alert to be issued and displayed to the operators. This feature is a significant improvement over prior art systems which require an operator to periodically inspect vibration sensors to ensure they are working properly. When a sensor fails in a prior art fan drive system, there is no feedback or indication to the operator that the sensor has failed. Such deficiencies can lead to catastrophic results such as catastrophic fan failure and loss of the cooling tower asset. However, the present invention significantly reduces the chances of such catastrophic incidents from ever occurring. In the present invention, there is built-in redundancy with respect to the sensors. In a preferred embodiment, all sensors are Line Replaceable Units (LRU) that can easily be replaced. In a preferred embodiment, the Line Replaceable Units utilize area classified Quick Disconnect Adapters such as the Turck Multifast Right Angle Stainless Connector with Lokfast Guard, which was described in the foregoing description.

Figure 18:
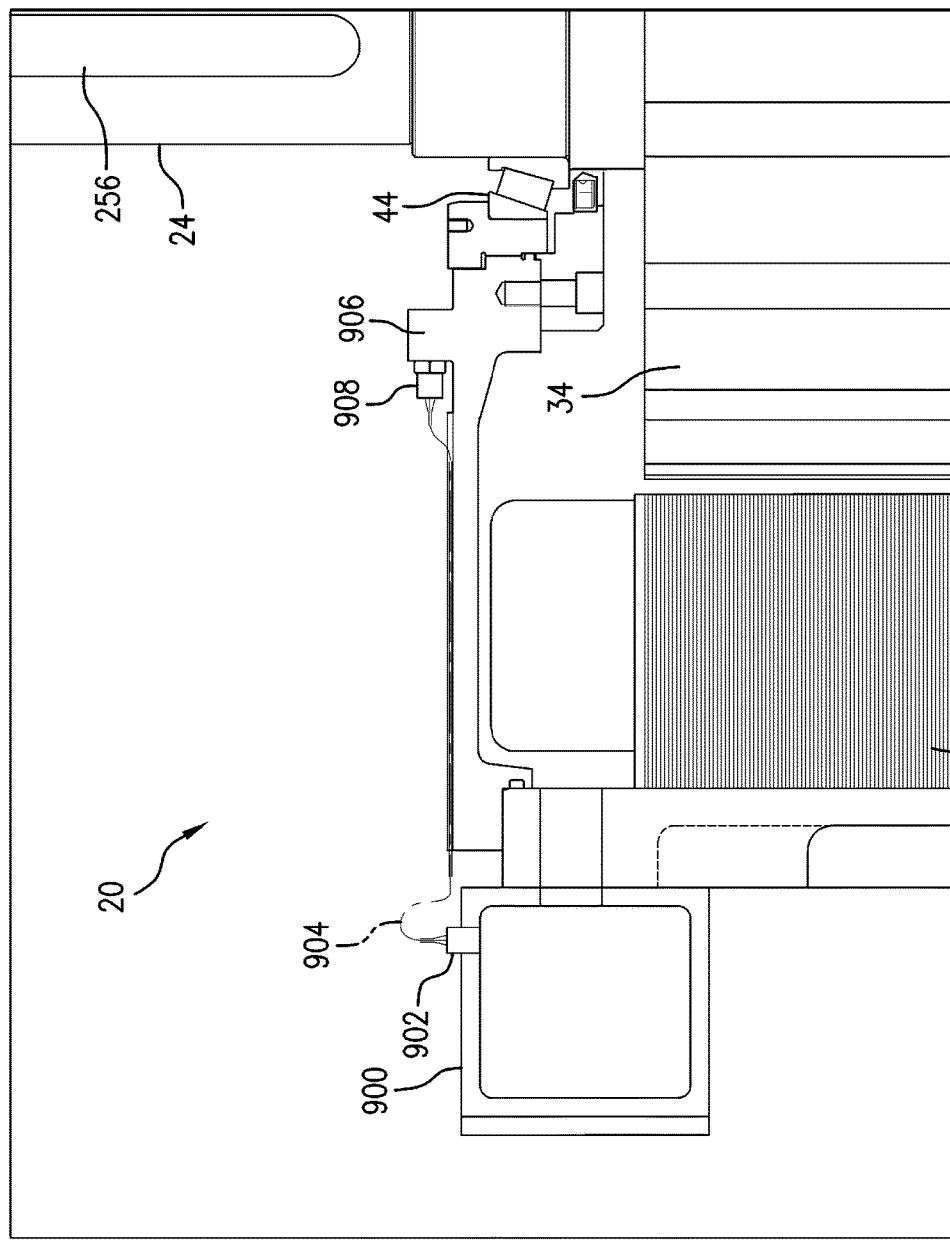
FIG. 18 is a partial view of the permanent magnet motor shown in FIGS. 4 and 5A, the permanent magnet motor having mounted thereto a line-replaceable vibration sensor unit in accordance with another embodiment of the invention.
Figure 19:
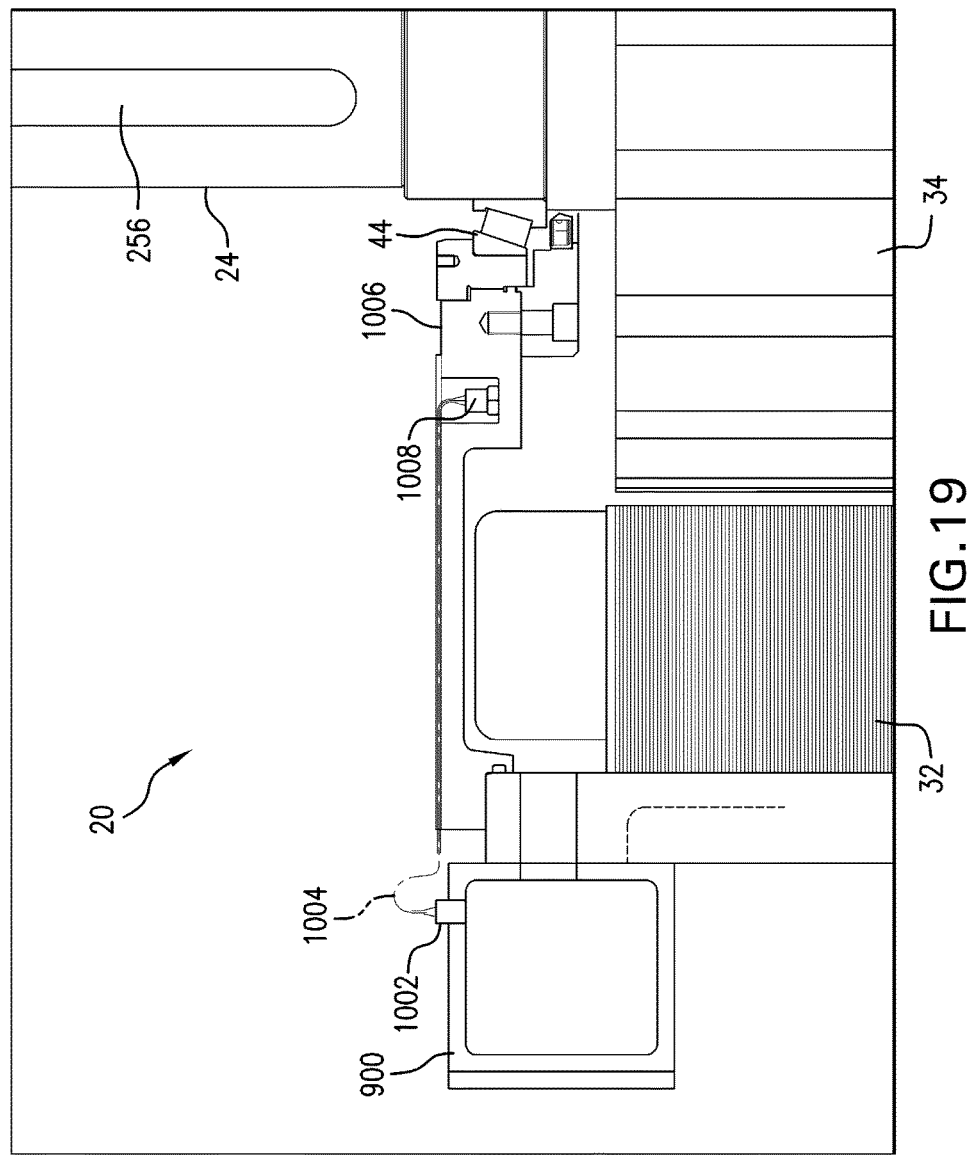
FIG. 19 is a partial view of the permanent magnet motor shown in FIGS. 4 and 5A, the permanent magnet motor having mounted thereto a line replaceable vibration sensor unit in accordance with a further embodiment of the invention.
Figure 20:
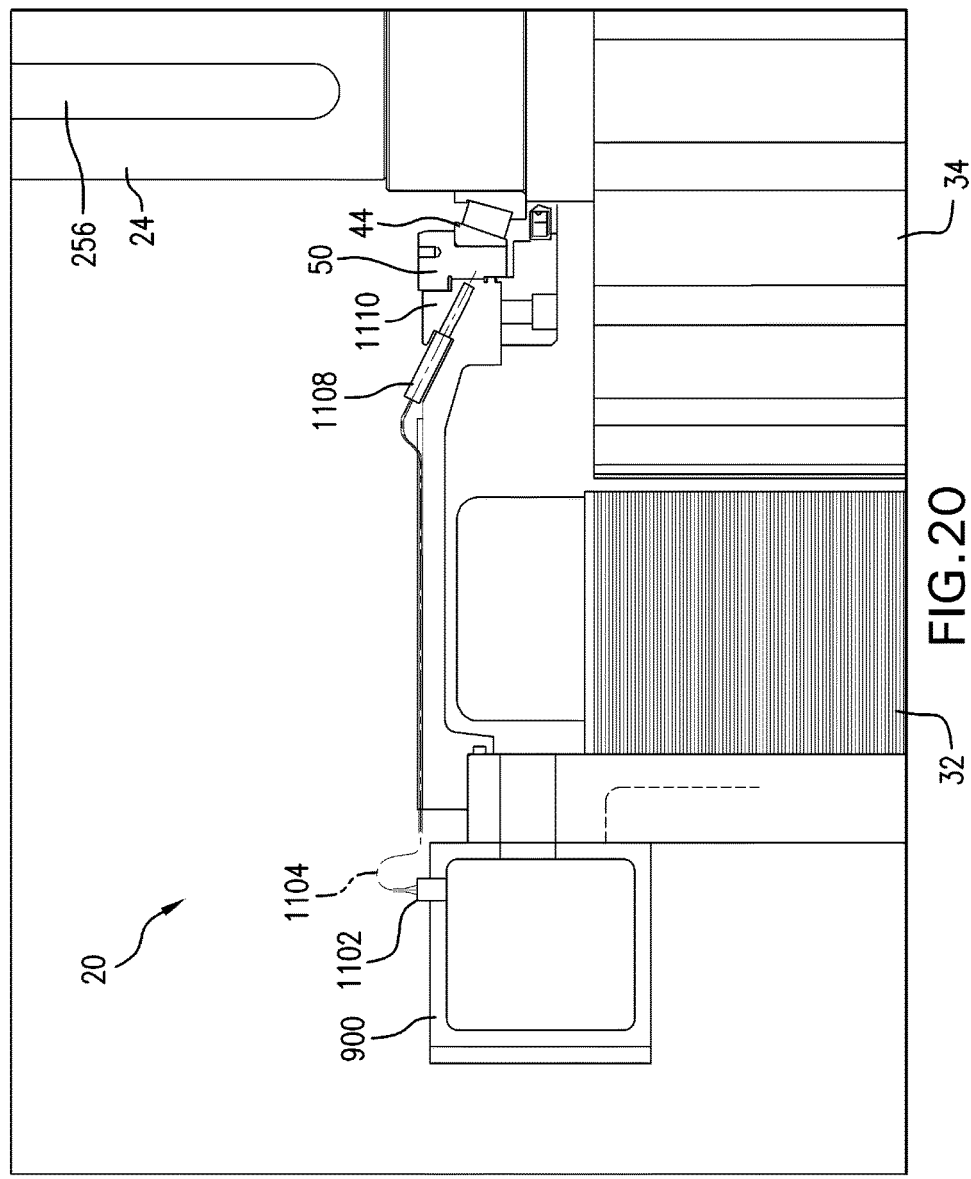
FIG. 20 is partial view of the permanent magnet motor shown in FIGS. 4 and 5A having mounted thereto a line replaceable vibration sensor unit in accordance with a further embodiment of the invention.

Examples of line replaceable vibration sensor units that are used to detect vibrations at motor 20 are shown in FIGS. 18, 19 and 20. Referring to FIG. 18, there is shown a line-replaceable vibration sensor unit that is in signal communication with instrument junction box 900 that is connected to motor housing or casing 21. This vibration sensor unit comprises cable gland 902, accelerometer cable 904 which extends across the exterior surface of the upper portion 906 of motor casing 21. Accelerometer 908 is connected to upper portion 906 of motor casing 21. In a preferred embodiment, accelerometer 908 is connected to upper portion 906 of motor casing 21 with a Quick Disconnect Adapters such as the Turck Multifast Right Angle Stainless Connector with Lokfast Guard which was described in the foregoing description. Sensor signals from accelerometer 908 are received by DAQ device 200 for processing. In a preferred embodiment, sensor signals from accelerometer 908 are provided to DAQ device 200 via instrument junction box 900. In such an embodiment, instrument junction box 900 is hardwired to DAQ device 200.

Another line-replaceable vibration sensor unit is shown in FIG. 19. This line-replaceable vibration sensor unit that is in signal communication with instrument junction box 900 that is connected to motor housing or casing 21 and comprises cable gland 1002, and accelerometer cable 1004 which extends across the exterior surface of the upper portion 1006 of motor casing 21. This vibration sensor unit further comprises accelerometer 1008 that is joined to upper portion 1006 of motor casing 21. Accelerometer 1008 is joined to upper portion 1006 of motor casing 21. In a preferred embodiment, accelerometer 1008 is hermetically sealed to upper portion 1006 of motor casing 21. Sensor signals from accelerometer 1008 are received by DAQ device 200 for processing. In one embodiment, sensor signals from accelerometer 1008 are provided to DAQ device 200 via instrument junction box 900. In such an embodiment, instrument junction box 900 is hardwired to DAQ device 200.

Another line-replaceable vibration sensor unit is shown in FIG. 20. This line-replaceable vibration sensor unit that is in signal communication with instrument junction box 900 that is connected to motor housing or casing 21 and comprises cable gland 1102, and accelerometer cable 1104 which extends across the exterior surface of the upper portion 1110 of motor casing 21. This vibration sensor unit further comprises accelerometer 1108 that is joined to upper portion 1110 of motor casing 21. Accelerometer 1108 is joined to upper portion 1100 of motor casing 21. In a preferred embodiment, accelerometer 1108 is hermetically sealed to upper portion 1100 of motor casing 21. Sensor signals from accelerometer 1108 are received by DAQ device 200 for processing. In one embodiment, sensor signals from accelerometer 1108 are provided to DAQ device 200 via instrument junction box 900. In such an embodiment, instrument junction box 900 is hardwired to DAQ device 200.

Referring to FIGS. 2 and 4, the variable process control system of the present invention further comprises a plurality of temperature sensors that are positioned at different locations within the variable process control system and within cooling apparatus 10. In a preferred embodiment, each temperature sensor comprises a commercially available temperature probe. Each temperature sensor is in electrical signal communication with communication data junction box 111. Temperature sensors located within motor casing 21 are electrically connected to quick-disconnect adapter 108 which is in electrical signal communication with communication data junction box 111 via wires 110. The temperature sensors that are not located within motor casing 21 are directly hardwired to communication data junction box 111. The functions of these sensors are as follows:

1) sensor 420 measure the temperature of the interior of motor casing 21 (see FIG. 4);
2) sensors 421A and 421B measure the temperature at the motor bearing housings 50 and 52, respectively (see FIG. 4);
3) sensor 422 measures the temperature of stator 32, end turns, laminations, etc. of motor 20 (see FIG. 4);
4) sensor 426 is located near motor casing 21 to measure the ambient temperature of the air surrounding motor 20 (see FIG. 2);
5) sensor 428 is located in a collection basin (not shown) of a wet-cooling tower to measure the temperature of the water in the collection basin (see FIG. 2);
6) sensor 430 measures the temperature at DAQ device 200 (see FIGS. 2 and 4);

7) sensor 432 measures the wet-bulb temperature (see FIG. 2);
8) sensor 433 measures the temperature of the airflow created by the fan (see FIG. 4);
9) sensor 434 measures the external temperature of the motor casing (see FIG. 4);
10) sensor 435 detects gas leaks or other emissions (see FIG. 4).

In a preferred embodiment, there are a plurality of sensors that perform each of the aforesaid tasks. For example, in one embodiment, there are a plurality of sensors 428 that measure the temperature of the water in the collection basin.

Sensors 426, 428, 430, 432, 433, 434 and 435 are hard wired directly to communication data junction box 111 and the signals provided by these sensors are provided to DAQ device 200 via cable 112. Since sensors 421A, 421B and 422 are within motor casing 21, the signals from these sensors are fed to quick-disconnect adapter 108. The internal wires in motor 20 are not shown in FIG. 2 in order to simplify the diagram shown in FIG. 2. A sudden rise in the temperatures of motor casing 21 or motor stator 32 (stator, rotor, laminations, coil, end turns) indicates a loss of airflow and/or the cessation of water to the cell. If such an event occurs, DAQ device 200 issues a notification to the plant DCS 315 and also simultaneously activates alarms, such as alarm device 438 (see FIG. 2), and also outputs a signal to industrial computer 300. This feature provides a safety mechanism to prevent motor 20 from overheating.

In an alternate embodiment, sensor 430 is not hardwired to communication data junction box 111, but instead, is directly wired to the appropriate input of DAQ device 200.

Thus, DAQ device 200, using the aforesaid sensors, measures the parameters set forth in Table I:

TABLE I

| Parameter Measured | Purpose |
| --- | --- |
| Internal motor temperature: end turns, coil lamination, stator, internal air and magnets | Monitoring, supervision, health analysis; detect motor overheating; detect wear or damage of coil, stator, magnets; detect lack of water in cell |
| External motor temperature | Monitoring, supervision, health analysis; detect motor overheating; detect lack of water in cell |
| Bearing Temperature | Monitoring, supervision, health analysis; detect bearing wear or impending failure; detect lubrication issues; FFT processing |
| Fan Stack Temperature | Monitoring, supervision, health analysis; determine Cooling Tower Thermal Capacity; determine existence of icing; operational analysis |
| Plenum Pressure | Monitoring, supervision, health analysis; plenum pressure equated to fan inlet pressure for mass airflow calculation |
| Motor Load Cells | Determine fan yaw loads; system weight; assess bearing life; FFT processing |
| Bearing Vibration | Monitoring, supervision, health analysis; trim balance; adaptive vibration monitoring; modal testing |
| Gas Leaks or Emissions | Monitoring, supervision, health analysis; detect fugitive gas emissions; monitoring heat exchanger and condenser for gas emissions |

The desired temperature of the liquid in the collection basin, also known as the basin temperature set-point, can be changed by the operators instantaneously to meet additional cooling requirements such as cracking heavier crude, maintain vacuum backpressure in a steam turbine, prevent fouling of the heat exchanger or to derate the plant to part-load. Industrial computer 300 is in electronic signal communication with the plant DCS (Distributed Control System) 315 (see FIG. 2). The operators use plant DCS 315 to input the revised basin temperature set-point into industrial computer 300. Industrial computer 300 communicated this information to DAQ device 200. Sensor 428 continuously measures the temperature of the liquid in the collection basin in order to determine if the measure temperature is above or below the basin temperature set-point. DAQ device 200 processes the temperature data provided by sensor 428, the revised basin temperature set point, the current weather conditions, thermal and process load, and pertinent historical data corresponding to weather, time of year and time of day.

In one embodiment, wet-bulb temperature is measured with suitable instrumentation such as psychrometers, thermohygrometers or hygrometers which are known in the art.

As a result of the adaptive characteristics of the variable process control system of the present invention, a constant basin temperature is maintained despite changes in process load, Cooling Tower Thermal Capacity, weather conditions or time of day. DAQ device 200 continuously generates updated sinusoidal fan speed curve in response to the changing process load, Cooling Tower Thermal Capacity, weather conditions or time of day.

Temperature sensor 430 measures the temperature at DAQ device 200 in order to detect overheating cause by electrical overload, short circuits or electronic component failure. In a preferred embodiment, if overheating occurs at DAQ device 200, then DAQ device 200 issues an emergency stop signal to VFD device 22 to initiate an emergency "Soft Stop Mode" to decelerate motor 20 to 0.00 RPM and to activate alarms (e.g. alarm 438, audio alarm, buzzer, siren, horn, flashing light, email and text messages to DCS 315, etc.) to alert operators to the fact that the system is attempting an emergency shut-down procedure due to excessive temperatures. In one embodiment of the present invention, if overheating occurs at DAQ device 200, DAQ device 200 issues a signal to VFD device 22 to maintain the speed of motor 20 at the current speed until the instrumentation can be inspected.

The operating parameters of motor 20 and the cooling tower are programmed into DAQ device 200. DAQ device 200 comprises a microprocessor or mini-computer and has computer processing power. Many of the operating parameters are defined over time and are based on the operating tolerances of the system components, fan and tower structure. Gradual heating of motor 20 (stator, rotor, laminations, coil, end turns, etc.) in small increments as determined by trending over months, etc. as compared with changes (i.e. reductions) in horsepower or fan torque over the same time interval, may indicate problems in the cooling tower such as clogged fill, poor water distribution, etc. Industrial computer 300 will trend the data and make a decision as to whether to display a notice on display 306 that notifies the operators that an inspection of the cooling tower is necessary. A sudden rise in motor temperature as a function of time may indicate that the cell water has been shut-off Such a scenario will trigger an inspection of the tower. The variable process control system of the present invention is designed to notify operators of any deviation from operating parameters. When deviations from these operating parameters and tolerances occur (relative to time), DAQ device 200 issues signals to the operators in order to notify them of the conditions and that an inspection is necessary. Relative large deviations from the operating parameters, such as large vibration spike or very high motor temperature, would cause DAQ device 200 to generate a control signal to VFD device 22 that will enable motor 20 to coast to complete stop. The fan is then held by the Fan Hold mode of operation. DAQ device 200 simultaneously issues alerts and notifications via email and/or text messages to DCS 315.

As described in the foregoing description, VFD device 22, DAQ device 200 and industrial computer 300 are housed in Motor Control Enclosure (MCE) 26. The variable process control system includes a purge system that maintains a continuous positive pressure on cabinet 26 in order to prevent potentially explosive gases from being drawn into MCE 26. Such gases may originate from the heat exchanger. The purge system comprises a compressed air source and a device (e.g. hose) for delivering a continuous source of pressurized air to MCE 26 in order to create a positive pressure which prevents entry of such explosive gases. In an alternate embodiment, MCE 26 is cooled with Vortex coolers that utilize compressed air. In a further embodiment, area classified air conditioners are used to deliver airflow to MCE 26.

Referring to FIG. 2, in a preferred embodiment, the system of the present invention further includes at least one pressure measurement device 440 that is located on the fan deck and which measures the pressure in the cooling tower plenum. In a preferred embodiment, there are a plurality of pressure measurement devices 400 to measure the pressure in the cooling tower plenum. Each pressure measurement device 440 is electrically connected to communication data junction box 111. The measured pressure equates to the pressure before the fan (i.e. fan inlet pressure). The measured pressure is used to derive fan pressure for use in cooling performance analysis.

Figure 1:
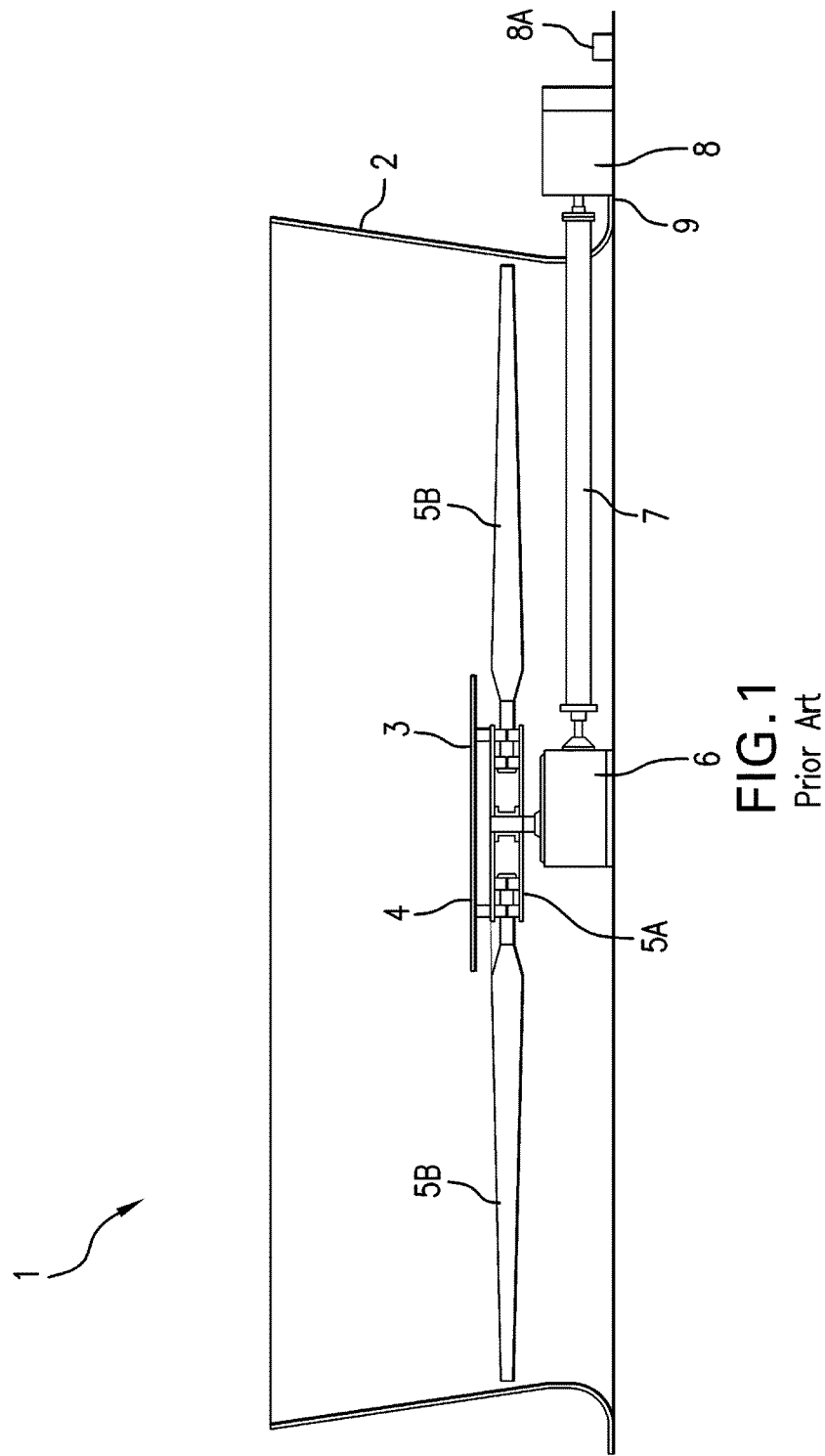
FIG. 1 is a side view, in elevation, of a wet-cooling tower that uses a prior art fan drive system.
Figure 13:
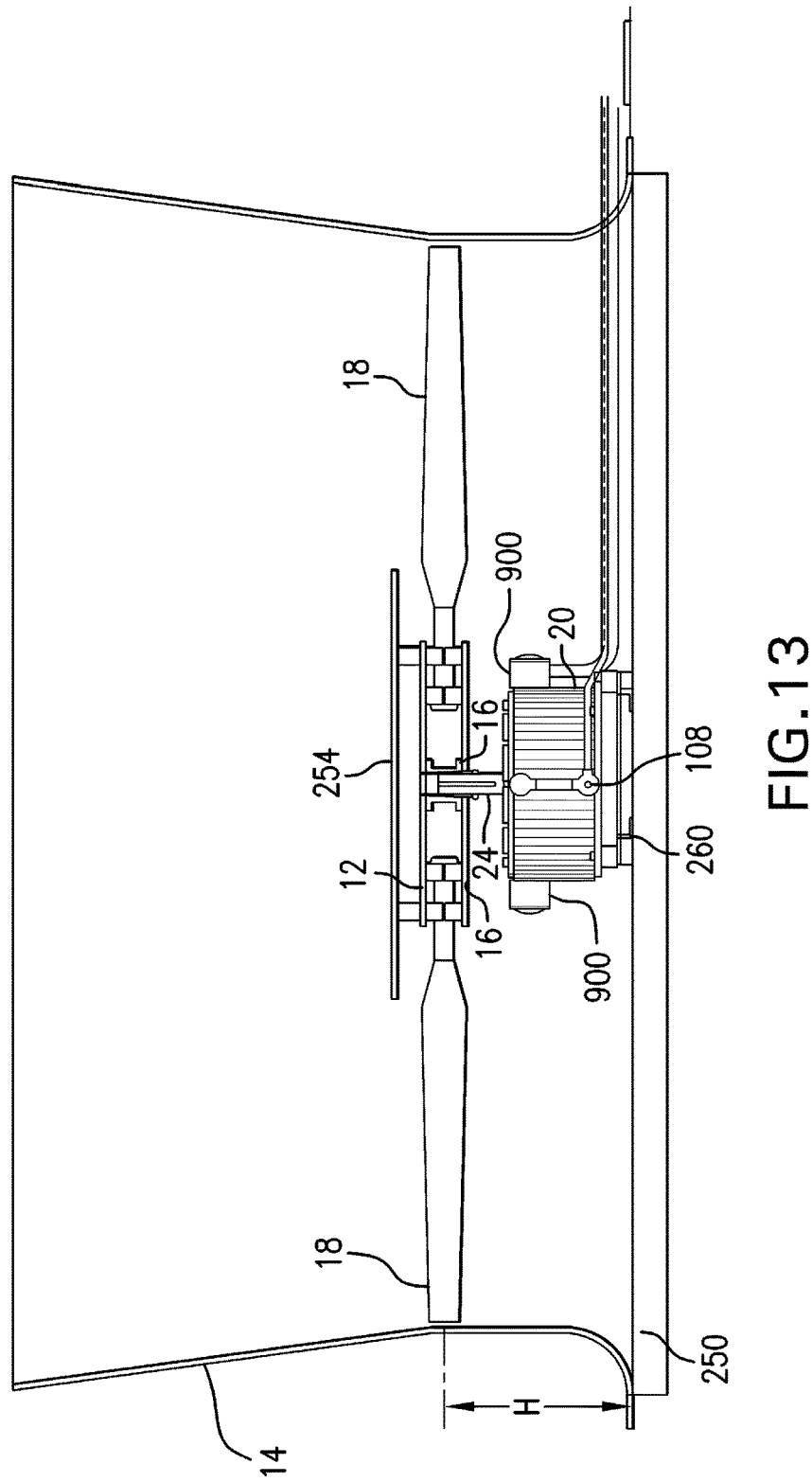
FIG. 13 shows an enlargement of a portion of the view shown in FIG. 12A.
Figure 14:
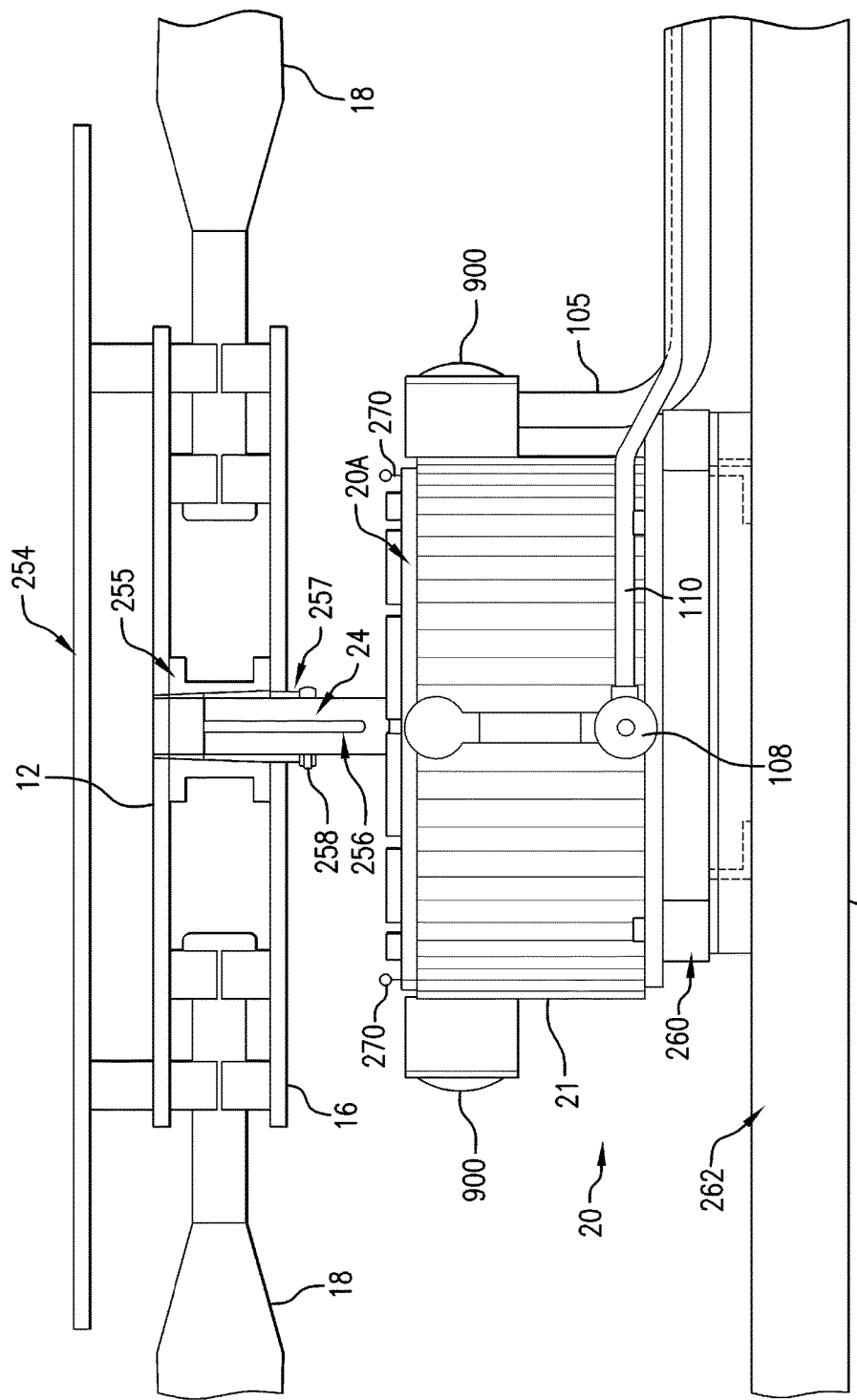
FIG. 14 is a side view, in elevation, showing the interconnection of the permanent magnet motor shown in FIGS. 12A and 13 with a fan hub.

It is critical that the fan be located at the correct fan height in order to produce the requisite amount of design fan pressure. The fan must operate at the narrow part of the fan stack in order to operate correctly, as shown in FIG. 13. Many prior art fan drive systems do not maintain the correct fan height within the existing parabolic fan stack installation. Such a misalignment in height causes significant degradation in cooling capacity and efficiency. An important feature of the fan drive system of the present invention is that the design architecture of motor 20 maintains or corrects the fan height in the fan stack. Referring to FIGS. 13 and 14, there is shown a diagram of a wet cooling tower that uses the fan drive system of the present invention. The wet cooling tower comprises fan stack 14 and fan deck 250. Fan stack 14 is supported by fan deck 250. Fan stack 14 has a generally parabolic shape. In other embodiments, fan stack 14 can have a straight cylinder shape (i.e. cylindrical shape). Fan stack 14 and fan deck 250 were discussed in the foregoing description. A parabolic fan stack 14 requires that the motor height accommodate the proper fan height in the narrow throat section of fan stack 14 in order to seal the end of the fan blade at the narrow point of the parabolic fan stack 14. This assures that the fan will operate correctly and provide the proper fan pump head for the application. The wet cooling tower includes fan assembly 12 which was described in the foregoing description. Fan assembly 12 comprises fan hub 16 and fan blades 18 that are connected to fan hub 16. Fan assembly 12 further comprises fan seal disk 254 that is connected to the top of fan hub 16. Fan hub 16 has a tapered bore 255. Motor 20 has a locking keyed shaft 24 which interfaces with a complementary shaped portion of tapered bore 255. Specifically, as shown in FIG. 14, motor shaft 24 is configured to have a key channel 256 that receives a complementary shaped portion of fan hub 16. Tapered bushing 257 is fastened to motor shaft 24 with set screw 258 so as to prevent movement of tapered bushing 257. The height H indicates the correct height at which the fan blades 18 should be located (see FIG. 13) within fan stack 14. The height H indicates the uppermost point of the narrow portion of fan stack 14. This is the correct height at which the fan blades 18 should be located in order for the fan assembly 12 to operate properly and efficiently. An optional adapter plate 260 can be used to accurately position the fan blades 18 at the correct height H (see FIGS. 13 and 14). Retrofitting motor 20 and adapter plate 260, as required, and correcting fan height can actually increase airflow through the cooling tower by setting the fan assembly 12 at the correct height H. Adapter plate 260 is positioned between ladder frame/torque tube 262 and motor 20 such that motor 20 is seated upon and connected to adapter plate 260. Motor 20 is connected to a ladder frame or torque tube or other suitable metal frame that extends over the central opening in the fan deck 250. Motor 20 is designed such that only four bolts are needed to connect motor 20 to the existing ladder frame or torque tube. As shown in FIG. 12B, motor housing 21 has four holes 264A, 264B, 264C and 264D extending therethrough to receive four mounting bolts. Adapter plate 260 is designed with corresponding through-holes that receive the aforementioned four bolts. The four bolts extend through corresponding openings 264A, 264B, 264C and 264D through the corresponding openings in adapter plate 260 and through corresponding openings in the ladder frame or torque tube. Thus, by design, the architecture of motor 20 is designed to be a drop-in replacement for all prior art gearboxes (see FIG. 1) and maintains or corrects fan height in the fan stack 14 without structural modifications to the cooling tower or existing ladder frame or torque tubes. Such a feature and advantage is possible because motor 20 is designed to have a weight that is the same or less than the prior art gearbox system it replaces. The mounting configuration of motor 20 (see FIG. 12B) allows motor 20 to be mounted to existing interfaces on existing structural ladder frames and torque tubes and operate within the fan stack meeting Area Classification for Class 1, Div. 2, Groups B, C, D. Therefore, new or additional ladder frames and torque tubes are not required when replacing a prior art gearbox system with motor 20. Since motor 20 has a weight that is the same or less than the prior art gearbox it replaces, motor 20 maintains the same weight distribution on the existing ladder frame or torque tube 262. Motor 20 is connected to fan hub 16 in the same way as a prior art gearbox is connected to fan hub 16. The only components needed to install motor 20 are: (a) motor 20 having power cable 105 wired thereto as described in the foregoing description, wherein the other end of power cable 105 is adapted to be electrically connected to motor disconnect junction box 106, (b) the four bolts that are inserted into through-holes 264A, 264B, 264C and 264D in motor casing or housing 21, (c) cable 110 having one terminated at a quick-disconnect adapter 108, and the other end adapted to be electrically connected to communication data junction box 111 (*d*) power cable 107 which is adapted to be electrically connected to motor disconnect junction box 106 and VFD device 22. Power cables 105 and 107 were described in the foregoing description. As a result of the design of motor 20, the process of replacing a prior art drive system with motor 20 is simple, expedient, requires relatively less crane hours, and requires relatively less skilled labor than required to install and align the complex, prior art gearboxes, shafts and couplings. In a preferred embodiment, motor 20 includes lifting lugs or hooks 270 that are rigidly connected to or integrally formed with motor housing 21. These lifting lugs 270 are located at predetermined locations on motor housing 21 so that motor 20 is balanced when being lifted by a crane during the installation process. Motor 20 and its mounting interfaces have been specifically designed for Thrust, Pitch, Yaw, reverse loads and fan weight (dead load).

Thus, motor 20 is specifically designed to fit within the installation envelope of an existing, prior art gearbox and maintain or correct the fan height in the fan stack. In one embodiment, the weight of motor 20 is less than or equal to the weight of the currently-used motor-shaft-gearbox drive system. In a preferred embodiment of the invention, the weight of motor 20 does not exceed 2500 lbs. In one embodiment, motor 20 has a weight of approximately 2350 lbs. Motor shaft 24 has been specifically designed to match existing interfaces with fan-hub shaft diameter size, profile and keyway. Motor 20 can rotate all hubs and attaching fans regardless of direction, blade length, fan solidity, blade profile, blade dimension, blade pitch, blade torque, and fan speed.

It is to be understood that motor 20 may be used with other models or types of cooling tower fans. For example, motor 20 may be used with any of the commercially available 4000 Series Tuft-Lite Fans manufactured by Hudson Products, Corporation of Houston, Tex. In an alternate embodiment, motor 20 is connected to a fan that is configured without a hub structure. Such fans are known are whisper-quiet fans or single-piece wide chord fans. When single-piece wide chord fans are used, rotatable motor shaft 24 is directly bolted or connected to the fan. One commercially available whisper-quiet fan is the PT2 Cooling Tower Whisper Quiet Fan manufactured by Baltimore Aircoil Company of Jessup, Md.

Motor 20 is designed to withstand the harsh chemical attack, poor water quality, mineral deposits and pH attack, biological growth, and humid environment without contaminating the lubrication system or degrading the integrity of motor 20. Motor 20 operates within the fan stack and does not require additional cooling ducts or flow scoops.

For a new installation (i.e. newly constructed cooling tower), the installation of motor 20 does not require ladder frames and torque tubes as do prior art gearbox systems. The elimination of ladder frames and torque tubes provides a simpler structure at a reduced installation costs. The elimination of the ladder frame and torque tubes significantly reduces obstruction and blockage from the support structure thereby reducing airflow loss. The elimination of ladder frames and torque tubes also reduce fan pressure loss and turbulence. The installation of motor 20 therefore is greatly simplified and eliminates multiple components, tedious alignments, and also reduces installation time, manpower and the level of skill of the personnel installing motor 20. The electrical power is simply connected at motor junction box 106. The present invention eliminates shaft penetration through the fan stack thereby improving fan performance by reducing airflow loss and fan pressure loss.

As described in the foregoing description, cable 105 is terminated or prewired at motor 20 during the assembly of motor 20. Such a configuration simplifies the installation of motor 20. Otherwise, confined-space entry training and permits would be required for an electrician to enter the cell to install cable 105 to motor 20. Furthermore, terminating cable 105 to motor 20 during the manufacturing process provides improved reliability and sealing of motor 20 since the cable 105 is assembled and terminated at motor 20 under clean conditions, with proper lighting and under process and quality control. If motor 20 is configured as a three-phase motor, then cable 105 is comprised of three wires and these three wires are to be connected to the internal wiring within motor disconnect junction box 106.

Test Results

Figure 11A:
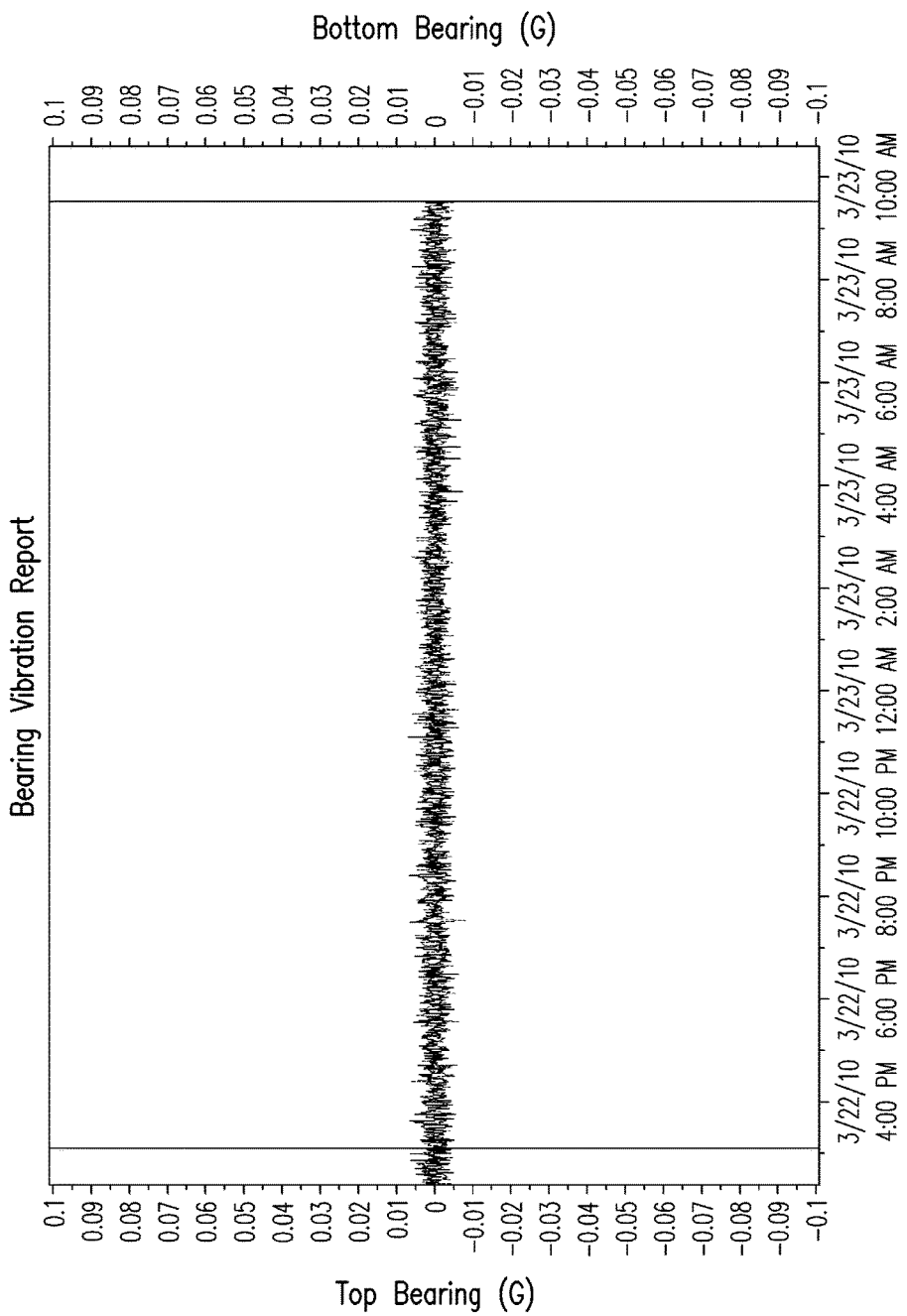
FIG. 11A is a vibration bearing report, in graph form, resulting from a test of the permanent magnet motor and vibration sensing and analysis components of the present invention.
Figure 11B:
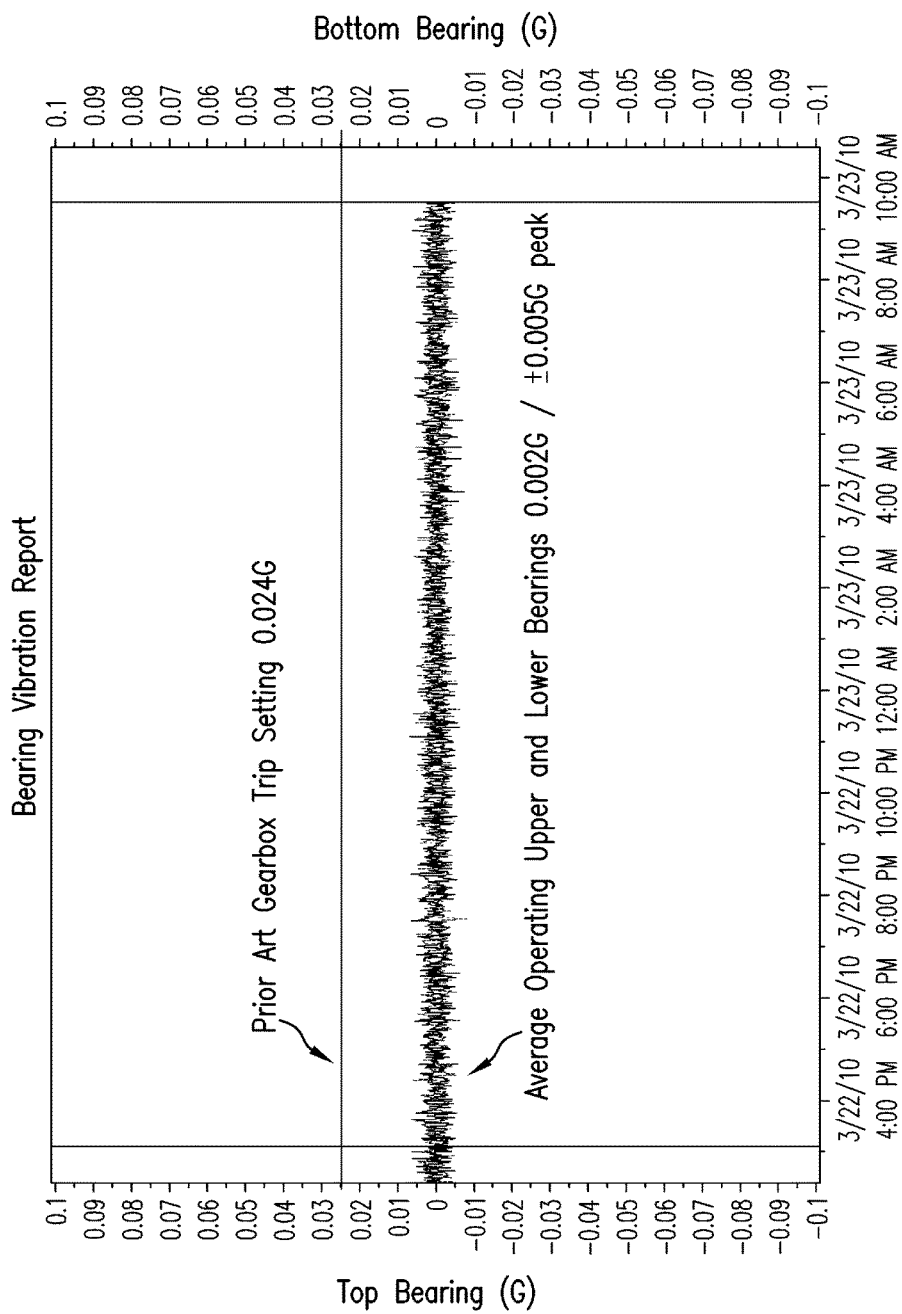
FIG. 11B is the same vibration bearing report of FIG. 11A, the vibration bearing report showing a trip setting of 0.024 G of a prior art gearbox.
Figure 11C:
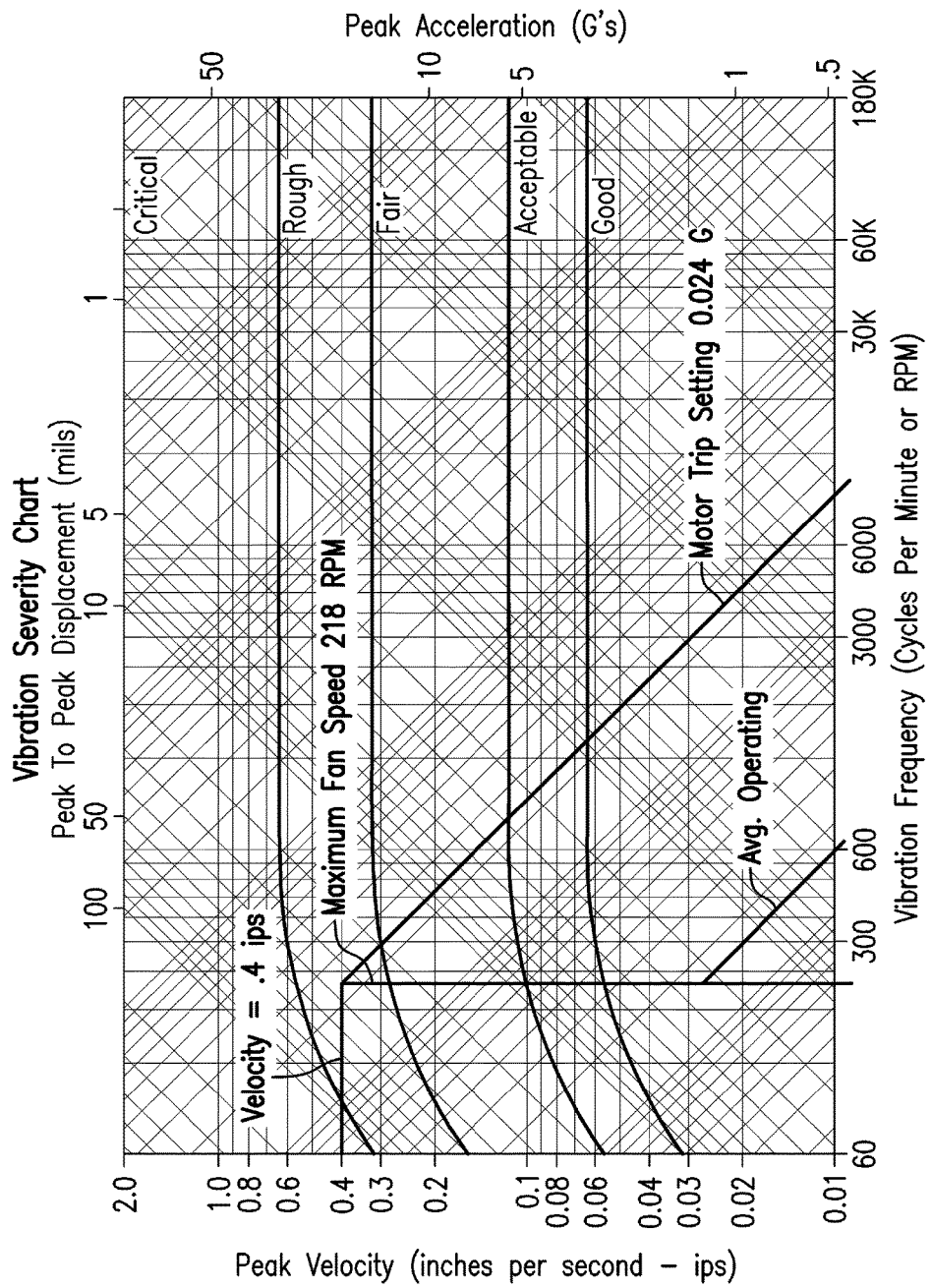
FIG. 11C is a vibration severity graph showing the level of vibrations generated by the permanent magnet motor of the present invention.

The system of the present invention was implemented with a wet-cooling tower system. Extensive Beta Testing was conducted on the system with particular attention being directed to vibrations and vibration analysis. FIG. 11A is a bearing vibration report, in graph form, which resulted from a beta test of the system of the present invention. FIG. 11B is the same bearing vibration report of FIG. 11A and shows a prior art (i.e. gearbox) trip value of 0.024 G. FIG. 11C is a vibration severity graph showing the level of vibrations generated by the system of the present invention. These test results reveal motor 20 and its drive system operate significantly smoother than the prior art gearbox systems thereby producing a significantly lower vibration signature. Such smooth operation is due to the unique bearing architecture of motor 20. The average operating range of the motor 20 is 0.002 G with peaks of ±0.005 G as opposed to the average prior art gearbox trip value of 0.024 G.

The aforementioned smooth operation of motor 20 and its drive system allows accurate control, supervision, monitoring and system-health management because the variable process control system of the present invention is more robust. On the other hand, prior art gear-train meshes (i.e. motor, shaft, couplings and subsequent multiple gear-train signatures) have multiple vibration signatures and resultant cross-frequency noise that are difficult to identify and manage effectively. Motor 20 increases airflow through a cooling tower by converting more of the applied electrical energy into airflow because it eliminates the losses of the prior art gearbox systems and is significantly more efficient than the prior art gearbox systems.

Figure 17:
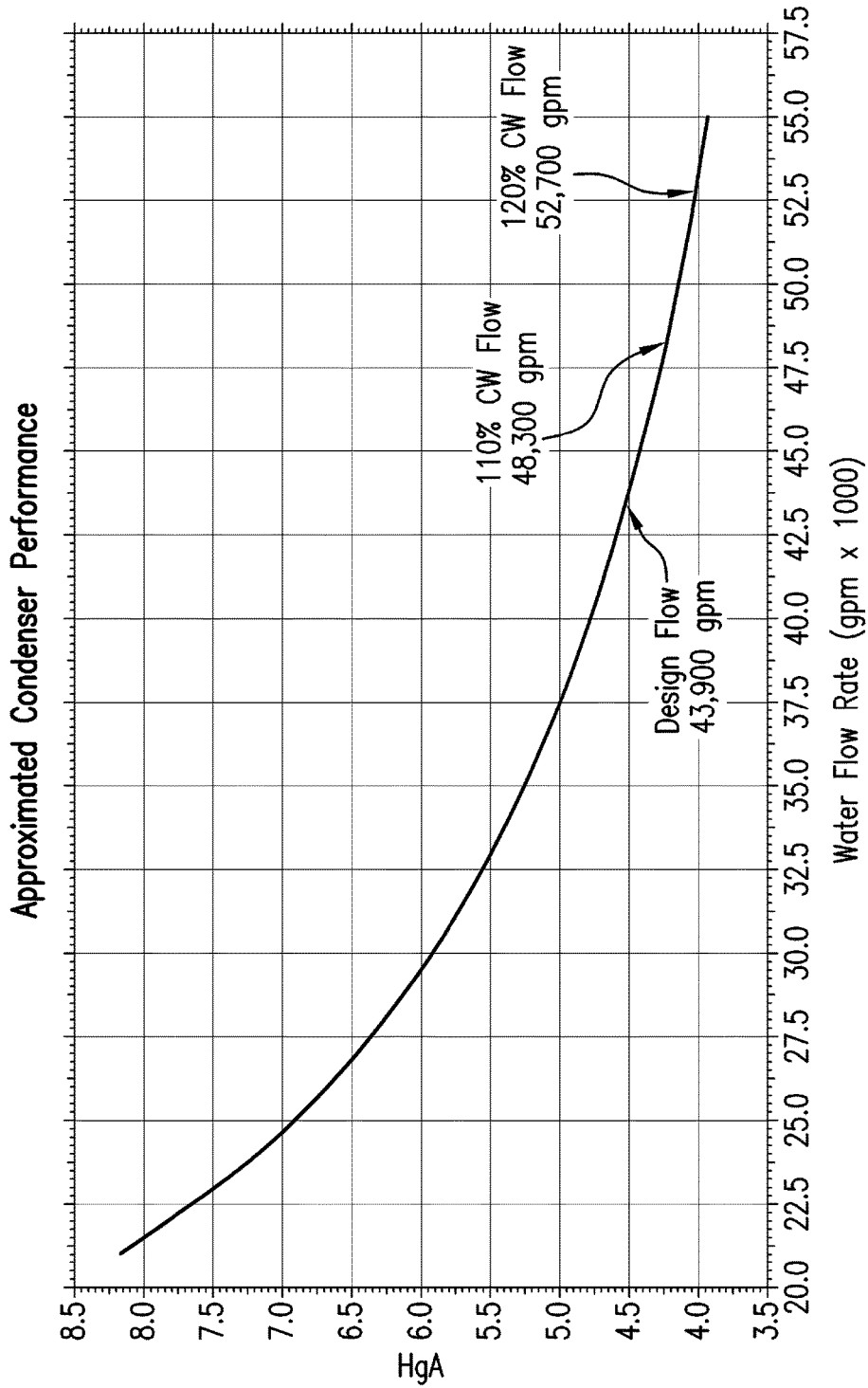
FIG. 17 is a graph of an example of condenser performance as a function of water flow rate (i.e. variable speed pumps and constant basin temperature)

A common prior art technique employed by many operators of cooling towers is to increase water flow into the cooling towers in order to improve condenser performance. FIG. 17 shows a graph of approximated condenser performance. However, the added stress of the increased water flow causes damage to the cooling tower components and actually reduces cooling performance of the tower (L/G ratio). In some cases, it can lead to catastrophic failure such as the collapse of a cooling tower at one of Shell Chemical's olefins units at Deer Park, Tex. (see Chemical Week, Jul. 17, 2002, page 14). However, with the variable process control system of the present invention, increasing water flow is totally unnecessary because the cooling tower design parameters are programmed into both DAQ device 200 and industrial computer 300. Specifically, in the variable process control system of the present invention, the cooling tower pumps and auxiliary systems are networked with the fans to provide additional control, supervision and monitoring to prevent flooding of the tower and dangerous off-performance operation. In such an embodiment, the pumps are hardwired to DAQ device 200 so that DAQ device 200 controls the operation of the fan, motor and pumps. In such an embodiment, pump-water volume is monitored as a way to prevent the collapse of the tower under the weight of the water. Such monitoring and operation of the pumps will improve part-load cooling performance of the tower as the L/G ratio is maximized for all load and environmental conditions. Such monitoring and operation will also prevent flooding and further reduce energy consumption. The flow rate through the pumps is a function of process demand or the process of a component, such as the condenser process. In a preferred embodiment, the variable process control system of the present invention uses variable speed pumps. In an alternate embodiment, variable frequency drive devices, similar to VFD device 22, are used to control the variable speed pumps in order to further improve part-load performance. In a further embodiment, the cooling tower variable speed pumps are driven by permanent magnet motors that have the same or similar characteristics as motor 20.

Thus, the present invention can:
1) operate the fan at a constant speed;
2) vary the speed of the fan to maintain a constant basin temperature as the environmental and process demand conditions change;
3) use current wet-bulb temperature and environmental stress and past process demand and past environmental stress to anticipate changes in fan speed, and ramp fan speed up or ramp fan speed down in accordance with a sine wave (see FIG. 9) in order to meet cooling demand and save energy with relatively smaller and less frequent changes in fan speed;
4) vary the speed of the fan to maintain a constant basin temperature as environmental stress and process demands change AND maintain pre-defined heat exchanger and turbine back-pressure set-points in the industrial process in order to maintain turbine back-pressure and avoid heat exchanger fouling;
5) vary the speed of the fan and the speed of the variable speed pumps to maintain a constant basin temperature as environmental stress and process demands change AND maintain pre-defined heat exchanger and turbine back-pressure set-points in the industrial process in order to maintain turbine back-pressure and avoid heat exchanger fouling;
6) vary the speed of the fan to maintain a constant basin temperature as environmental stress and process conditions change AND maintain pre-defined heat exchanger and turbine back-pressure set-points in the industrial process in order to maintain turbine back-pressure and avoid heat exchanger fouling AND prevent freezing of the cooling tower by either reducing fan speed or operating the fan in reverse;
7) vary the speed of the fan to change basin temperature as environmental stress and process conditions change AND maintain pre-defined heat exchanger and turbine back-pressure set-points in the industrial process in order to maintain turbine back-pressure and avoid heat exchanger fouling AND prevent freezing of the cooling tower by either reducing fan speed or operating the fan in reverse; and
8) vary the speed of the fan and the speed of the variable speed pumps to change the basin temperature as environmental stress and process conditions change AND maintain turbine back-pressure and avoid heat exchanger fouling AND prevent freezing of the cooling tower by either reducing fan speed or operating the fan in reverse.

Referring to FIG. 26, there is shown a schematic diagram of the variable process control system and motor 20 of the present invention used with a wet-cooling tower that is part of an industrial process. In this embodiment, the variable process control system includes a plurality of variable speed pumps. Each variable speed pump comprises a permanent magnet motor that has the same operational characteristics as permanent magnet motor 20. Wet-cooling tower 1700 comprises tower structure 1702, fan deck 1704, fan stack 1706 and collection basin 1708. Cooling tower 1700 includes fan 1710 and permanent magnet motor 20 which drives fan 1710. Fan 1710 has the same structure and function as fan 12 which was described in the foregoing description. Cooling tower 1700 includes inlet for receiving make-up water 1712. The portion of cooling tower 1700 that contains the fill material, which is well known in the art, is not shown in FIG. 26 in order to simplify the drawing. Collection basin 1708 collects water cooled by fan 1710. Variable speed pumps pump the cooled water from collection basin 1708, to condenser 1714, and then to process 1716 wherein the cooled water is used in an industrial process. It is to be understood that condenser 1714 is being used as an example and a similar device, such as a heat exchanger, can be used as well. The condenser temperature set-point is typically set by the operators through the Distributed Control System 315 (see FIG. 3) via signal 1717. The industrial process may be petroleum refining, turbine operation, crude cracker, etc. The variable speed pumps also pump the heated water from process 1716 back to condenser 1714 and then back to cooling tower 1700 wherein the heated water is cooled by fan 1710. Cooled water exiting collection basin 1708 is pumped by variable speed pump 1722 to condenser 1714. Variable speed pump 1722 further includes an instrumentation module which outputs pump status data signals 1726 that represent the flow rate, pressure and temperature of water flowing through variable speed pump 1722 and into condenser 1714. Data signals 1726 are inputted into DAQ device 200. This feature will be discussed in the ensuing description. Water exiting condenser 1714 is pumped to process 1716 by variable speed pump 1730. Variable speed pump 1730 includes an instrumentation module that outputs pump status data signals 1734 that represent the flow rate, pressure and temperature of water flowing through variable speed pump 1730. Water leaving process 1716 is pumped back to condenser by 1714 by variable speed pump 1738. Variable speed pump 1738 includes an instrumentation module which outputs pump status data signals 1742 that represent the flow rate, pressure and temperature of water flowing through variable speed pump 1738. The water exiting condenser 1714 is pumped back to cooling tower 1700 by variable speed pump 1752. Variable speed pump 1752 further includes an instrumentation module that outputs pump status data signals 1756 that represent the flow rate, pressure and temperature of water flowing through variable speed pump 1752.

VFD device 22 comprises a plurality of Variable Frequency Devices. Specifically, VFD device 22 comprises VFD devices 23A, 23B, 23C, 23D and 23E. VFD device 23A outputs power over power cable 107. Power cables 107 and 105 are connected to junction box 106. Power cable 105 delivers the power signals to motor 20. Power cables 105 and 107 and junction box 106 were discussed in the foregoing description. VFD device 23B outputs power signal 1724 for controlling the permanent magnet motor of the variable speed pump 1722. VFD device 23C outputs power signal 1732 for controlling the permanent magnet motor of the variable speed pump 1730. VFD device 23D outputs power signal 1740 for controlling the permanent magnet motor of the variable speed pump 1738. VFD device 23E outputs power signal 1754 for controlling the permanent magnet motor of the variable speed pump 1752. DAQ device 200 is in electronic signal communication with VFD devices 23A, 23B, 23C, 23D and 23E. DAQ device 200 is programmed to control each VFD device 23A, 23B, 23C, 23D and 23E individually and independently. All variable speed pump output data signals 1726, 1734, 1742 and 1756 from the variable speed pumps 1722, 1730, 1738 and 1752, respectively, are inputted into DAQ device 200. DAQ device 200 processes these signals to determine the process load and thermal load. DAQ device 200 determines the thermal load by calculating the differences between the temperature of the water leaving the collection basin and the temperature of the water returning to the cooling tower. DAQ device 200 determines process demand by processing the flow-rates and pressure at the variable speed pumps. Once DAQ device 200 determines the thermal load and process load, it determines whether the rotational speed of the fan 1710 is sufficient to meet the process load. If the current rotational speed of the fan is not sufficient, DAQ device 200 develops a fan speed curve that will meet the thermal demand and process demand. As described in the foregoing description, DAQ device 200 uses Cooling Tower Thermal Capacity, current thermal demand, current process demand, current environmental stress, and historical data, such as historic process and thermal demand and historic environmental stress to generate a fan speed curve.

As shown in FIG. 26, DAQ device 200 also receives the temperature and vibration sensor signals that were discussed in the foregoing description. Typically, the basin temperature set-point is based on the condenser temperature set-point which is usually set by the plant operators. DAQ device 200 determines if the collection basin temperature meets the basin temperature set-point. If the collection basin temperature is above or below the basin temperature set-point, then DAQ device 200 adjusts the rotational speed of motor 20 in accordance with a revised or updated fan speed curve. Therefore, DAQ device 200 processes all sensor signals and data signals from variable speed pumps 1722, 1730, 1738 and 1752. DAQ device 200 is programmed to utilize the processed signals to determine if the speed of the variable speed pumps should be adjusted in order to increase cooling capacity for increased process load, adjust the flow rate of water into the tower, prevent condenser fouling, maintain vacuum back-pressure, or adjust the flow-rate and pressure at the pumps for plant-part load conditions in order to conserve energy. If speed adjustment of the variable speed pumps is required, DAQ device 200 generates control signals that are routed over data bus 202 for input to VFD devices 23B, 23C, 23D and 23E. In response, these VFD devices 23B, 23C, 23D and 23E generate power signals 1724, 1732, 1740 and 1754, respectively, for controlling the permanent magnet motors of variable speed pumps 1722, 1730, 1738 and 1752, respectively. DAQ device 200 controls each VFD devices 23A, 23B, 23C, 23D and 23E independently. Thus, DAQ device 200 can increase the speed of one variable speed pump while simultaneously decreasing the speed of another variable speed pump and adjusting the speed of the fan 1710.

In an alternate embodiment of the invention, all variable speed pump output data signals 1726, 1734, 1742 and 1756 are not inputted into DAQ device 200 but instead, are inputted into industrial computer 300 (see FIG. 3) which processes the pump output data signals and then outputs pump control signals directly to the VFD devices 23B, 23C, 23D and 23E.

Each instrumentation module of each variable speed pump includes sensors for measuring motor and pump vibrations and temperatures. The signals outputted by these sensors are inputted to DAQ device 200 for processing.

It is to be understood that instrumentation of than the aforesaid instrumentation modules may be used to provide the pump status signals. The electrical power source for powering all electrical components and instruments shown in FIG. 26 is not shown in order to simplify the drawing. Furthermore, all power and signal junction boxes are not shown in order to simplify the drawing.

Furthermore, the DAQ device 200 and industrial computer 300 enable the health monitoring of Cooling Tower Thermal Capacity, energy consumption and cooling tower operation as a way to manage energy and thereby further enhance cooling performance, troubleshooting and planning for additional upgrades and modifications.

The Federal Clean Air Act and subsequent legislation will require monitoring of emissions from cooling towers of all types (Wet Cooling, Air and HVAC). Air and hazardous gas monitors can be integrated into the motor housing 21 as Line Replaceable Units to sense leaks in the system. The Line Replaceable Units (LRU) are mounted and sealed into the motor in a manner similar to the (LRU) vibration sensors described in the foregoing description. The LRUs will use power and data communication resources available to other components of the variable process control system. Hazardous gas monitors can also be located at various locations in the cooling tower fan stack and air-flow stream. Such monitors can be electronically integrated with DAQ device 200. The monitors provide improved safety with 100% monitoring of dangerous gases and also provide the capability to trace the source of the gas (e.g. leaking condenser, heat exchanger, etc.). Such a feature can prevent catastrophic events.

In response to the data provided by the sensors, DAQ device 200 generates appropriate signals to control operation of motor 20, and hence fan assembly 12. Thus, the variable process control system of the present invention employs feedback control of motor 20 and monitors all operation and performance data in real-time. As a result, the operation of motor 20 and fan assembly 12 will vary in response to changes in operating conditions, process demand, environmental conditions and the condition of subsystem components. The continuous monitoring feature provide by the feedback loops of the variable process control system of the present invention, shown in FIG. 3, is critical to efficient operation of the cooling tower and the prevention of failure of and damage to the cooling tower and the components of the system of the present invention. As a result of continuously monitoring the parameters of motor 20 that directly relate to the tower airflow, operating relationships can be determined and monitored for each particular cooling tower design in order to monitor motor health, cooling tower health, Cooling Tower Thermal Capacity, provide supervision, trigger inspections and trigger maintenance actions. For example, in the system of the present invention, the horsepower (HP) of motor 20 is related to airflow across fan 12. Thus, if the fill material of the tower is clogged, the airflow will be reduced. This means that motor 20 and fan assembly 12 must operate longer and under greater strain in order to attain the desired basin temperature. The temperature within the interior of motor casing 21 and stator 32 increases and the motor RPM starts to decrease. The aforementioned sensors measure all of these operating conditions and provide DAQ device 200 with data that represents these operating conditions. The feedback loops continuously monitor system resonant vibrations that occur and vary over time and initiate operational changes in response to the resonant vibrations thereby providing adaptive vibration control. If resonant vibrations occur at a certain motor speed, then the feedback loops cause that particular motor speed (i.e. RPM) to be locked out. When a motor speed is locked out, it means that the motor 20 will not be operated at that particular speed. If the vibration signature is relatively high, which may indicate changes in the fan blade structure, ice build-up or a potential catastrophic blade failure, the feedback loops will cause the system to shut down (i.e. shut down motor 20). If a vibration signature corresponds to stored data representing icing conditions (i.e. temperature, wind and fan speed), then DAQ device 200 will automatically initiate the De-Icing Mode of operation. Thus, the feedback loops, sensors, pump status signals, and DAQ device 200 cooperate to:

a) measure vibrations at the bearings of motor 20;
b) measure temperature at the stator of motor 20;
c) measure temperature within motor casing 21;
d) measure environmental temperatures near motor 20 and fan assembly 12;
e) determine process demand;
f) measure the temperature of the water in the cooling tower collection basin;
g) identify high vibrations which are the characteristics of "blade-out" or equivalent and immediately decelerate the fan to zero (0) RPM and hold the fan from windmilling, and immediately alert the operators using the known alert systems (e.g. email, text or DCS alert);
h) lock out particular motor speed (or speeds) that create resonance;
i) identify icing conditions and automatically initiate the De-Icing Mode of operation and alert operators and personnel via e-mail, text or DCS alert; and
j) route the basin-water temperature data to other portions of the industrial process so as to provide real-time cooling feedback information that can be used to make other adjustments in the overall industrial process.

In a preferred embodiment, the variable process control system of the present invention further comprises at least one on-sight camera 480 that is located at a predetermined location. Camera 480 is in electrical signal communication with communication data junction box 111 and outputs a video signal that is fed to DAQ device 200. The video signals are then routed to display screens that are being monitored by operations personnel. In a preferred embodiment, the video signals are routed to industrial computer 300 and host server 310. The on-sight camera 480 monitors certain locations of the cooling tower to ensure authorized operation. For example, the camera can be positioned to monitor motor 20, the cooling tower, the fan, etc. for unauthorized entry of persons, deformation of or damage to system components, or to confirm certain conditions such as icing. In a preferred embodiment, there is a plurality of on-sight cameras.

Industrial computer 300 is in data communication with data base 301 for storing (1) historical data, (2) operational characteristics of subsystems and components, and (3) actual, real-time performance and environmental data. Industrial computer 300 is programmed to use this data to optimize energy utilization by motor 20 and other system components, generate trends, predict performance, predict maintenance, and monitor the operational costs and efficiency of the system of the present invention. Industrial computer 300 uses historical data, as a function of date and time, wherein such historical data includes but is not limited to (1) weather data such as dry bulb temperature, wet bulb temperature, wind speed and direction, and barometric temperature, (2) cooling tower water inlet temperature from the process (e.g. cracking crude), (3) cooling tower water outlet temperature return to process, (4) fan speed, (5) cooling tower plenum pressure at fan inlet, (6) vibration at bearings, (7) all motor temperatures, (8) cooling tower water flow rate and pump flow-rates, (9) basin temperature, (10) process demand for particular months, seasons and times of day, (11) variations in process demand for different products, e.g. light crude, heavy crude, etc., (12) previous maintenance events, and (13) library of vibration signatures, (14) cooling tower design, (15) fan map, (16) fan pitch and (17) Cooling Tower Thermal Capacity.

Industrial computer 300 also stores the operational characteristics of subsystems or components which include (1) fan pitch and balancing at commissioning, (2) known motor characteristics at commissioning such as current, voltage and RPM ratings, typical performance curves, and effects of temperature variations on motor performance, (3) variation in performance of components or subsystem over time or between maintenance events, (4) known operating characteristics of variable frequency drive (VFD), (5) operating characteristics of accelerometers including accuracy and performance over temperature range, and (6) cooling tower performance curves and (7) fan speed curve. Actual real-time performance and environmental data are measured by the sensors of the system of the present invention and include:

1) weather, temperature, humidity, wind speed and wind direction;
2) temperature readings of motor interior, motor casing, basin liquids, air flow generated by fan, variable frequency drive, and data acquisition device;
3) motor bearing accelerometer output signals representing particular vibrations (to determine fan pitch, fan balance and fan integrity);
4) plenum pressure at fan inlet;
5) pump flow-rates which indicate real-time variations in process demand;
6) motor current (amp) draw and motor voltage;
7) motor RPM (fan speed);
8) motor torque (fan torque);
9) motor power factor;
10) motor horsepower, motor power consumption and efficiency;
11) exception reporting (trips and alarms);
12) system energy consumption; and
13) instrumentation health.

Industrial computer 300 processes the actual real-time performance and environmental data and then correlates such data to the stored historical data and the data representing the operational characteristics of subsystems and components in order to perform the following tasks: (1) recognize new performance trends, (2) determine deviation from previous trends and design curves and related operating tolerance band, (3) determine system power consumption and related energy expense, (4) determine system efficiency, (5) development of proactive and predictive maintenance events, (6) provide information as to how maintenance intervals can be maximized, (7) generate new fan speed curves for particular scenarios, and (8) highlight areas wherein management and operation can be improved. VFD device 22 provides DAQ device 200 with data signals representing motor speed, motor current, motor torque, and power factor. DAQ device 200 provides this data to industrial computer 300. As described in the foregoing description, industrial computer 300 is programmed with design fan map data and cooling tower thermal design data. Thus, for a given thermal load (temperature of water in from process, temperature of water out from process and flow, etc.) and a given day (dry bulb temp, wet bulb temp, barometric pressure, wind speed and direction, etc.), the present invention predicts design fan speed from the tower performance curve and the fan map and then compares the design fan speed to operating performance. The design of each tower is unique and therefore the programming of each tower is unique. The programming of all towers includes the operational characteristic that a tower clogged with fill would require the motor to run faster and longer and would be captured by trending. Fan inlet pressure sensors are in electronic signal communication with DAQ device 200 and provide data representing airflow. Since industrial computer 300 determines operating tolerances based on trending data, the operation of the fan 12 at higher speeds may trigger an inspection. This is totally contrary to prior art fan drive systems wherein the operators do not know when there are deviations in operational performance when tower fill becomes clogged.

Industrial computer 300 is programmed to compare the signals of the vibration sensors 400, 402, 404 and 406 on motor the bearing housings 50 and 52 as a way to filter environmental noise. In a preferred embodiment, industrial computer 300 is programmed so that certain vibration frequencies are maintained or held for a predetermined amount of time before any reactive measures are taken. Certain vibration frequencies indicate different failure modes and require a corresponding reaction measure. The consistent and tight banding of the vibration signature of motor 20 allows for greater control and supervision because changes in the system of the present invention can be isolated and analyzed immediately thereby allowing for corrective action. Isolated vibration spikes in the system of the present invention can be analyzed instantaneously for amplitude, duration, etc. Opposing motor bearing signatures can be compared to minimize and eliminate trips due to environmental vibrations without impacting safety and operation (false trip). As described in the foregoing description, industrial computer 300 is also programmed with operational characteristics of the wet-cooling tower and ACHE. For example, industrial computer 300 has data stored therein which represents the aerodynamic characteristics of the fill material in the cooling tower. The processor of industrial computer 300 implements algorithms that generate compensation factors based on these aerodynamic characteristics. These compensation factors are programmed into the operation software for each particular cooling tower. Thus, the positive or negative aerodynamic characteristics of the fill material of a particular wet-cooling tower or ACHE are used in programming the operation of each wet-cooling tower or ACHE. As described in the foregoing description, industrial computer 300 is programmed with the historical weather data for the particular geographical location in which the wet-cooling tower or ACHE is located. Industrial computer 300 is also programmed with historical demand trend which provides information that is used in predicting high-process demand and low-process demand periods. Since industrial computer 300 and DAQ device 200 are programmed with the cooling tower thermal design data that is unique to each tower including the fan map, each cooling tower can be designed to have its own unique set of logic depending on its geographical location, design (e.g. counter-flow, cross flow, ACHE, HVAC) and service (e.g. power plant, refinery, commercial cooling, etc.). When these characteristics are programmed into industrial computer 300, these characteristics are combined with sufficient operational data and trending data to establish an operational curve tolerance band for that particular cooling tower. This enables cooling tower operators to predict demand based upon historical operational characteristics and optimize the fan for energy savings by using subtle speed changes as opposed to dramatic speed changes to save energy.

A significant feature of the present invention is that the air flow through the cooling tower is controlled via the variable speed fan to meet thermal demand and optimize energy efficiency of the system. DAQ device 200 generates motor-speed control signals that are based on several factors including cooling tower basin temperature, historical trending of weather conditions, process cooling demand, time of day, current weather conditions such as temperature and relative humidity, cooling tower velocity requirements, prevention of icing of the tower by reducing fan speed, and de-icing of the tower using reverse rotation of the fan. Thus, the system of the present invention can anticipate cooling demand and schedule the fan (or fans) to optimize energy savings (ramp up or ramp down) while meeting thermal demand. The system of the present invention is adaptive and thus learns the cooling demand by historical trending (as a function of date and time).

The speed of the fan or fans may be increased or decreased as a result of any one of several factors. For example, the speed of the fan or fans may be decreased or increased depending upon signals provided by the basin water temperature sensor. In another example, the speed of the fan or fans may be increased or decreased as a result of variable process demand wherein the operator or programmable Distributed Control System (DCS) 315 generates a signal indicating process-specific cooling needs such as the need for more cooling to maintain or lower turbine back-pressure. In a further example, the speed of the fan or fans may be increased or decreased by raising the basin temperature if the plant is operating at part-load production. Fan speed can also be raised in "compensation mode" if a cell is lost in a multiple-cell tower in order to overcome the cooling loss. Since motor 20 provides more torque than a comparable prior art induction motor, motor 20 can operate with increased fan pitch providing required design airflow at slower speeds. Since most 100% speed applications operate at the maximum fan speed of 12,000 fpm to 14,000 fpm maximum tip speed depending upon the fan design, the lower speeds of motor 20 provide an airflow buffer that can be used for hot day production, compensation mode and future cooling performance.

A particular geographical location may have very hot summers and very cold winters. In such a case, the variable process control system operates the fan in the "hot-day" mode of operation on very hot summer days in order to meet the maximum thermal load at 100%. When the maximum thermal load diminishes, the speed of the fan is then optimized at lower fan speeds for energy optimization. The fan will operate in this energy optimization mode during the cooler months in order to optimize energy consumption, which may include turning fan cells off. Since the torque of motor 20 is constant, the shifting of fan speed between maximum operation and energy optimization is without regard to fan pitch. The constant, high-torque characteristics of motor 20 allow the fan to be re-tasked for (true) variable speed duty. Thus, the variable process control system of the present invention operates in a manner totally opposite to that of prior art fan drive systems wherein an induction motor drives the fan at 100% speed, typically between 12,000 and 14,000 ft/min tip speed, and wherein the fan remains at constant speed and its pitch is limited by the torque limitations of the induction motor. In order to provide the required torque, the size of the prior art induction motor would have to be significantly increased, but this would dramatically increase the weight of the motor. On the other hand, in the present invention, permanent magnet motor 20 is able to drive the fan at slower speeds with increased fan pitch without exceeding the fan tip speed limitation of 12,000 feet/minute. Slower fan speed also allows for quieter operation since fan noise is a direct function of speed. Motor 20 allows 100% design air flow to be set below the maximum fan tip speed. This feature allows for a design buffer to be built into the variable process control system of the present invention to allow for additional cooling capacity in emergency situations such as the compensation mode (for multi-cell systems) or extremely hot days or for increased process demand such as cracking heavier crude. The constant torque of motor 20 also means that part-load operation is possible without the limitations and drawbacks of prior art fan drive systems that use a gearbox and induction motor. In such prior art systems, part-load torque may not be sufficient to return the fan to 100% speed and would typically require a larger induction motor with increased part-load torque.

Motor 20 converts relatively more "amperes to air" than prior art gearbox systems. Specifically, during actual comparison testing of a cooling system using motor 20 and a cooling system using a prior art gearbox system, motor 20 is at least 10% more efficient than prior art gearbox systems. During testing, at 100% fan speed and design pitch, a power-sight meter indicated the prior art gearbox system demanded 50 kW whereas motor 20 demanded 45 kW. Almost all existing towers are cooling limited. Since motor 20 is a drop-in replacement for prior art gearboxes, motor 20 will have an immediate impact on cooling performance and production.

Figure 15A:
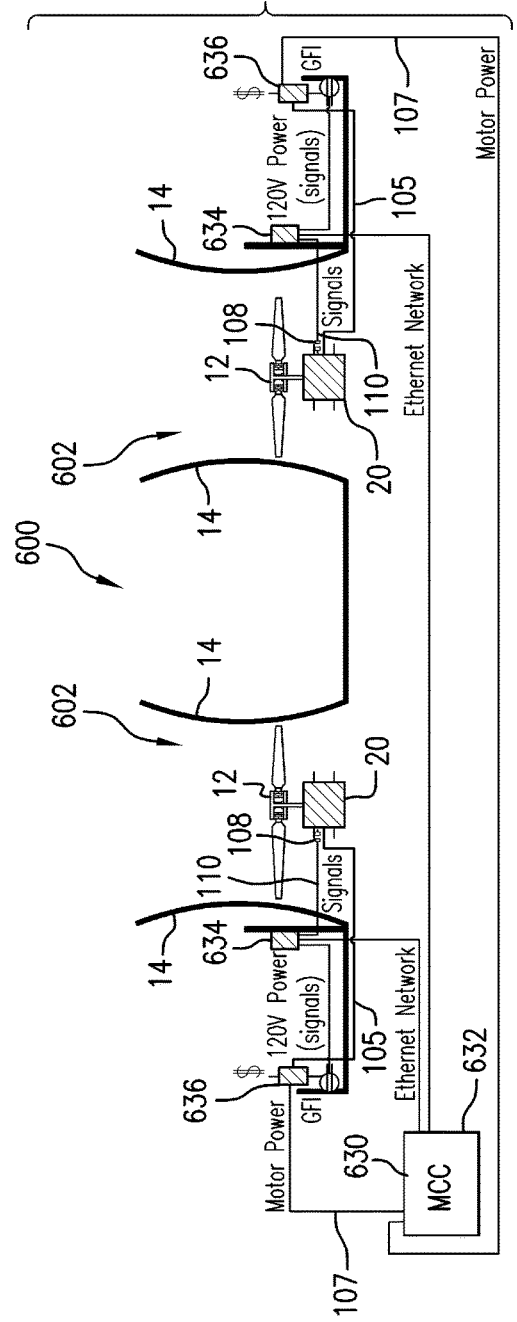
FIG. 15A is a diagram of a multi-cell cooling system that utilizes the fan direct-drive system of the present invention.
Figure 15B:
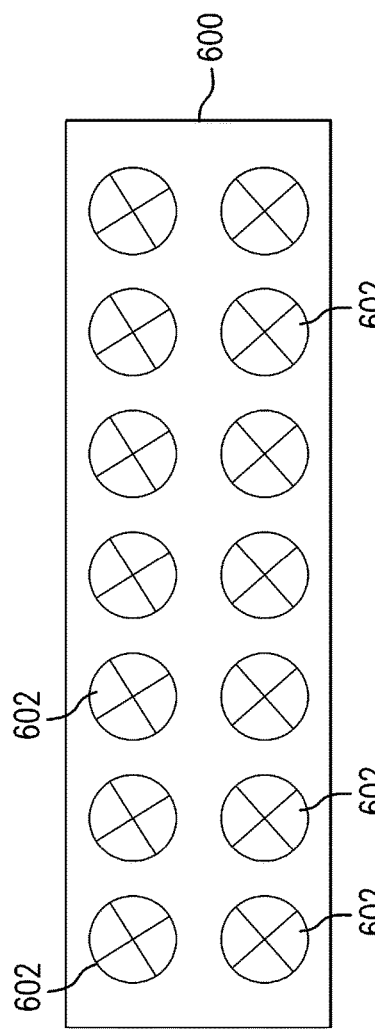
FIG. 15B is a top view of a multi-cell cooling system.
Figure 15C:
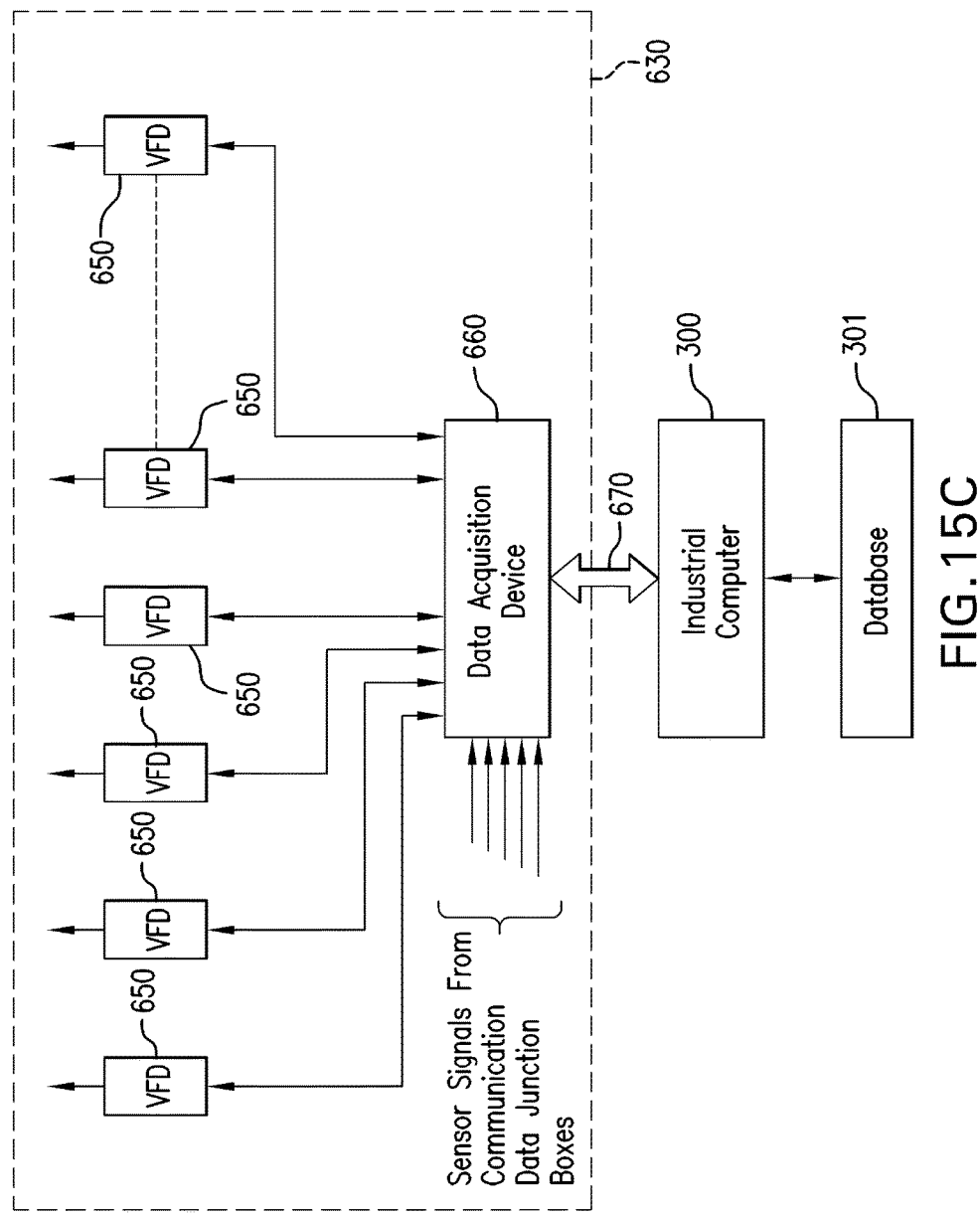
FIG. 15C is a block diagram of a motor-control center (MCC) that is shown in FIG. 15A.

The system and method of the present invention is applicable to multi-cell cooling apparatuses. For example, a wet-cooling tower may comprise a plurality of cells wherein each cell has a fan, fan stack, etc. Similarly, a multi-cell cooling apparatus may also comprise a plurality of ACHEs, HVACs or chillers (wet or dry, regardless of mounting arrangement). Referring to FIGS. 15A, 15B and 15C, there is multi-cell cooling apparatus 600 which utilizes the variable process control system of the present invention. Multi-cell cooling apparatus 600 comprises a plurality of cells 602. Each cell 602 comprises fan assembly 12 and fan stack 14. Fan assembly 12 operates within fan stack 14 as described in the foregoing description. Each cell 602 further comprises permanent magnet motor 20. In this embodiment, the system of the present invention includes Motor Control Center (MCC) 630. A Motor Control Center (MCC) typically serves more than one motor or fan cell. The Motor Control Center is typically located outside of the Class One, Division Two area on the ground, at least ten feet from the cooling tower. The Motor Control Center is in a walk-in structure that houses VFD device 22, DAQ device 200, industrial computer 300, power electronics and Switchgear. The Motor Control Center is air-conditioned to cool the electronics. The Motor Control Center is typically a walk-in metal building that houses the DAQ device, the Variable Frequency Drives, the industrial computer 300 and the power electronics. MCC 630 comprises a plurality of Variable Frequency Drive (VFD) devices 650. Each VFD device 650 functions in the same manner as VFD device 22 described in the forgoing description. Each VFD device 650 controls a corresponding motor 20. Thus, each motor 20 is controlled individually and independent of the other motors 20 in the multi-cell cooling apparatus 600. MCC 630 further comprises a single Data Acquisition (DAQ) device 660 which is in data signal communication with all of the VFD devices 650 and all sensors (e.g. motor, temperature, vibration, pump-flow, etc.) in each cell. These sensors were previously described in the foregoing description. DAQ device 660 controls the VFD devices 650 in the same manner as DAQ device 200 controls VFD device 22 which was previously described in the foregoing description. DAQ device 660 is also in data signal communication with industrial computer 300 via data bus 670. Industrial computer 300 is in data signal communication with database 301. Both industrial computer 300 and database 301 were previously described in the foregoing description. As shown in FIG. 15A, there are a plurality of communication data junction boxes 634 which receive the signals outputted by the sensors (e.g. temperature, pressure, vibration). Each communication data junction box 634 is in data signal communication with DAQ device 660. Each communication data junction box 634 has the same function and purpose as communication data junction box 111 described in the foregoing description. The power signals outputted by the VFD devices 650 are routed to motor disconnect junction boxes 636 which are located outside of fan stack 14. Each motor disconnect junction box 636 has the same configuration, purpose and function as motor disconnect junction box 106 previously described in the foregoing description. Since there is a dedicated VFD device 650 for each motor 20, each cell 602 is operated independently from the other cells 602. Thus, this embodiment of the present invention is configured to provide individual and autonomous control of each cell 602. This means that DAQ device 660 can operate each fan at different variable speeds at part-load based on process demand, demand trend, airflow characteristics of each tower (or fill material) and environmental stress. Such operation optimizes energy savings while meeting variable thermal loading. Such a configuration improves energy efficiency and cooling performance. For example, if all fans are operating at minimum speed, typically 80%, and process demand is low, DAQ device 660 is programmed to output signals to one or more VFD devices 650 to shut off the corresponding fans 12. DAQ device 660 implements a compensation mode of operation if one of the cells 602 is not capable of maximum operation, or malfunctions or is taken off line. Specifically, if one cell 602 is lost through malfunction or damage or taken off line, DAQ device 660 controls the remaining cells 602 so these cells compensate for the loss of cooling resulting from the loss of that cell. End wall cells are not as effective as cells in the middle of the tower and therefore, the end wall cells may be shut off earlier in hot weather or may need to run longer in cold weather. In accordance with the invention, the fan speed of each cell 602 increases and decreases throughout the course of a cooling day in a pattern generally similar to a sine wave as shown in FIG. 9. DAQ device 660 can be programmed so that when the basin temperature set-point is not met (in the case of a wet-cooling tower), DAQ device 660 issues signals to the VFD devices 650 to increase fan speed based on a predictive schedule of speed increments based on (a) part-load based on process demand, (b) demand trend, (c) air flow characteristics of each tower (or fill material) and (d) environmental stress without returning fan speed to 100%. This operational scheme reduces energy consumption by the cell and preserves the operational life of the equipment. This is contrary to prior art reactive cooling schedules which quickly increase the fans to 100% fan speed if the basin temperature set-point is not met.

The system and method of the present invention provides infinite variable fan speed based on thermal load, process demand, historical trending, energy optimization schedules, and environmental conditions (e.g. weather, geographical location, time of day, time of year, etc.). The present invention provides supervisory control based on continuous monitoring of vibrations, temperature, pump flow rate and motor speed. The present invention uses historical trending data to execute current fan operation and predicting future fan operation and maintenance. The system provides automatic de-icing of the fan without input from the operator.

De-icing cooling towers using permanent magnet motor 20 is relatively easier, safer and less expensive than de-icing cooling towers using prior art gearbox fan drive systems. The capability of motor 20 to operate the fans at slower speeds in colder weather reduces icing. Motor 20 has no restrictions or limitations in reverse rotation and can therefore provide the heat retention required to de-ice a tower in winter. DAQ device 200 is configured to program the operation of motor 20 to implement de-icing based on outside temperature, wind speed and direction, wet bulb temperature, and cooling tower inlet/outlet and flow rate. All parameters are used to develop a program of operation that is tailored made for the particular and unique characteristics of each cooling tower, the cooling tower's location and environment stress.

Permanent magnet motor 20 provides constant high torque thereby allowing the fan to operate at a relatively slower speed with greater pitch to satisfy required air-flow while reducing acoustic noise (acoustic noise is a function of fan speed) with additional airflow built into the system for other functions. This is not possible with prior art fan drive systems that use a single-speed gear-box and induction motor that drives the fan at 100% speed at the maximum tower thermal condition for 100% of the time. Unlike prior art fan drive systems, motor 20 is capable of infinite variable speed in both directions. Motor 20 is configured to provide infinite variable speed up to 100% speed with constant torque but without the duration restrictions of prior art fan drive systems that relate to induction motor torque at part-load, drive train resonance, torque load relative to pitch, and induction motor cooling restrictions.

The infinite variable speed of motor 20 in both directions allows the fan to match the thermal loading to the environmental stress. This means more air for hot-day cooling and less air to reduce tower icing. The infinite variable speed in reverse without duration limitations enables de-icing of the tower. Motor 20 provides high, constant torque in both directions and high, constant torque adjustment which allows for greater fan pitch at slower fan speeds. These important features allow for a built-in fan-speed buffer for emergency power and greater variation in diurnal environments and seasonal changes without re-pitching the fan. Thus, the infinite variable speed adjustment aspect of the present invention allows for built-in cooling expansion (greater flow) and built-in expansion without changing a motor and gear box as required in prior art fan drive systems. The present invention provides unrestricted variable speed service in either direction to meet ever changing environmental stress and process demand that results in improved cooling, safety and reduced overhead. All parameters are used to develop a unique programmed, operation for each cooling tower design, the cooling tower's geographical location and the corresponding environmental stress. DAQ device 200 operates motor 20 (and thus fan 12) in a part-load mode of operation that provides cooling with energy optimization and then automatically shifts operation to a full-load mode that provides relatively more variable process control which is required to crack heavier crude. Once the process demand decreases, DAQ device 200 shifts operation of motor 20 back to part-load.

Due to the fan hub interface, the motor shaft 24 is relatively large resulting in a relatively large bearing design. Combined with the slow speed of the application, the bearing system is only 20% loaded, thereby providing an L10 life of 875,000 hours. The 20% loading and unique bearing design of motor 20 provides high fidelity of vibration signatures and consistent narrow vibration band signatures well below the current trip setting values to allow for improved monitoring via historical trending and improved health monitoring via vibration signatures beyond the operating tolerance. The bearing system of motor 20 enables motor 20 to rotate all fan hubs and fan diameters at all speeds and torques in both directions and is specifically designed for thrust loads, reverse loads, yaw loads, fan dead weight, etc.

The variable process control system of the present invention determines Cooling Tower Thermal Capacity so as to enable operators to identify proactive service, maintenance and cooling improvements and expansions. The present invention provides the ability to monitor, control, supervise and automate the cooling tower subsystems so as to manage performance and improve safety and longevity of these subsystems. The system of the present invention is integrated directly into an existing refinery Distributed Control System (DCS) so as to allow operators to monitor, modify, update and override the variable process control system in real time. Operators can use the plant DCS 315 to send data signals to the variable process control system of the present invention to automatically increase cooling for cracking crude or to prevent auxiliary system fouling or any other process. As shown by the foregoing description, for a given fan performance curve, a cooling tower can be operated to provide maximum cooling as a function of fan pitch and speed. Fan speed can be reduced if basin temperature set-point is met. The present invention provides accurate cooling control with variable speed motor 20 as a function of environmental stress (e.g. cooling and icing), variable process control (i.e. part load or more cooling for cracking crude, etc.) and product quality such as light end recovery with more air-per-amp for existing installations. The variable process control system of the present invention allows operators to monitor cooling performance in real time thereby providing the opportunity to improve splits and production and identify service and maintenance requirements to maintain cooling performance and production throughput. Furthermore, the data acquired by the system of the present invention is utilized to trend cooling performance of the cooling tower which results in predictive maintenance that can be planned before outages occur as opposed to reactive maintenance that results in downtime and loss of production. The unique dual-bearing design of motor 20, the placement of accelerometers, velocity probes and displacement probes on each of these bearings, and the vibration analysis algorithms implemented by industrial computer 300 allow significant improvements in fan vibration monitoring and provides an effective trim balancing system to remove the fan dynamic couple. The trim balance feature removes the fan dynamic couple which reduces structural fatigue on the cooling tower.

The present invention eliminates many components and machinery used in prior art fan drive systems such as gearboxes, shafts and couplings, two-speed motors, gearbox sprag clutches to prevent reverse operation, electric and gerotor lube pumps for gearboxes and vibration cut-off switches. Consequently, the present invention also eliminates the maintenance procedures related to the aforesaid prior art components, e.g. pre-seasonal re-pitching, oil changes and related maintenance. The present invention allows monitoring and automation of the operation of the cooling tower subsystems to enable management of performance and improvement in component longevity. The present invention allows continuous monitoring and management of the permanent magnet motor 20, the fan and the cooling tower itself. The present invention allows for rapid replacement of a prior art fan drive system with motor 20, without specialized craft labor, for mission critical industries minimizing production loss. The system of the present invention provides an autonomous de-icing function to de-ice and/or prevent icing of the cooling tower.

The system of the present invention is significantly more reliable than prior art systems because the present invention eliminates many components, corresponding complexities and problems related to prior art systems. For example, prior art gearboxes and corresponding drive trains are not designed for the harsh environment of cooling towers but were initially attractive because of their relatively lower initial cost. However, in the long run, these prior art fan drive systems have resulted in high Life-Cycle costs due to continuous maintenance and service expense (e.g. oil changes, shaft alignments, etc.), equipment failure (across-the-line start damage), application of heavy duty components, poor reliability, lost production and high energy consumption.

The data collected by DAQ device 200, which includes motor voltage, current, power factor, horsepower and time is used to calculate energy consumption. In addition, voltage and current instrumentation are applied to the system to measure energy consumption. The energy consumption data can be used in corporate energy management programs to monitor off-performance operation of a cooling tower. The energy consumption data can also be used to identify rebates from energy savings or to apply for utility rebates, or to determine carbon credits based upon energy savings. The system of the present invention also generates timely reports for corporate energy coordinators on a schedule or upon demand. The data provided by DAQ device 200 and the post-processing of such data by industrial computer 300 enables cooling performance management of the entire system whether it be a wet-cooling tower, air-cooled heat exchanger (ACHE), HVAC systems, chillers, etc. Specifically, the data and reports generated by DAQ device 200 and industrial computer 300 enable operators to monitor energy consumption and cooling performance. The aforesaid data and reports also provide information as to predictive maintenance (i.e. when maintenance of cooling tower components will be required) and proactive maintenance (i.e. maintenance to prevent a possible breakdown). Industrial computer 300 records data pertaining to fan energy consumption and thus, generates fan energy consumption trends. Industrial computer 300 implements computer programs and algorithms that compare the performance of the cooling tower to the energy consumption of the cooling tower in order to provide a cost analysis of the cooling tower. This is an important feature since an end user spends more money operating a poor performing tower (i.e. lower flow means more fan energy consumption and production loss) than a tower than is in proper operating condition. Industrial computer 300 implements an algorithm to express the fan energy consumption as a function of the tower performance which can be used in annual energy analysis reports by engineers and energy analysts to determine if the tower is being properly maintained and operated. Energy analysis reports can be used to achieve energy rebates from utilities and for making operational improvement analysis, etc. With respect to large capital asset planning and utilization cost, a relation is derived by the following formula:

$$N = (\text{Cooling Tower Thermal Capacity})/(\text{Cooling Tower Energy Consumption})$$

wherein the quotient "N" represents a relative number that can be used to determine if a cooling tower is operating properly or if it has deteriorated or if it is being incorrectly operated. Deterioration and incorrect operation of the cooling tower can lead to safety issues such as catastrophic failure, poor cooling performance, excessive energy consumption, poor efficiency and reduced production.

The present invention provides accurate cooling control with variable speed motor 20 as a function of environmental stress (cooling and icing), variable process control (part load or more cooling for cracking, etc.) and product quality such as light end recovery with more air-per-amp for existing installations. The present invention also provides automatic adjustment of fan speed as a function of cooling demand (process loading), environmental stress and energy efficiency and provides adaptive vibration monitoring of the fan to prevent failure due to fan imbalance and system resonance. The present invention allows the fans to be infinitely pitched due to constant, high torque. The built-in vibration monitoring system provides a simple and cost effective trim balance to eliminate fan dynamic couple and subsequent structural wear and tear. The variable process control system of the present invention reduces maintenance to auxiliary equipment, maintains proper turbine back pressure and prevents fouling of the condensers. Motor 20 provides constant torque that drives the fan at lower speed to achieve design airflow at a greater fan pitch thereby reducing fan noise which typically increases at higher fan speeds (noise is a function of fan speed). The present invention reduces energy consumption and does not contribute to global warming. The high-torque, permanent magnet motor 20 expands the operational range of the fan to meet ever changing process load changes and environmental conditions by providing high, constant torque for full fan pitch capability. This enables increased airflow for existing installations, provides unrestricted variable speed for energy savings and reduction of ice formation, and allows reverse operation of the fan for retaining heat in the cooling tower for de-icing.

Although the previous description describes how motor 20 and the corresponding system components (e.g. VFD 22, DAQ device 200, etc.) may be used to retrofit an existing cooling tower that used a prior art fan drive system, it is to be understood that the present invention can be used in newly constructed cooling towers, regardless of the materials used to construct such new cooling towers, e.g. wood, steel, concrete, FRP or combinations thereof.

The present invention is also applicable to steel mills and glass processing, as well as any other process wherein the control of cooling water is critical. Temperature control of the water is crucial for cooling the steel and glass product to obtain the correct material composition. The capability of the present invention to provide constant basin water temperature is directly applicable to steel mill operation, glass processing and resulting product quality and capacity. The capability of the permanent magnet motor 20 and fan 12 to operate in reverse without limitation allows more heat to be retained in the process water on cold days. This would be accomplished by slowing the fan 12 or operating the fan 12 in reverse in order to retain more heat in the tower and thus, more heat in the process water in the basin. The variable process control feature of the system of the present invention can deliver infinite temperature variation on demand to the process as required to support production and improve control and quality of the product.

While the foregoing description is exemplary of the present invention, those of ordinary skill in the relevant arts will recognize the many variations, alterations, modifications, substitutions and the like are readily possible, especially in light of this description, the accompanying drawings and the claims drawn hereto. In any case, because the scope of the invention is much broader than any particular embodiment, the foregoing detailed description should not be construed as a limitation of the present invention, which is limited only by the claims appended hereto.

What we claim is:

1. A method for operating a cooling tower having a fan for cooling liquids used in an industrial process, comprising:
    utilizing a direct-drive, variable speed permanent magnet motor to rotate the fan;
    utilizing a plurality of variable speed pumps to pump the liquids from the cooling tower to the industrial process and then back to the cooling tower, wherein each variable speed pump comprises a permanent magnet motor and sensor devices for outputting pump status signals;
    utilizing a variable process control system that comprises a plurality of programmable motor controllers, each of which providing power signals to a corresponding permanent magnet motor and outputting motor status signals that represent the speed and torque of each permanent magnet motor, the variable process control system further comprising a computer system in electronic communication with the programmable motor controllers and the pump status signals, wherein the computer system comprises a data storage resource for storing data representing operational characteristics of the permanent magnet motors and the programmable motor controllers, a fan speed curve, cooling tower design parameters, environmental stress, fan aerodynamic properties including fan pitch, fan balance data, and fan vibration signatures;
    measuring the flow rate of liquids flowing through the variable speed pumps;
    processing the measured flow rate to determine the process demand;
    measuring the plenum pressure; and
    utilizing the computer system to process the determined process demand, the measured plenum pressure, the fan pitch and the rotational speed and torque of the fan to determine to determine mass airflow produced by the fan.

2. The method according to claim 1 further comprising the steps of:
    utilizing the computer system to process the determined process demand further comprises determining if the mass airflow produced by the fan is sufficient to meet the determined process demand; and
    using a programmable motor controller to increase the speed of the permanent magnet motor that drives the fan in order to increase mass airflow if the current mass airflow is not sufficient to meet the determined process demand.

3. The method according to claim 2 wherein cooling tower includes a collection basin for receiving liquids cooled by the fan and a condenser that is in the flow of liquids from the collection basin to the industrial process and in the flow of liquids from the industrial process to the cooling tower, and wherein the method further comprising the steps of:
    receiving a condenser temperature set-point;
    utilizing the computer system to determine a collection basin temperature that is based on the received condenser temperature set-point; and
    utilizing the programmable motor controllers to output motor control signals to all permanent magnet motors that will adjust the fan rotational speed and the flow of liquids through the variable speed pumps in order to maintain the actual collection basin temperature at a temperature that is substantially the same as the determined collection basin temperature;
    continuously measuring the actual collection basin temperature; and
    processing the measured actual collection basin temperature.

4. The method according to claim 3 wherein the data storage device has stored therein historical process demand data and historical environmental stress data, the method further comprising the steps of:
    utilizing the computer system to process the current process demand data and environmental stress data and the historical process demand data and environmental stress data with a Runge-Kutter algorithm to generate a fan speed curve that defines fan speed over a predetermined amount of time wherein variations in fan speed occur in relatively small increments over the predetermined amount of time; and
    utilizing the programmable motor controllers to control the speed of the direct-drive variable speed permanent magnet motor in accordance with the generated fan speed curve.

5. The method according to claim 4 further comprising the step of utilizing the programmable motor controllers to control the speed of the permanent magnet motors of the variable speed pumps in accordance with the rotation speeds defined by the generated fan speed curve.

6. The method according to claim 4 wherein the predetermined amount of time is twenty four hours.

7. The method according to claim 1 wherein the direct-drive, variable speed motor, permanent magnet motor comprises a housing having an interior, a stator and rotor within the interior and bearings within the interior, the method further comprising the steps of:
    measuring the temperature of the motor housing;
    determining if the measured temperature of the motor housing exceeds a motor housing temperature threshold; and
    utilizing the computer system to generate an alert signal if the measured motor housing temperature exceeds the motor housing temperature threshold.

8. The method according to claim 7 further comprising the steps of:
    measuring the temperatures of the interior and the stator;
    determining if the measured temperature of the stator exceeds a predetermined stator temperature threshold;
    determining if the measured temperature of the interior exceeds a predetermined interior temperature threshold; and
    utilizing the computer system to generate an alert signal if the measured interior temperature exceeds the interior threshold temperature or if the measure stator temperature exceeds the stator threshold temperature.

9. The method according to claim 7 further comprising the steps of:
    measuring the temperatures of the bearings;
    determining if the measured temperature of the bearings exceeds a predetermined bearing temperature threshold; and utilizing the computer system to generate an alert signal if the measured bearing temperature exceeds the bearing threshold temperature.

10. The method according to claim 7 further comprising the steps of:
measuring vibrations of the motor;
utilizing the computer system to process the measured vibrations and determine if the measured vibrations match any of the stored reference vibration signatures; and
generating an alert signal if the measured vibrations match any of the stored reference vibration signatures.

11. The method according to claim 10 wherein the step of measuring the vibrations at the motor comprise the step of measuring the vibrations at the bearings.

12. The method according to claim 10 wherein the stored reference vibration signatures include predetermined vibration signatures that correspond to impending failure of the fan or the direct-drive, variable speed, permanent magnet motor, and wherein the method further comprises the steps of:
utilizing the computer system to determine if the measured vibrations match any of the predetermined vibration signatures; and
generating an alert signal if the measured vibrations match any of the predetermined vibration signatures.

13. The method according to claim 12 further comprising the step of generating a motor control signal to a programmable motor controller to cease providing power signals to the direct-drive variable speed, permanent magnet motor so as to allow the direct-drive variable speed, permanent magnet motor to coast to 0.0 RPM if it is determined that the measured vibrations match any of the predetermined vibration signatures.

14. The method according to claim 12 further comprising the step of generating a motor control signal to a programmable motor controller to ramp down the speed of the direct-drive variable speed, permanent magnet motor to 0.0 RPM in accordance with a predetermined negative ramp rate if the measured vibrations match any of the predetermined vibration signatures.

15. The method according to claim 12 further comprising the steps:
determining if the measured vibration results from a resonant motor speed of the direct-drive variable speed permanent magnet motor if it has previously been determined that the measured vibration does not match any of the stored reference vibrations; and
programming the programmable motor controller which powers the direct-drive, variable speed permanent magnet motor to skip over the motor speed that is the same as the resonant speed.

16. A method for de-icing a cooling tower having a fan that cools liquids in an industrial process, the method comprising the steps of:
utilizing a direct-drive variable speed permanent magnet motor to rotate the fan at a rotational speed;
utilizing a variable process control system that comprises a programmable motor controller for providing power signals to the direct-drive variable speed permanent magnet motor to effect either forward or reverse operation of the motor, the variable process control system further comprising a computer system in communication with the programmable motor controller, the computer system having a data storage resource for storing (i) cooling tower design parameters, and (ii) historical environmental stress data corresponding to the geographical location of the cooling tower;
providing current environmental stress data to the computer system;
processing the current environmental stress data, the cooling tower design parameters and the historical environmental stress data to determining if a de-icing should be implemented; and
providing power signals to the direct-drive variable speed permanent magnet motor to effect reverse operation of the permanent magnet motor so as to effect reverse rotation of the fan for a predetermined amount of time if the processing of the current environmental stress data, the cooling tower design parameters and the historical environmental stress data to determine that de-icing is to be implemented.

17. A variable process control system for a cooling tower having a fan that cools liquid used in an industrial process, the variable process control system comprising:
a variable speed permanent magnet motor having a rotatable shaft connected to the fan to rotate the fan;
a plurality of variable speed pumps to pump the liquids from the cooling tower to the industrial process and then back to the cooling tower, wherein each variable speed pump comprises a permanent magnet motor and sensor devices for providing pump status signals;
a plurality of programmable motor controllers, each of which providing power signals to a corresponding permanent magnet motor and outputting motor status signals that represent the speed and torque of each permanent magnet motor;
sensor devices for measuring the flow rate of liquids flowing through the variable speed pumps and measuring plenum pressure;
a computer system in electronic communication with the programmable motor controllers and the pump status signals, the computer system includes a data storage resource for storing reference data representing operational characteristics of the permanent magnet motors and the programmable motor controllers, at least one fan speed curve, cooling tower design parameters, environmental stress, fan aerodynamic properties including fan pitch, fan balance data, and fan vibration signatures, wherein the computer system is programmed to process the measured flow rate to determine the process demand and then process determined process demand, the measured plenum pressure, the fan pitch and the rotational speed and torque of the fan to determine to determine mass airflow produced by the fan, the computer system being programmed to determine if the mass airflow produced by the fan is sufficient to meet the determined process demand and automatically generate control signals to the programmable motor controller corresponding to the permanent magnet motor that drives the fan to increase the rotational speed of the fan if the current mass airflow is not sufficient to meet the determined process demand.

18. The variable process control system according to claim 17 wherein cooling tower includes a collection basin for receiving liquids cooled by the fan and wherein a condenser is in the flow of liquids from the collection basin to the industrial process and in the flow of liquids from the industrial process to the cooling tower, the variable process control system further comprising:
means for providing a condenser temperature set-point to the computer system; and wherein the computer system is further programmed to calculate a collection basin temperature that is based on the provided condenser temperature set-point and generate motor control signals for input to the programmable motor controllers to adjust the speed of the permanent magnet motors so as to adjust the fan rotational speed and the flow of liquids through the variable speed pumps in order to maintain the actual collection basin temperature at a temperature that is substantially the same as the determined collection basin temperature.

19. The variable process control system according to claim 18 further comprising at least one temperature sensor in communication with the computer system for continuously measuring the actual collection basin temperature.

20. The variable process control system according to claim 19 wherein the computer system is further programmed to process the measured actual collection basin temperature.

21. The variable process control system according to claim 19 wherein computer system is programmed to calculate the collection basin temperature.

22. The variable process control system according to claim 17 wherein the data storage resource has stored therein historical process demand data and historical environmental stress data, the computer system being further programmed to:
process the current process demand data and environmental stress data and the historical process demand data and environmental stress data with a Runge-Kutter algorithm to generate a fan speed curve that defines fan speed over a predetermined amount of time wherein variations in fan speed occur in relatively small increments over the predetermined amount of time;
generate control signals for the programmable motor controllers to control the speed of the direct-drive variable speed permanent magnet motor in accordance with the generated fan speed curve; and
generate control signals to the programmable motor controllers to control the rotational speed of the permanent magnet motors of the variable speed pumps in accordance with the rotational speeds defined by the generated fan speed curve.

23. The variable process control system according to claim 17 wherein the direct-drive, variable speed motor, permanent magnet motor comprises a housing having an interior, a stator and rotor within the interior and bearings within the interior, the variable process control system further comprising at least one sensor for measuring the temperature of the motor housing, the computer system being programmed to determine if the measured temperature of the motor housing exceeds a motor housing temperature threshold and generate an alert signal if the measured motor housing temperature exceeds the motor housing temperature threshold.

24. The variable process control system according to claim 23 further comprising at least one sensor device for measuring the temperatures of the interior and the stator, and wherein the computer system is programmed to determine if the measured temperature of the stator exceeds a predetermined stator temperature threshold, determine if the measured temperature of the interior exceeds a predetermined interior temperature threshold and generate an alert signal if the measured interior temperature exceeds the interior threshold temperature or if the measure stator temperature exceeds the stator threshold temperature.

25. The variable process control system according to claim 24 further comprising sensors for measuring the temperatures of the bearings, and wherein the computer system is programmed to determine if the measured temperature of the bearings exceeds a predetermined bearing temperature threshold, and generate an alert signal if the measured bearing temperature exceeds the bearing threshold temperature.

26. The variable process control system according to claim 23 further comprising sensors for measuring vibrations of the motor, and wherein the computer system is programmed to process the measured vibrations and determine if the measured vibrations match any of the stored reference vibration signatures, and generate an alert signal if the measured vibrations match any of the stored reference vibration signatures.

27. The variable process control system according to claim 26 wherein the sensors measure vibrations of the bearings.

28. The variable process control system according to claim 26 wherein the stored reference vibration signatures include predetermined vibration signatures that correspond to impending failure of the fan or the direct-drive, variable speed, permanent magnet motor, and wherein the computer system is programmed to determine if the measured vibrations match any of the predetermined vibration signatures, and generate an alert signal if the measured vibrations match any of the predetermined vibration signatures.

29. A variable process control system for a cooling tower having a fan for cooling liquid used in an industrial process, the variable process control system comprising:
a variable speed, load bearing permanent magnet motor having a rotatable shaft connected to a cooling tower fan to rotate the fan;
a programmable motor controller for providing power signals to the motor to cause the motor to operate either in forward or reverse operation, or at constant speed, or to accelerate at a predetermined acceleration rate, or decelerate at a predetermined deceleration rate, the programmable motor controller being configured to output motor status signals that represent the speed, direction and torque of the motor;
a sensor device for measuring plenum pressure;
a computer system in electronic signal communication with the programmable motor controller and including a processing resource and a data storage resource for processing and storing reference data representing operational characteristics of the variable speed, load bearing permanent magnet motor, at least one fan speed curve, current environmental stress, historical environmental stress corresponding to the geographical location of the cooling tower, cooling tower design parameters, historical process demand patterns, a fan map including fan aerodynamic properties, fan pitch and fan trim balance data, wherein the computer system is configured to:
(i) continuously receive external real-time data signals representing the current process demand associated with the industrial process,
(ii) process the fan pitch, the fan rotational speed, the fan torque and the measured plenum pressure to determine mass airflow produced by the fan,
(iii) determine if the mass airflow produced by the fan is sufficient to meet current process demand, and
(iv) process the data representing the current process demand, current environmental stress, historical process demand and historical environmental stress to generate a fan speed curve that defines fan speed over a predetermined amount of time and generate control signals for input into the programmable motor controller to control the rotational speed of the motor in accordance with the generated fan speed curve.

30. The variable process control system according to claim 29 wherein the computer system is configured to automatically issue control signals to the programmable motor controller to increase the rotational speed of the fan if the current mass airflow is not sufficient to meet the current process demand.

31. A variable process control system for a cooling tower having a fan for cooling liquid used in an industrial process, the variable process control system comprising:
- a variable speed, load bearing permanent magnet motor having a rotatable shaft connected to a cooling tower fan to rotate the fan;
- a programmable motor controller for providing power signals to the motor to cause the motor to operate either in forward or reverse operation, or at constant speed, or to accelerate at a predetermined acceleration rate, or decelerate at a predetermined deceleration rate, the programmable motor controller being configured to output motor status signals that represent the speed, direction and torque of the motor;
- a plenum pressure sensor to measure plenum pressure;
- a plurality of variable speed pumps to pump the liquids from the cooling tower to the industrial process and then back to the cooling tower, wherein each variable speed pump includes a variable speed motor and a sensor device for providing pump status signals including the flow rate, pressure and temperature of the liquid flowing through the variable speed pump;
- additional programmable motor controllers, wherein each of the additional programmable motor controllers is associated with a corresponding variable speed pump and provides power signals to the variable speed motor of the corresponding pump and outputs motor status signals that represent the speed and torque of the variable speed motor of the corresponding pump; and
- a computer system in electronic signal communication with all of the programmable motor controllers, the plenum pressure sensor device and the sensor devices associated with the variable speed pumps, the computer system being configured to continuously receive external real-time data signals representing the current process demand associated with the industrial process and continuously process the received external real-time data signals in order to output motor control signals to the programmable motor controllers so as to vary the speed of the fan and/or pumps in response to changing process demand conditions and/or changing environmental conditions.

* * * * *